(12) United States Patent
Orita et al.

(10) Patent No.: US 11,747,907 B2
(45) Date of Patent: Sep. 5, 2023

(54) TACTILE PRESENTATION PANEL, TACTILE PRESENTATION TOUCH PANEL, AND TACTILE PRESENTATION TOUCH DISPLAY

(71) Applicant: Mitsubishi Electric Corporation, Tokyo (JP)

(72) Inventors: Tae Orita, Tokyo (JP); Yoshinori Ueno, Tokyo (JP); Mitsuru Sakai, Tokyo (JP); Naoki Numata, Tokyo (JP); Yuki Furumoto, Tokyo (JP); Tsuyoshi Sempuku, Tokyo (JP); Yuichi Sasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/781,722

(22) PCT Filed: Jan. 7, 2020

(86) PCT No.: PCT/JP2020/000105
§ 371 (c)(1),
(2) Date: Jun. 2, 2022

(87) PCT Pub. No.: WO2021/140550
PCT Pub. Date: Jul. 15, 2021

(65) Prior Publication Data
US 2023/0004225 A1  Jan. 5, 2023

(51) Int. Cl.
*G06F 3/01* (2006.01)
*G06F 3/039* (2013.01)
(Continued)

(52) U.S. Cl.
CPC ............ *G06F 3/016* (2013.01); *G06F 3/0362* (2013.01); *G06F 3/0393* (2019.05); *G06F 3/044* (2013.01);
(Continued)

(58) Field of Classification Search
CPC ...... G06F 3/016; G06F 3/0393; G06F 3/0362; G06F 3/0416; G06F 3/044; G06F 2203/04105
See application file for complete search history.

(56) References Cited

U.S. PATENT DOCUMENTS 11,159,161 B2 * 10/2021 Aoki ................ H03K 17/962
11,216,142 B2 *  1/2022 Tanaka ............... G06F 3/0393
(Continued)

FOREIGN PATENT DOCUMENTS

JP  2002-10249 A  1/2002
JP  2006-228151 A  8/2006
(Continued)

OTHER PUBLICATIONS

International Search Report dated Mar. 21, 2020, in corresponding International Application No. PCT/JP2020/000105.
(Continued)

*Primary Examiner* — Michael Pervan
(74) *Attorney, Agent, or Firm* — XSENSUS LLP

(57) ABSTRACT

In relation to a tactile presentation panel, a tactile presentation panel has a tactile presentation knob placed on an operation surface and presents a tactile sense to a user via the tactile presentation knob, and includes a control circuit that divides the operation surface into a plurality of regions, assigns a control target to each of divided regions, and sets a tactile sense to be presented for each of the divided regions, a tactile control circuit that generates a tactile sense set by the control circuit for each of the divided regions by changing a frictional force between the operation surface and the tactile presentation knob, and a touch detection circuit that detects a position on the tactile presentation
(Continued)

panel of the tactile presentation knob. The tactile presentation knob is placed in the divided region so that the control target is selected.

22 Claims, 54 Drawing Sheets

(51) Int. Cl.
  *G06F 3/0362* (2013.01)
  *G06F 3/041* (2006.01)
  *G06F 3/044* (2006.01)

(52) U.S. Cl.
  CPC .. *G06F 3/0416* (2013.01); *G06F 2203/04105* (2013.01)

(56) References Cited

U.S. PATENT DOCUMENTS

| | | | | |
|---|---|---|---|---|
| 11,221,692 | B2* | 1/2022 | Takaoka | G06F 3/0393 |
| 11,435,862 | B2* | 9/2022 | Sasaki | G06F 3/0488 |
| 11,467,696 | B2* | 10/2022 | Korherr | B60K 35/00 |
| 11,513,639 | B2* | 11/2022 | Kono | G06F 3/0412 |
| 11,513,649 | B2* | 11/2022 | Takada | G06F 3/038 |
| 2010/0079403 | A1* | 4/2010 | Lynch | G06F 3/04886 |
| | | | | 345/173 |
| 2011/0175835 | A1* | 7/2011 | Wang | G06F 3/0446 |
| | | | | 345/173 |
| 2012/0268412 | A1 | 10/2012 | Cruz-Hernandez et al. | |
| 2014/0152621 | A1* | 6/2014 | Okayama | G06F 3/04182 |
| | | | | 345/174 |
| 2014/0267039 | A1* | 9/2014 | Curtis | G06F 3/0338 |
| | | | | 345/161 |
| 2015/0103024 | A1 | 4/2015 | Haga et al. | |
| 2015/0169063 | A1 | 6/2015 | Goto | |
| 2015/0185849 | A1 | 7/2015 | Levesque et al. | |
| 2015/0185928 | A1* | 7/2015 | Son | G06F 3/0445 |
| | | | | 345/174 |
| 2016/0179260 | A1* | 6/2016 | Ham | G06F 3/0412 |
| | | | | 345/173 |
| 2016/0282944 | A1* | 9/2016 | Haga | G06F 3/04886 |
| 2017/0090576 | A1 | 3/2017 | Peterson et al. | |
| 2017/0205883 | A1 | 7/2017 | Tanaka | |
| 2018/0024649 | A1* | 1/2018 | Uno | G06F 3/0338 |
| | | | | 345/174 |
| 2018/0348874 | A1* | 12/2018 | Khoshkava | G06F 3/016 |
| 2020/0142529 | A1* | 5/2020 | Nugraha | G06F 3/044 |
| 2020/0218351 | A1 | 7/2020 | Orita et al. | |
| 2020/0225765 | A1* | 7/2020 | Hori | G06F 3/03 |
| 2020/0301547 | A1* | 9/2020 | Mori | G06F 3/044 |
| 2021/0173486 | A1 | 6/2021 | Ueda | |
| 2022/0004303 | A1* | 1/2022 | Kakinoki | G06F 3/02 |
| 2022/0229503 | A1* | 7/2022 | Kono | G06F 3/044 |
| 2022/0276712 | A1* | 9/2022 | Orita | G06F 3/04144 |

FOREIGN PATENT DOCUMENTS

| | | |
|---|---|---|
| JP | 2008-15584 A | 1/2008 |
| JP | 2014-512619 A | 5/2014 |
| JP | 2015-97076 A | 5/2015 |
| JP | 2015-114948 A | 6/2015 |
| JP | 2015-130167 A | 7/2015 |
| JP | 2016-4341 A | 1/2016 |
| JP | 2017-49700 A | 3/2017 |
| JP | 2017-126222 A | 7/2017 |
| JP | 2019-514139 A | 5/2019 |
| JP | 6570799 B2 | 8/2019 |
| WO | 2012/145264 A1 | 10/2012 |
| WO | 2017/184634 A2 | 10/2017 |
| WO | 2019/030987 A1 | 2/2019 |

OTHER PUBLICATIONS

U.S. Appl. No. 17/773,617, filed May 2, 2022, Tae Orita.
U.S. Appl. No. 17/779,142, filed May 24, 2022, Masami Hayashi.
U.S. Appl. No. 17/781,408, filed Jun. 1, 2022, Tae Orita.
U.S. Appl. No. 17/777,055, filed May 16, 2022, Tae Orita.
U.S. Appl. No. 17/633,963, filed Feb. 9, 2022, Takeshi Ono.

* cited by examiner

F I G. 9
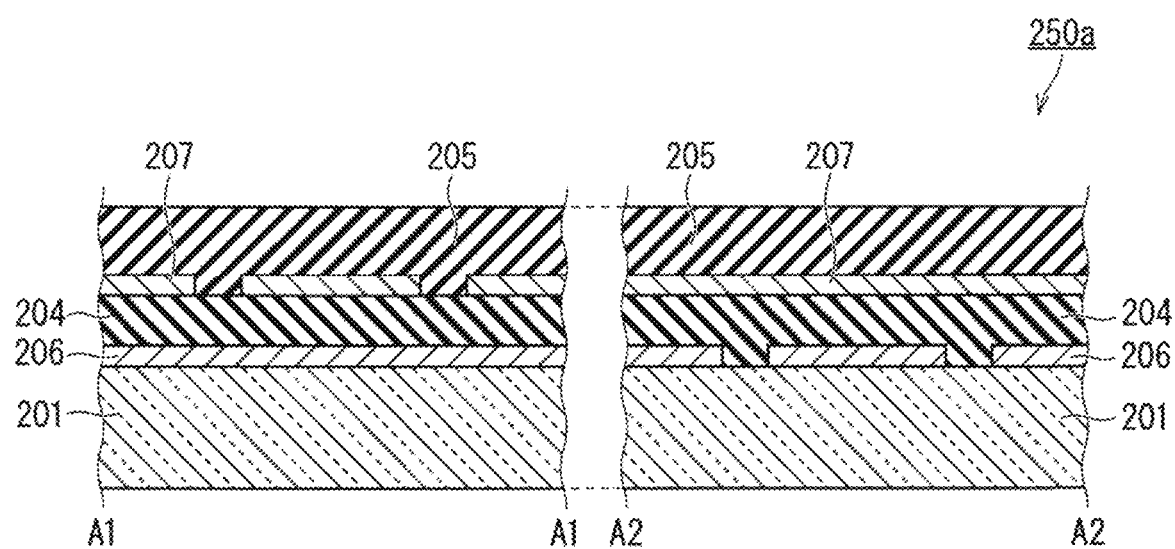

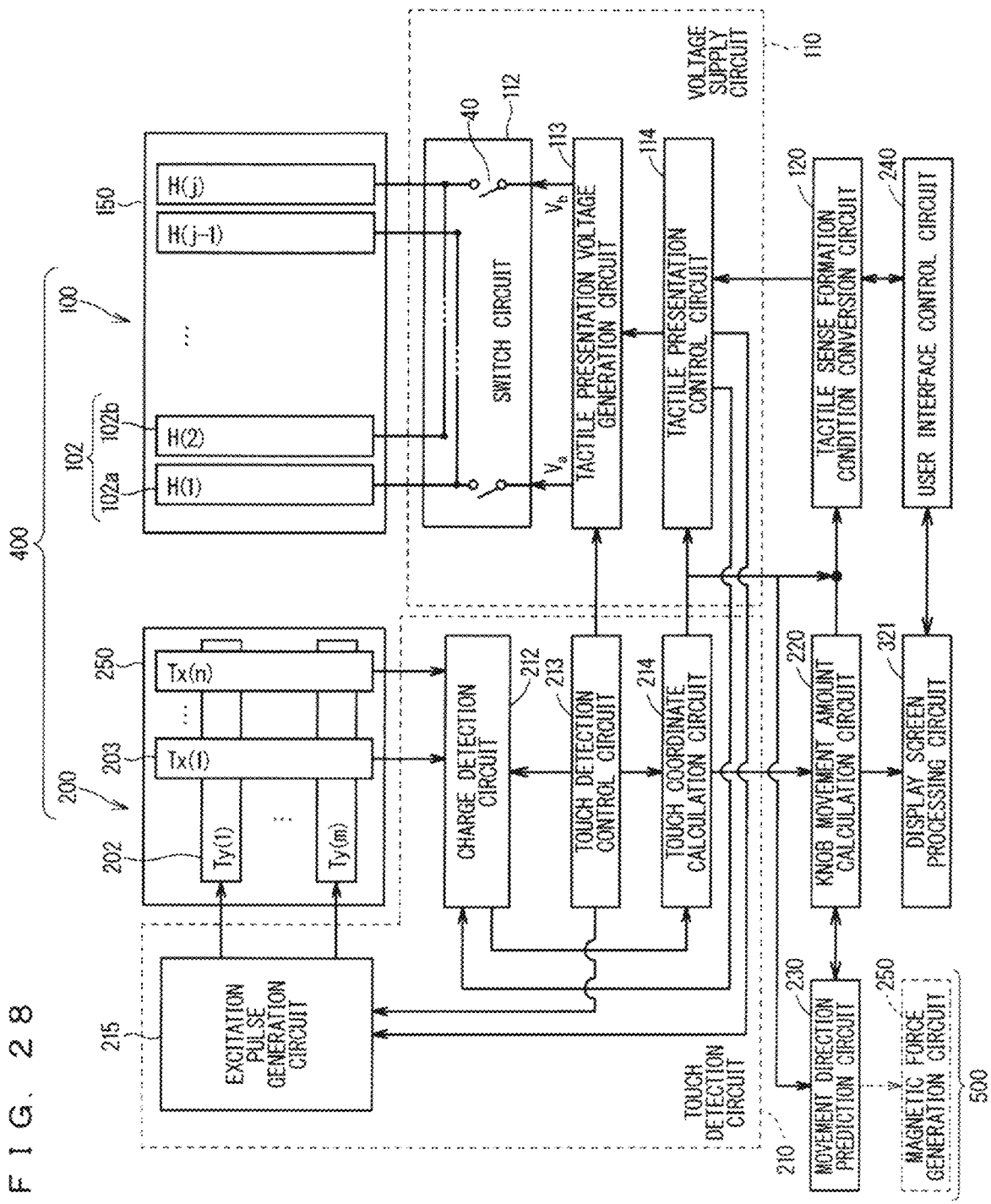
F I G. 2 8

F I G. 2 9
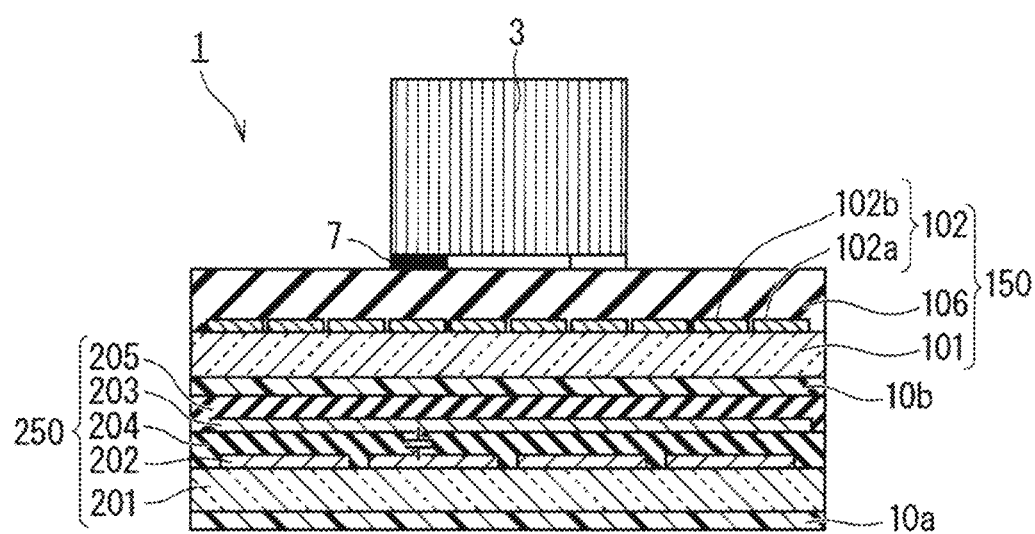

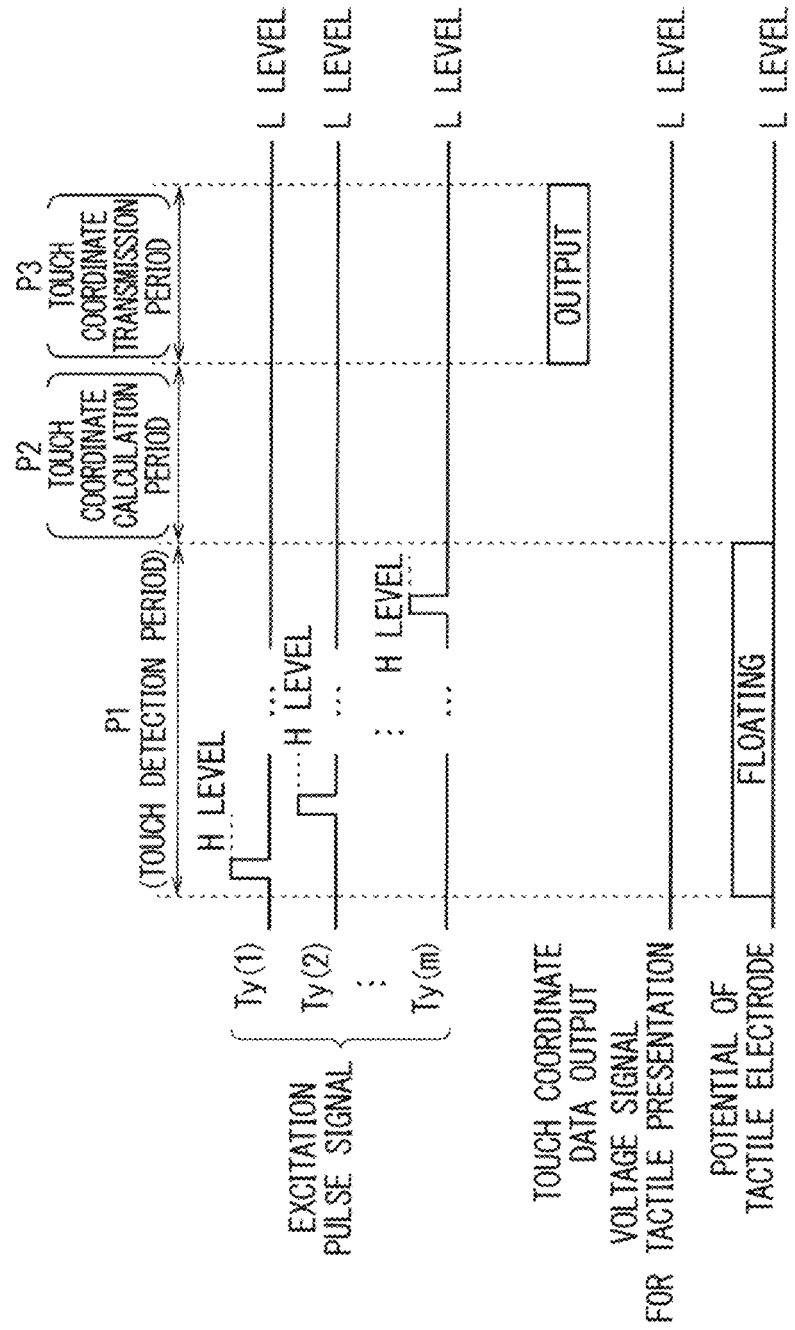

F I G. 3 1
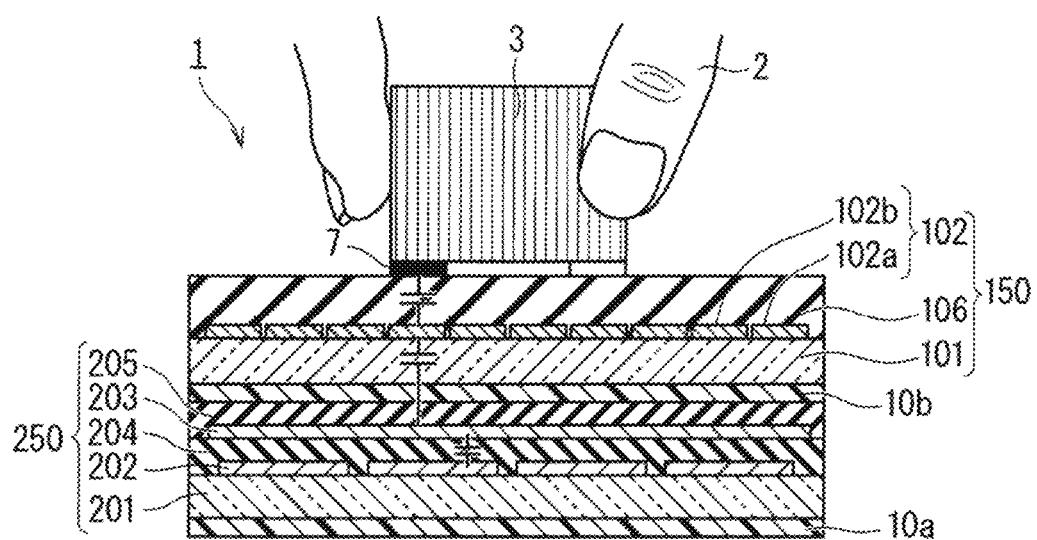

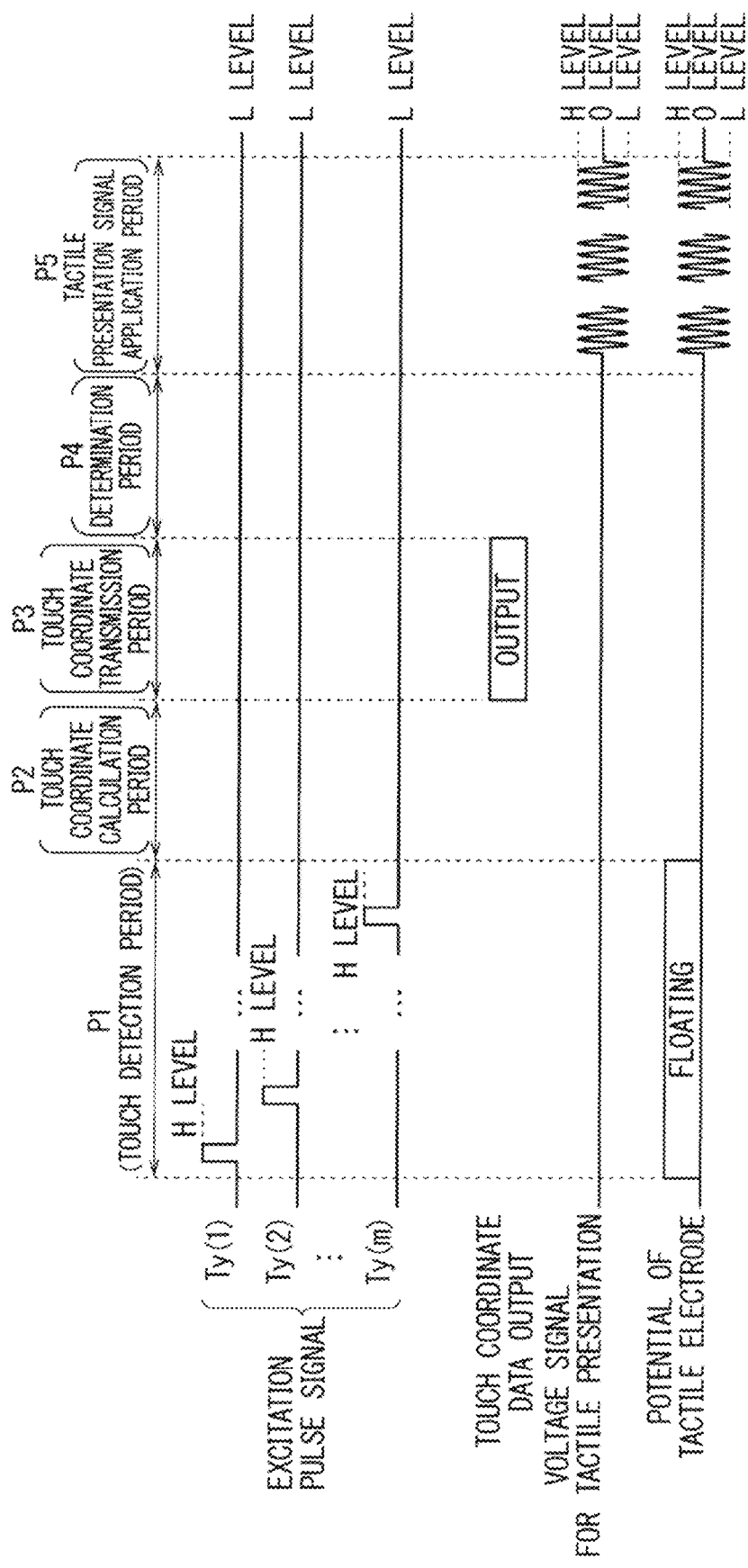

F I G. 3 5
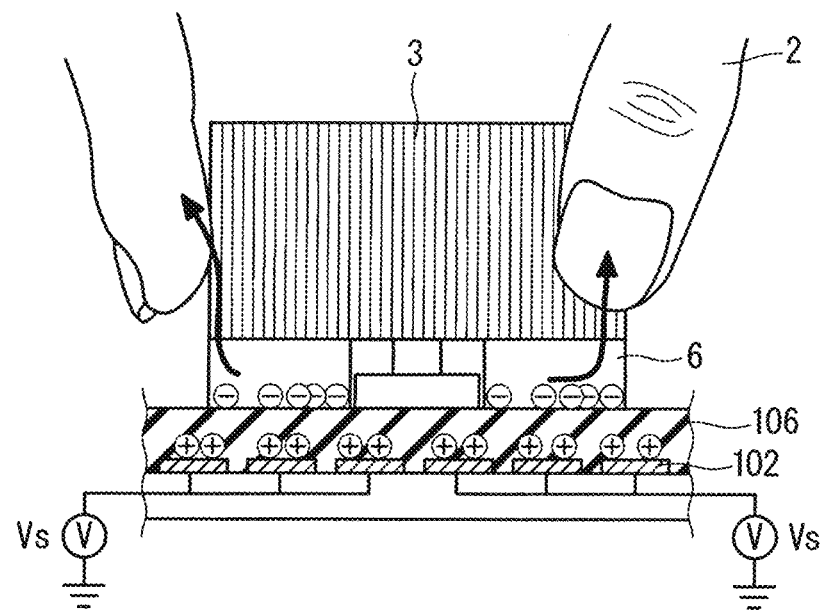

F I G. 4 0
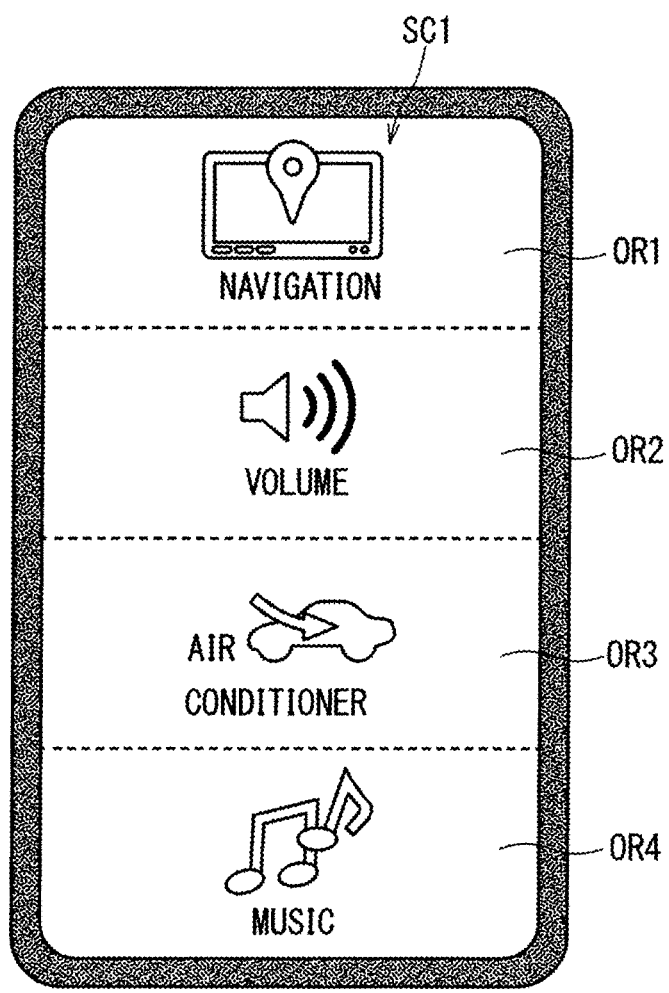

F I G. 4 1
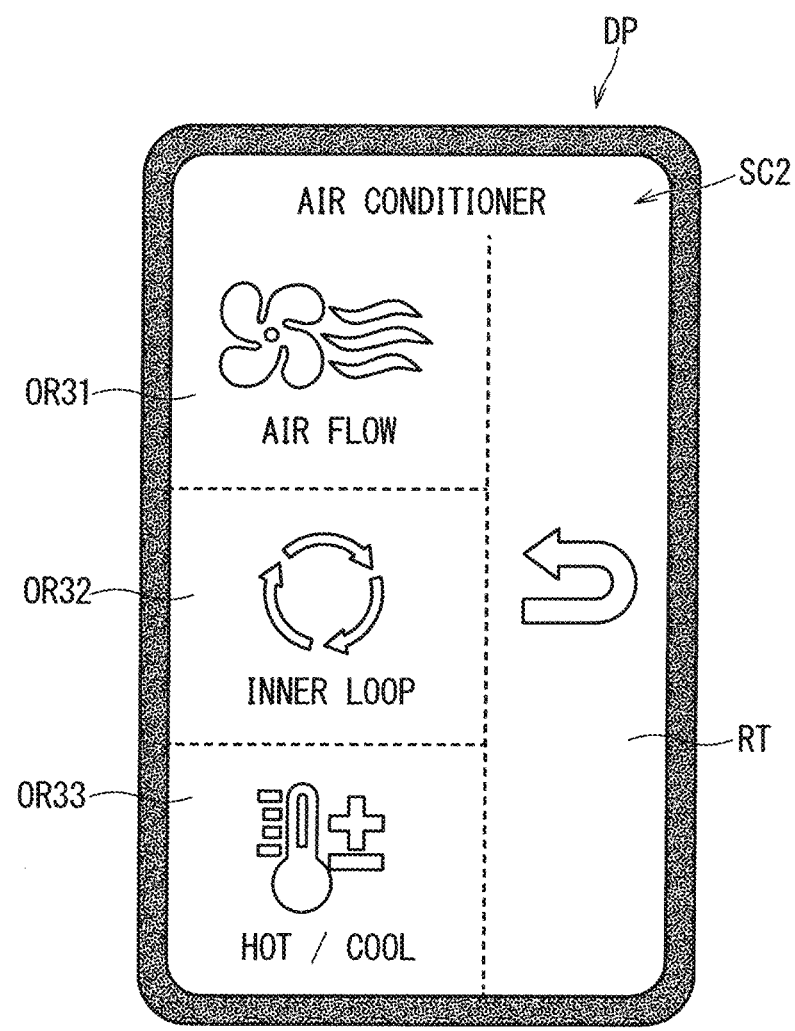

F I G. 4 2
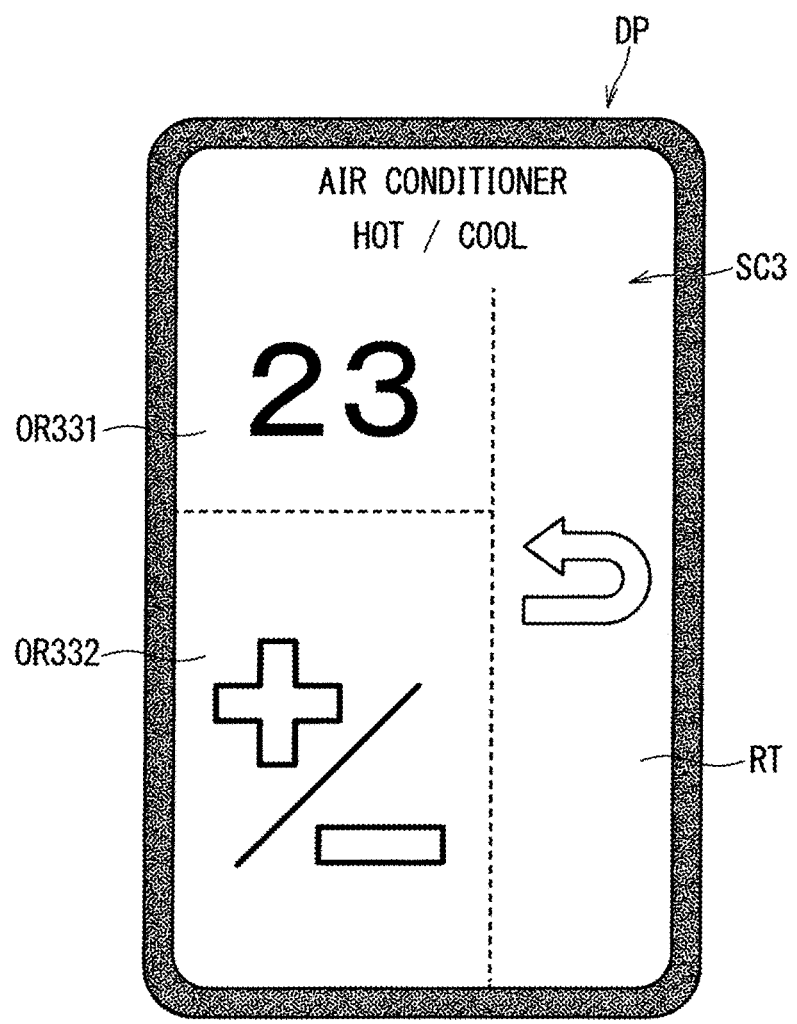

F I G. 4 4
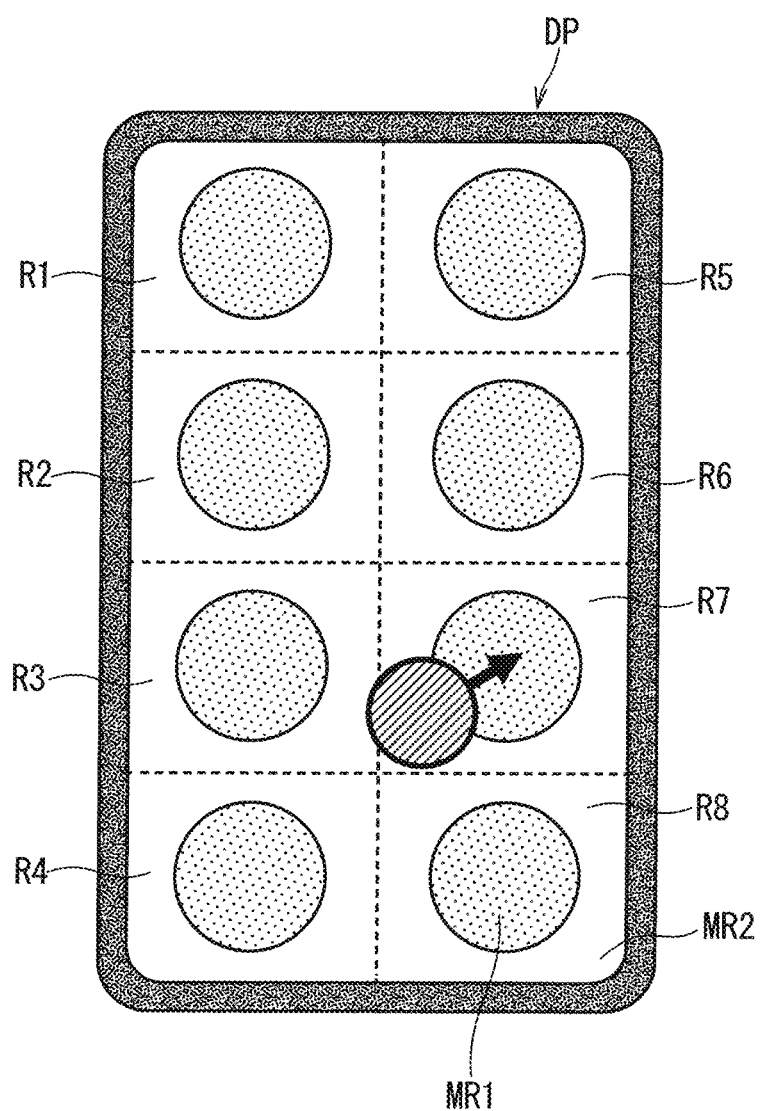

F I G. 5 5
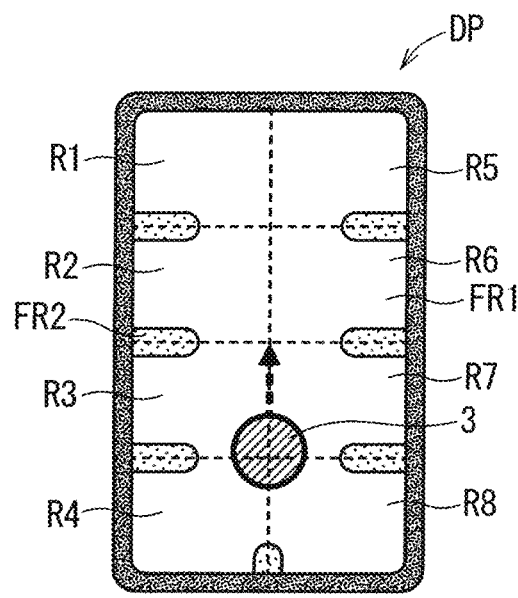
F I G. 5 6
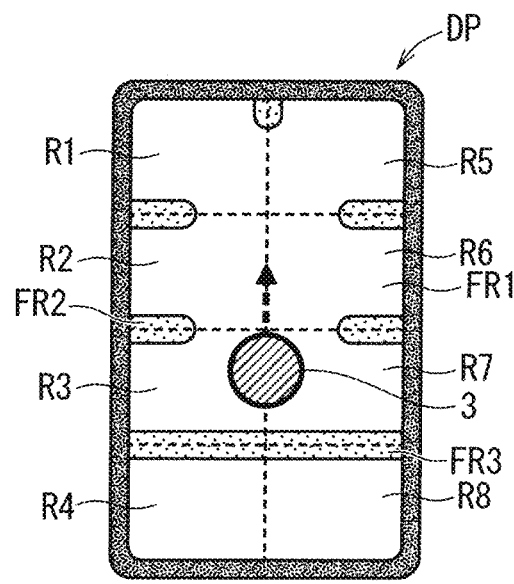

F I G. 5 7
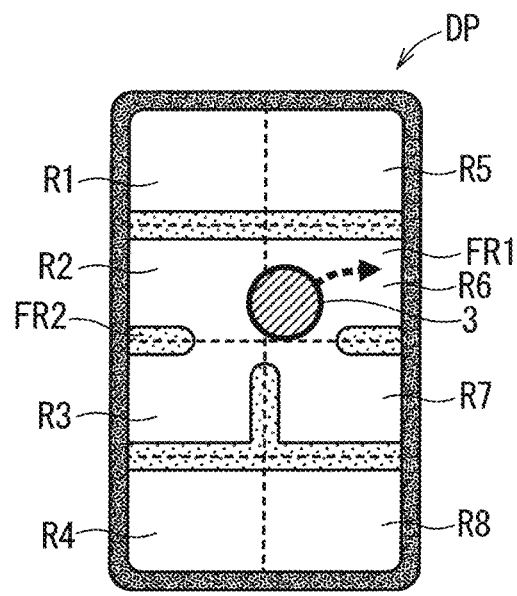
F I G. 5 8
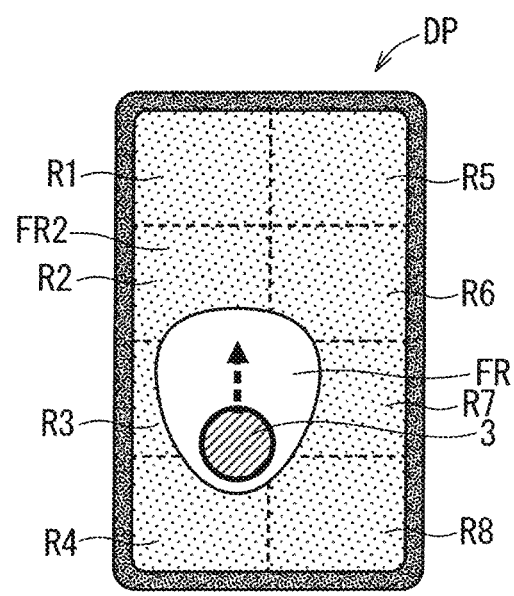

F I G. 6 9
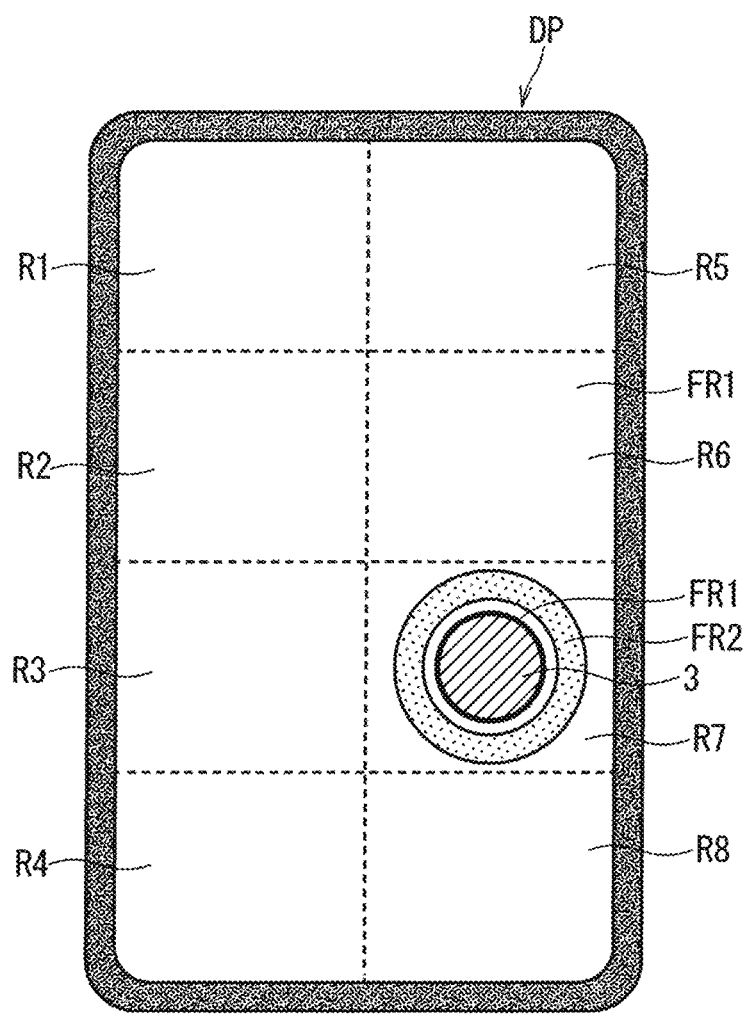

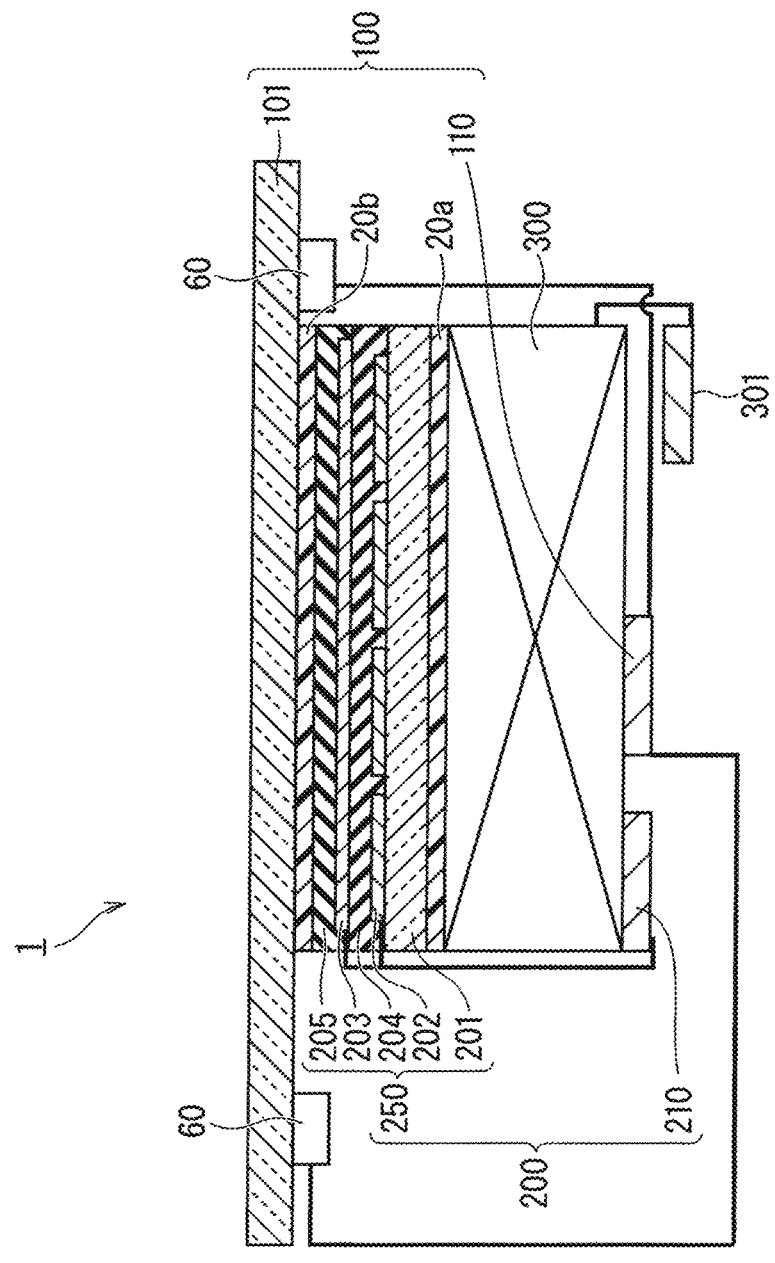

TACTILE PRESENTATION PANEL, TACTILE PRESENTATION TOUCH PANEL, AND TACTILE PRESENTATION TOUCH DISPLAY

CROSS-REFERENCE TO RELATED APPLICATION

The present application is based on PCT filing PCT/JP2020/000105, filed Jan. 7, 2020, the entire contents of which are incorporated herein by reference.

TECHNICAL FIELD

The present disclosure relates to a tactile presentation panel, a tactile presentation touch panel, and a tactile presentation touch display that present a tactile sense to the user via a tactile presentation knob.

BACKGROUND ART

A touch panel is widely known as an apparatus that detects and outputs a position (hereinafter, sometimes referred to as a "touch position") instructed by an indicator such as a finger of the user or a pen on a touch screen, and there is a projected capacitive touch panel (PCAP) as a touch panel using a capacitive sensing system. The PCAP can detect a touch position even in a case where a surface on the user side (hereinafter, sometimes referred to as a "front surface") of a touch screen is covered with a protective plate such as a glass plate having a thickness of about several mm. Further, the PCAP has advantages such as excellent robustness because a protective plate can be arranged on the front surface, and long life because no movable portion is included.

A touch screen of the PCAP includes a detection row direction wiring layer that detects coordinates of a touch position in a row direction and a detection column direction wiring layer that detects coordinates of a touch position in a column direction. In description below, the detection row direction wiring layer and the detection column direction wiring layer may be collectively referred to as a "detection wiring layer".

Further, a member on which the detection wiring layer is arranged is referred to as a "touch screen", and an apparatus in which a detection circuit is connected to the touch screen is referred to as a "touch panel". Furthermore, an area where a touch position can be detected on the touch screen is referred to as a "detectable area".

As the detection wiring layer for detecting electrostatic capacitance (hereinafter, may be simply referred to as "capacitance"), a first series conductor element formed on a thin dielectric film and a second series conductor element formed on the first series conductor element with an insulating film interposed between them are included. There is no electrical contact between the conductor elements, and one of the first series conductor element and the second series conductor element overlaps the other in plan view when viewed from the normal direction of the front surface. However, there is no electrical contact between the conductor elements, and the conductor elements intersect three-dimensionally.

Coordinates of a touch position of an indicator are identified as capacitance (hereinafter, sometimes referred to as "touch capacitance") formed between the indicator and a conductor element which is a detection wiring by a detection circuit. Further, the touch position between conductor elements can be interpolated by a relative value of detected capacitance of one or more conductor elements.

In recent years, a touch panel as an operation panel including a switch or the like has become used for many personal devices instead of a mechanical switch. However, since the touch panel has no unevenness like a mechanical switch and has a uniform touch, a surface shape is not changed by operation. For this reason, it is necessary to perform all the operation processes from position check of a switch to operation execution and operation completion by relying on vision, and there is a problem in reliability of blind operation and operability by a visually handicapped person at the time of operation performed in parallel with other work such as operation of a sound or the like during driving of an automobile.

For example, since a touch panel has become widely used in an in-vehicle device from the viewpoint of designability, it is difficult to operate the in-vehicle device by blind touch during driving, and from the viewpoint of ensuring safety, attention to a touch panel with a function that enables operation by blind touch is increasing. Further, in consumer devices, a touch panel as an operation panel has become used in many home appliances and electronic devices. Furthermore, from the viewpoint of designability, devices equipped with the PCAP whose surface is protected with cover glass are also increasing. However, since the touch panel has a smooth surface, it is difficult to check the position of a switch by touch, and it is difficult to support universal design. In the case of the PCAP, a smooth glass surface is required as design property, and it is difficult to support universal design such as processing unevenness on a glass surface corresponding to a switch position.

As a countermeasure against the above, there is a method of notifying that operation has been accepted and that operation has been completed by voice. However, a function and versatility equivalent to those of a mechanical switch are yet to be achieved, since, for example, an environment in which a voice function can be used is limited due to privacy and noise problems. If there are a function of presenting the position of a switch on the touch panel, a function of receiving operation, and a function of feeding back the completion of operation to the user by tactile sense, it is possible to realize operation by blind touch and support for universal design.

A mobile phone and a smartphone may have a tactile feedback feature using vibration to compensate for operational reliability and non-visual operability. It is expected that a feedback function by vibration in conjunction with operation by the user will rapidly become familiar, and demand for more advanced tactile feedback will increase.

Systems for generating a tactile sense are roughly divided into three types: a vibration system, an ultrasonic system, and an electric system. A feature of the vibration system is that it is possible to coexist with the PCAP and the cost is low. However, the vibration system is unsuitable for incorporation of a vibrator into a housing in a manner that the entire device vibrates sufficiently, and the area cannot be increased due to the limit of output of a vibrator. The ultrasonic system is capable of generating a tactile sense that cannot be generated by other systems, such as a smooth feeling. However, for the same reason as the vibration system, the ultrasonic method is unsuitable for incorporation into a housing, and is disadvantageous in that a large area cannot be obtained. The electric system includes an electrostatic friction system that generates a tactile sense by an electrostatic frictional force and an electric stimulation system that directly applies an electric stimulus to a finger.

These systems can generate a tactile sense at an optional position, and a large area can be obtained and multi-touch can be supported.

Hereinafter, this system will be described. Note that, hereinafter, a member in which a tactile electrode is arranged on a transparent insulating substrate is referred to as a "tactile presentation screen", and an apparatus in which a detection circuit is connected to the tactile presentation screen is referred to as a "tactile presentation panel". Further, an area where a tactile sense can be presented on the tactile presentation screen is referred to as a "tactile presentable area".

Regarding a tactile output device for a rotary knob, for example, in Patent Document 1, a knob corresponding to the rotary knob is attached on a screen of a display apparatus to which a touch panel is attached. The knob can be manually rotated by the user, and a projection is provided on a lower surface. When the user performs rotation operation of the knob, the projection moves while being in contact with a touch surface in accordance with the rotation operation. When the projection moves on the touch surface, the rotation operation of the knob is converted into touch operation. In a case where the user performs rotation operation, an actuator is controlled to vibrate the knob with a waveform corresponding to operation content.

PRIOR ART DOCUMENTS

Patent Documents

Patent Document 1: Japanese Patent No. 6570799

SUMMARY

Problem to be Solved by the Invention

In Patent Document 1, since the knob is attached and fixed onto the screen of the display apparatus to which the touch panel is attached, the user cannot perform rotation operation of the rotary knob at an optional position where the user can easily operate the rotary knob. Further, since a tactile sense is presented to the knob by vibration by the control of the actuator, a tactile sense that can be presented to the knob is limited to a vibration feeling and a click feeling, and an operable range defined by stopping the rotation operation cannot be presented. Furthermore, since a frictional force between the screen of the display apparatus and the rotary knob when there is no tactile sense is always constant, a resistance feeling when the knob is rotated cannot be changed. As described above, there is a problem in Patent Document 1 that it is not possible to provide an operation feeling of a dial knob that allows intuitive operation by a tactile sense of the user, and is user-friendly.

The present disclosure has been made to solve the above problem, and an object of the present disclosure is to provide a tactile presentation panel, a tactile presentation touch panel, and a tactile presentation touch display that can provide an operation feeling of a dial knob that allows intuitive operation by a tactile sense of the user, and is user-friendly.

Means to Solve the Problem

A tactile presentation panel according to the present disclosure is a tactile presentation panel that has a tactile presentation knob placed on an operation surface and presents a tactile sense to a user via the tactile presentation knob, the tactile presentation panel including a control circuit that divides the operation surface into a plurality of regions, assigns a control target to each of divided regions, and sets a tactile sense to be presented for each of the divided regions, a tactile control circuit that generates a tactile sense set by the control circuit for each of the divided regions by changing a frictional force between the operation surface and the tactile presentation knob, and a touch detection circuit that detects a position on the tactile presentation panel of the tactile presentation knob. The tactile presentation knob is placed in the divided region so that the control target is selected, and the tactile presentation knob includes a conductive elastic portion being in contact with the operation surface and a rotation portion made up of a rigid body provided on the conductive elastic portion, and a tactile sense generated by a change of a frictional force generated between the operation surface and the conductive elastic portion is transmitted from the rotation portion to a user.

Further, another tactile presentation panel according to the present disclosure is a tactile presentation panel that has a tactile presentation knob placed on an operation surface and presents a tactile sense to a user via the tactile presentation knob, the tactile presentation panel including a control circuit that sets a tactile sense to be presented, a tactile control circuit that generates a tactile sense set by the control circuit by changing a frictional force between the operation surface and the tactile presentation knob, and a touch detection circuit that detects a position on the tactile presentation panel of the tactile presentation knob. The tactile control circuit sets at least the frictional force on the operation surface to guide the tactile presentation knob to a specific region on the operation surface, and the tactile presentation knob includes a conductive elastic portion being in contact with the operation surface and a rotation portion made up of a rigid body provided on the conductive elastic portion, and a tactile sense generated by a change of a frictional force generated between the operation surface and the conductive elastic portion is transmitted from the rotation portion to a user.

Effects of the Invention

According to the present disclosure, an operation feeling of a dial knob that allows intuitive operation by a tactile sense of the user, and is user-friendly can be provided.

BRIEF DESCRIPTION OF DRAWINGS

FIG. 9 is a partial cross-sectional view taken along line A1-A1 and line A2-A2 in FIG. 8.

FIG. 28 is a block diagram schematically illustrating a configuration of the tactile presentation touch panel of FIG. 1.

FIG. 29 is a schematic diagram for explaining electrostatic capacitance formed in the tactile presentation touch panel in FIG. 1 when the indicator is not in contact with the tactile presentation knob.

FIG. 30 is a timing chart schematically illustrating an operation timing of the tactile presentation touch panel of FIG. 1 when the indicator is not in contact with the tactile presentation knob.

FIG. 31 is a schematic diagram for explaining electrostatic capacitance formed in the tactile presentation touch panel in FIG. 1 when the indicator is in contact with the tactile presentation knob.

FIG. 32 is a timing chart schematically illustrating an operation timing of the tactile presentation touch panel of FIG. 1 when the indicator is in contact with the tactile presentation knob.

FIG. 35 is an image diagram schematically illustrating movement of charges accumulated in the conductive elastic portion when the tactile presentation knob is connected to the ground via the indicator at the time of signal voltage application according to the first embodiment.

FIG. 40 is a diagram illustrating an example of a screen of each layer of operation of the hierarchical structure.

FIG. 41 is a diagram illustrating an example of a screen of each layer of operation of the hierarchical structure.

FIG. 42 is a diagram illustrating an example of a screen of each layer of operation of the hierarchical structure.

FIG. 44 is a diagram that describes operation of moving the tactile presentation knob to select an operation region in the display in a second embodiment.

FIG. 55 is a diagram for explaining a configuration of guiding the tactile presentation knob in the display in a third embodiment.

FIG. 56 is a diagram for explaining a configuration of guiding the tactile presentation knob in the display in the third embodiment.

FIG. 57 is a diagram for explaining a configuration of guiding the tactile presentation knob in the display in the third embodiment.

FIG. 58 is a diagram for explaining a configuration of guiding the tactile presentation knob in the display in the third embodiment.

FIG. 69 is a diagram illustrating a configuration in which displacement of a position of the tactile presentation knob is suppressed by using a frictional force in the display according to the fifth embodiment.

FIG. 70 is a cross-sectional view of the tactile presentation panel according to a sixth embodiment.

DESCRIPTION OF EMBODIMENTS

First Embodiment

<Tactile Presentation Touch Display>

Figure 1:
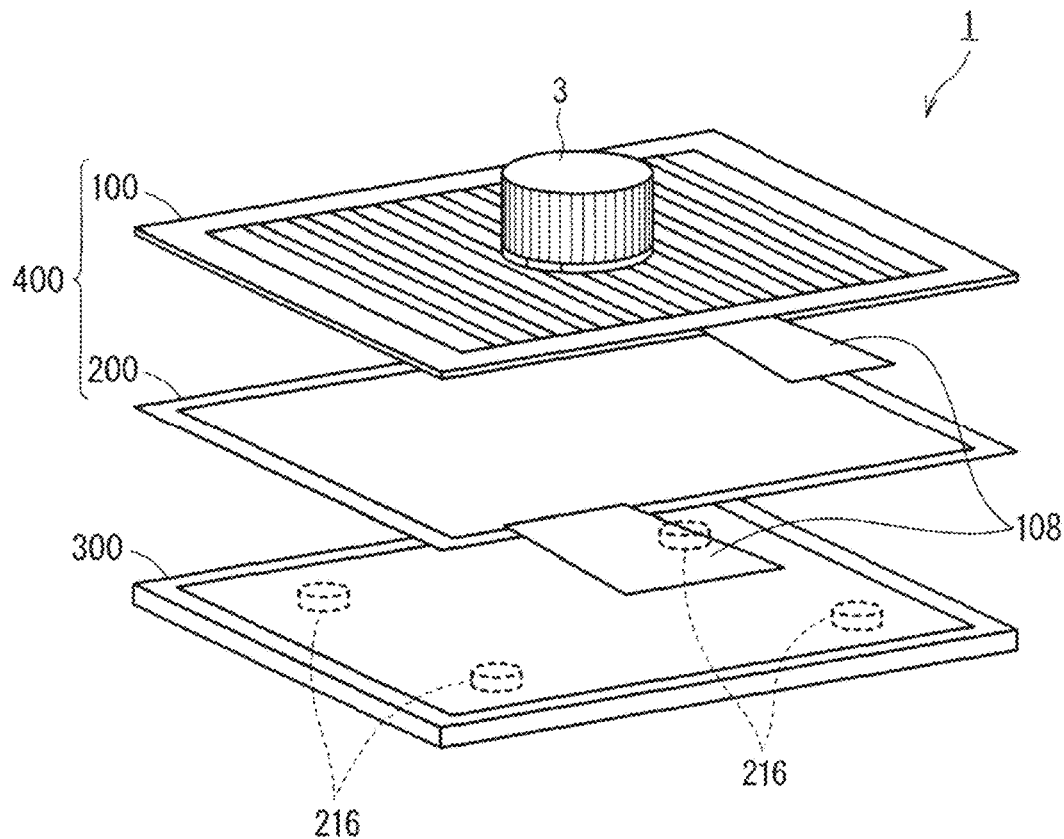
FIG. 1 is an exploded perspective view schematically illustrating a configuration of a tactile presentation touch display according to a first embodiment.
Figure 2:
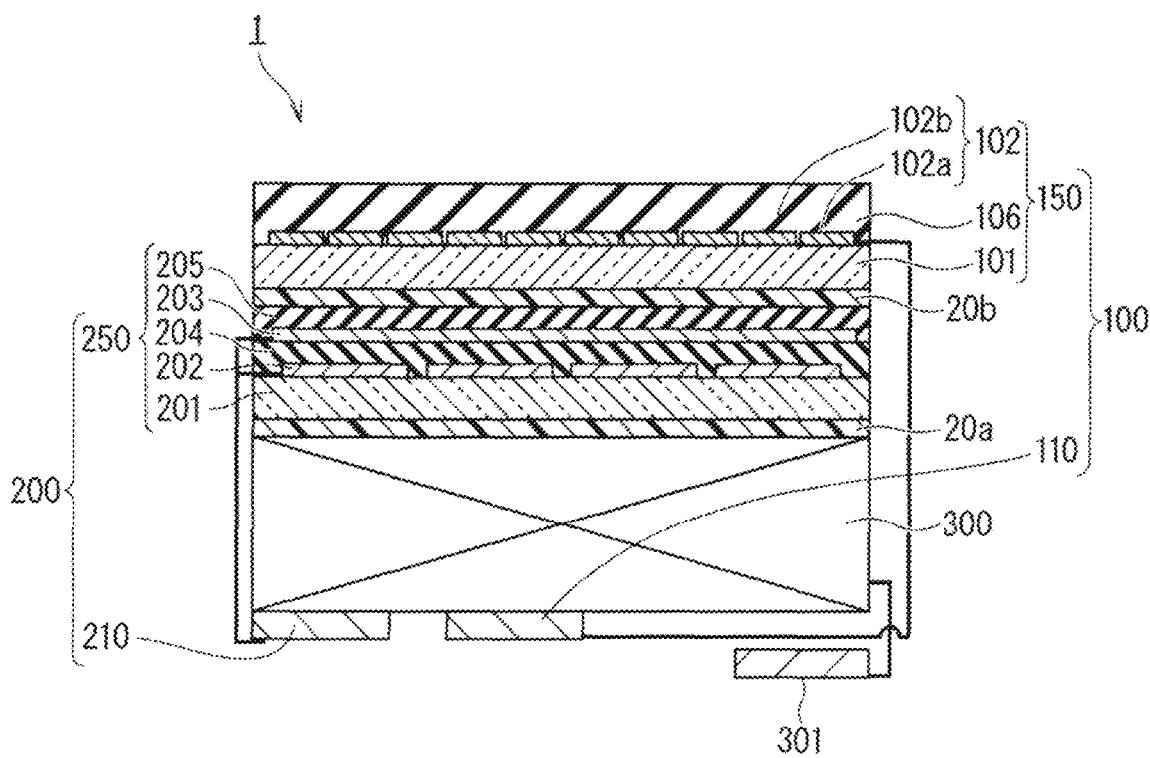
FIG. 2 is a cross-sectional view schematically illustrating a configuration of a tactile presentation touch display of FIG. 1.

FIG. 1 is an exploded perspective view schematically illustrating a configuration of a tactile presentation device in which a tactile presentation knob 3 is placed on a tactile presentation touch display 1 according to a first embodiment to present an operational feeling and a tactile sense of an operation amount. FIG. 2 is a cross-sectional view schematically illustrating a configuration of the tactile presentation touch display 1.

The tactile presentation touch display 1 includes a tactile presentation touch panel 400 and a display panel 300 to which the tactile presentation touch panel 400 is attached. The display panel 300 includes a pressure sensitive sensor 216. The tactile presentation touch panel 400 includes a tactile presentation panel 100 and a touch panel 200. The tactile presentation panel 100 includes a tactile presentation screen 150 and a voltage supply circuit 110. The touch panel 200 includes a touch screen 250 and a touch detection circuit 210.

In the first embodiment, the tactile presentation screen 150 is arranged on the side (front side) facing the user of the tactile presentation touch display 1, and is fixed to a surface (front surface) facing the user of the touch screen 250 by an adhesive material 10b. The touch screen 250 is fixed to a surface (front surface) facing the user of the display panel 300 facing the user by an adhesive material 20a.

The tactile presentation screen 150 includes a transparent insulating substrate 101, a tactile electrode 102, and a dielectric layer 106. The tactile electrode 102 includes a plurality of first electrodes 102a and a plurality of second electrodes 102b alternately arranged at intervals on the transparent insulating substrate 101. The dielectric layer 106 covers a plurality of the first electrodes 102a and a plurality of the second electrodes 102b. The tactile presentation screen 150 is electrically connected to the voltage supply circuit 110 by a flexible print circuit (FPC) 108.

The touch screen 250 includes a substrate 201 that is transparent and has insulating property, an excitation electrode 202, a detection electrode 203, an interlayer insulating layer 204, and an insulating layer 205. The touch screen 250 is electrically connected to the touch detection circuit 210 by the FPC 108. The touch detection circuit 210 detects a touched position on the transparent insulating substrate 101 of tactile presentation screen 150. This enables not only tactile presentation but also touch position detection on the transparent insulating substrate 101. The touch detection circuit 210 includes, for example, a detection integrated circuit (IC) for detecting a change in electrostatic capacitance due to touching and a microcomputer. Details of the configuration of the touch screen 250 will be described later with reference to a specific example.

The display panel 300 includes two transparent insulating substrates facing each other, and a display function layer sandwiched between them and having a display function. The display panel 300 is typically a liquid crystal panel. The display panel 300 may be an organic electro-luminescence (EL) panel, a micro light emitting diode (μLED) panel, or an electronic paper panel. The touch panel 200 is typically a PCAP.

<Outline of Tactile Presentation Panel>

Figure 3:
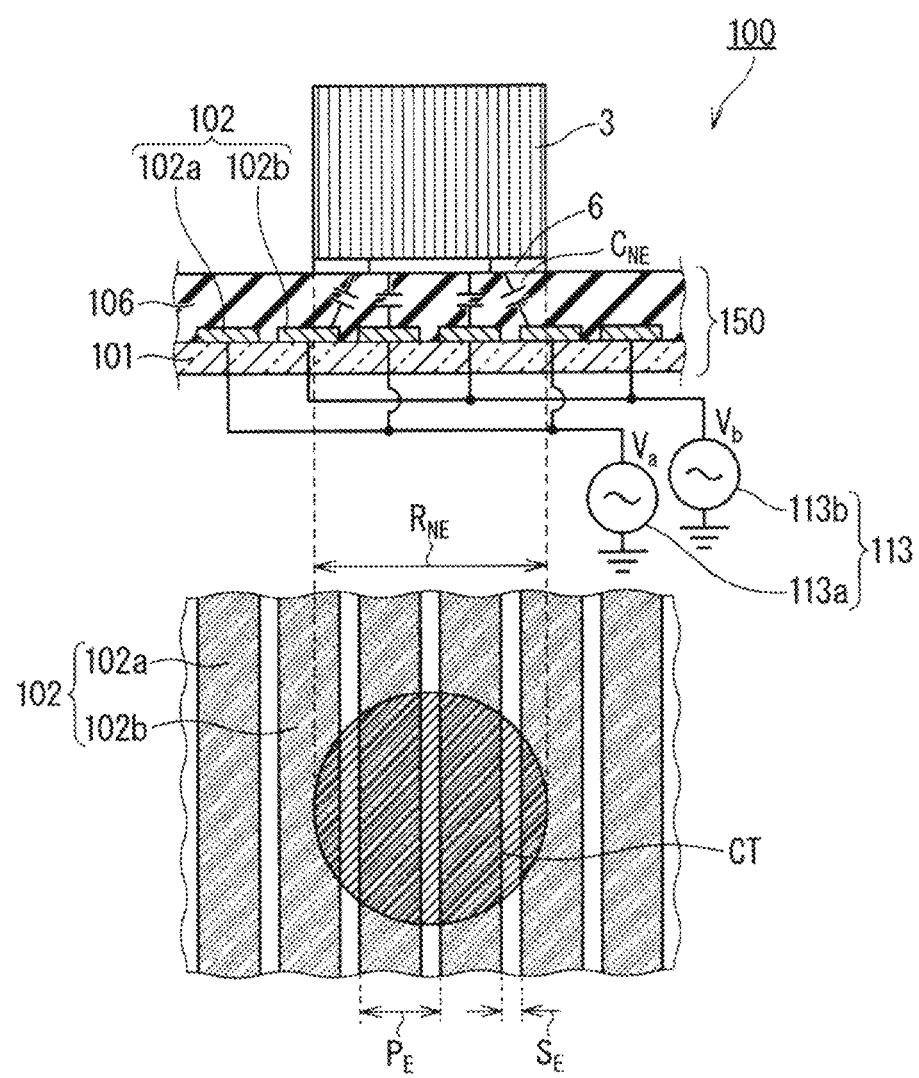
FIG. 3 is a schematic diagram for explaining electrostatic capacitance formed between a tactile electrode and a tactile presentation knob included in a tactile presentation panel in FIG. 2.
Figure 4:
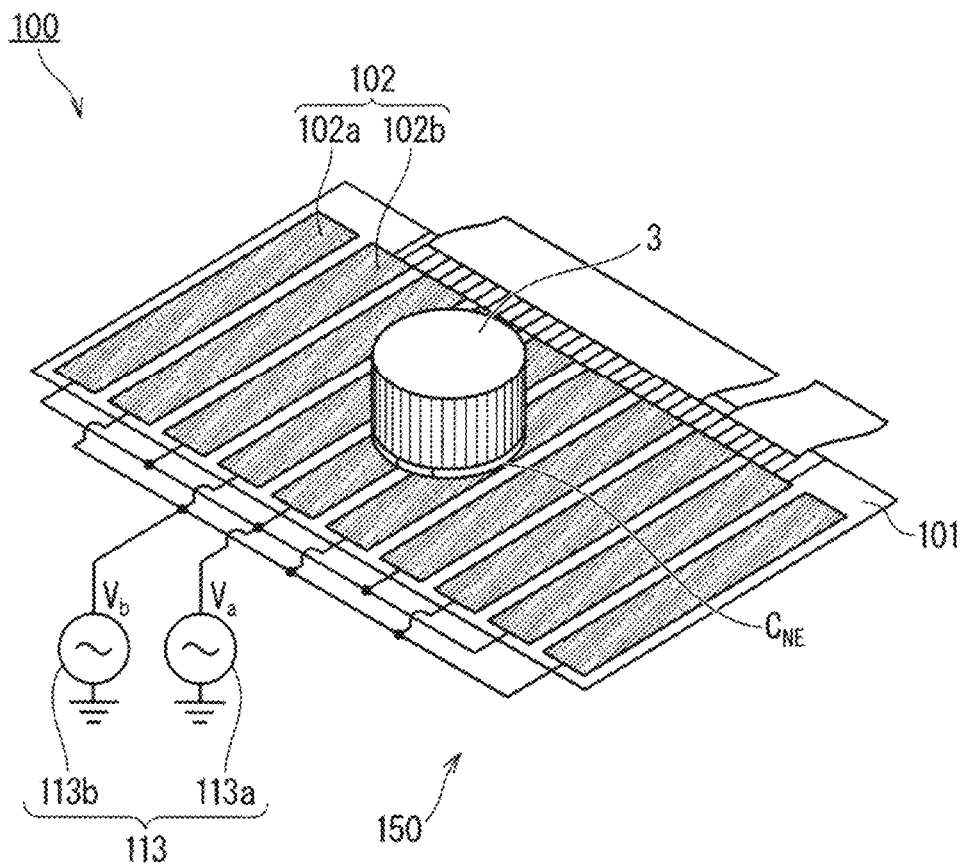
FIG. 4 is a perspective view for explaining electrostatic capacitance formed between the tactile electrode and the tactile presentation knob included in the tactile presentation panel in FIG. 2.

FIG. 3 is a diagram for schematically explaining electrostatic capacitance $C_{FE}$ formed between the tactile electrode 102 and the tactile presentation knob 3 included in the tactile presentation panel 100. FIG. 4 is a perspective view of FIG. 3. When the tactile presentation knob 3 touches a contact surface CT which is a part of the front surface of the tactile presentation screen 150, electrostatic capacitance $C_{NE}$ is formed between the tactile presentation knob 3 and the tactile electrode 102 on the contact surface CT via the dielectric layer 106. Note that, in these diagrams, only a tactile presentation voltage generation circuit 113 included in the voltage supply circuit 110 (see FIG. 2) is illustrated for easy understanding of the diagrams, and other configurations included in the voltage supply circuit 110 are not illustrated. A more specific configuration of the voltage supply circuit 110 will be described later.

The tactile presentation voltage generation circuit 113 included in the voltage supply circuit 110 includes a first voltage generation circuit 113a and a second voltage generation circuit 113b. The first voltage generation circuit 113a applies a voltage signal $V_a$ to the first electrode 102a located on at least a partial region of the transparent insulating substrate 101 among a plurality of the first electrodes 102a, and applies the voltage signal $V_a$ to all the first electrodes 102a located on at least a partial region of the transparent insulating substrate 101 in the first embodiment. The second voltage generation circuit 113b applies a voltage signal $V_b$ to the second electrode 102b located on at least a partial region of the transparent insulating substrate 101 among a plurality of the second electrodes 102b, and applies the voltage signal Vb to all the second electrodes 102b located on at least a partial region of the transparent insulating substrate 101 in the first embodiment.

Figure 5:
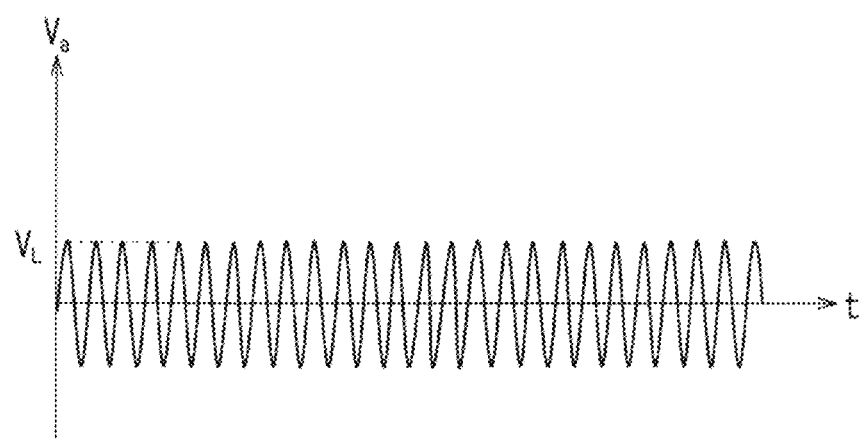
FIG. 5 is a graph illustrating an example of a voltage signal of a first frequency applied to a first electrode of FIG. 2.
Figure 6:
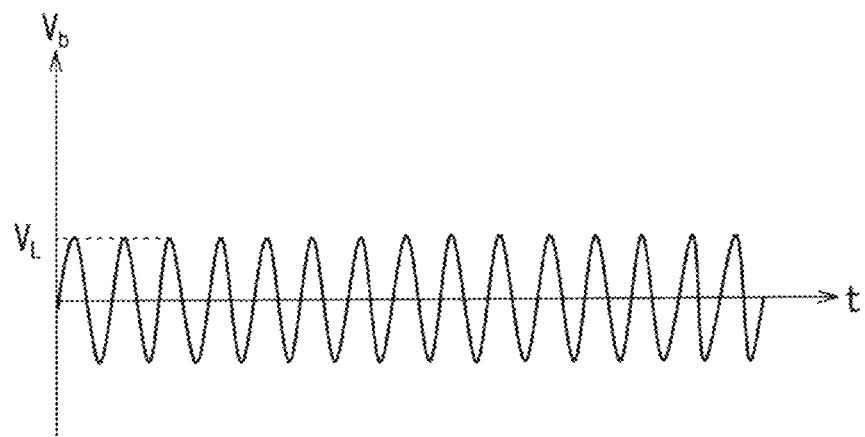
FIG. 6 is a graph illustrating an example of a voltage signal of a second frequency applied to a second electrode of FIG. 2.

Each of FIGS. 5 and 6 is a graph illustrating an example of the voltage signal $V_a$ and the voltage signal $V_b$. The voltage signal $V_a$ (first voltage signal) of the first voltage generation circuit 113a has a first frequency. The voltage signal $V_b$ (second voltage signal) of the second voltage generation circuit 113b has a second frequency different from the first frequency. An amplitude of the voltage signal $V_a$ and an amplitude of the voltage signal $V_b$ may be the same amplitude $V_L$. In the examples of FIGS. 5 and 6, sine waves having different frequencies are used as the voltage signal $V_a$ and the voltage signal $V_b$. Instead of the sine wave, a pulse wave or one having another shape may be used. In order to generate a sufficiently large tactile sense, the amplitude $V_L$ is preferably about several tens of volts.

Figure 7:
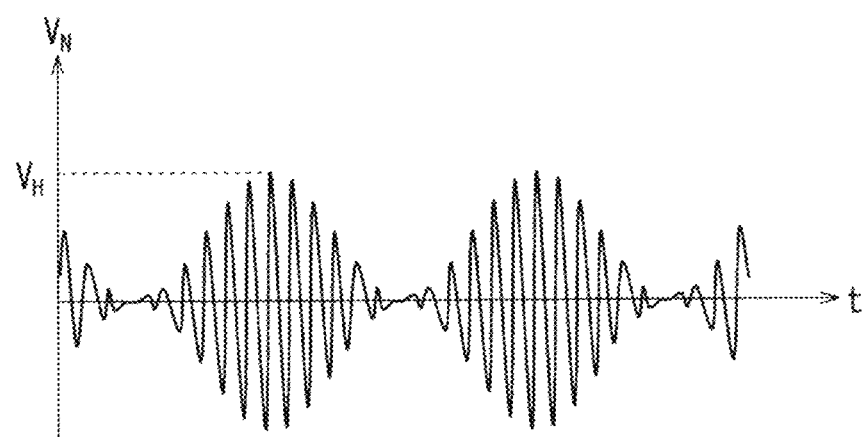
FIG. 7 is a graph illustrating an amplitude modulation signal generated by combining voltage signals of FIGS. 5 and 6.

FIG. 7 is a graph illustrating an amplitude modulation signal $V_N$ generated by combining the voltage signal $V_a$ (see FIG. 5) and the voltage signal $V_b$ (see FIG. 6). The voltage signal $V_a$ is applied to the first electrode 102a, and the voltage signal $V_b$ is applied to the second electrode 102b. As a result, in a region where the electrostatic capacitance $C_{NE}$ (see FIG. 4) is formed between each of the first electrode 102a and the second electrode 102b and the tactile presentation knob 3, charging and discharging are repeated according to the amplitude modulation signal $V_N$ having a maximum amplitude $V_H$ that is approximately twice the amplitude $V_L$. As a result, an electrostatic force corresponding to the amplitude modulation signal $V_N$ having the maximum amplitude $V_H$ is applied to the tactile presentation knob 3 that is in contact with the first electrode 102a and the second electrode 102b via dielectric layer 106. The amplitude modulation signal $V_N$ has a beat frequency corresponding to a difference between the first frequency and the second frequency. Therefore, when the tactile presentation knob 3 rotates on the tactile presentation screen 150, a frictional force acting on the tactile presentation knob 3 changes at the above-described beat frequency. As a result, the tactile presentation knob 3 vibrates at a beat frequency. The user perceives the vibration of the tactile presentation knob 3 as a tactile sense obtained from the tactile presentation screen 150. As described above, the tactile presentation screen 150 included in the tactile presentation panel 100 is configured to generate a tactile sense by changing a frictional force applied to the tactile presentation knob 3 by controlling an electrostatic force applied to the tactile presentation knob 3.

As described above, the amplitude modulation signal $V_N$ having a voltage approximately twice that of each of the input voltage signal $V_a$ (see FIG. 5) and the voltage signal $V_b$ (see FIG. 6) is generated in this manner, the amplitude modulation signal $V_N$ necessary for exerting a desired frictional force on the tactile presentation knob 3 can thus be generated by the voltage signal $V_a$ (see FIG. 5) and the voltage signal $V_b$ (see FIG. 6) having a voltage of approximately ½ of the amplitude modulation signal $V_N$. Therefore, as compared with a case where an amplitude modulation signal is directly input to the first electrode 102a and second electrode 102b, the same electrostatic force can be generated at a voltage of ½, and low-voltage driving can be performed.

In order to present a sufficiently large tactile sense to the user, the maximum amplitude $V_H$ only needs to be sufficiently large in a manner corresponding to the tactile sense, and the amplitude $V_L$ may be a small value as compared with that. Therefore, the amplitude $V_L$ itself does not need to be as large as generating a sufficiently large tactile sense. As a result of the amplitude $V_L$ being set in this way, in a state where only one of the first electrode 102a and the second electrode 102b is in contact with the tactile presentation knob 3, the user hardly perceives a tactile sense regardless of how the frequencies of the voltage signal $V_a$ and the voltage signal $V_b$ are selected.

In order to facilitate positioning of the tactile presentation knob 3 across the first electrode 102a and the second electrode 102b, a pitch $P_E$ of the tactile electrodes 102 is preferably smaller than a diameter $R_{NE}$ of the contact surface CT. This will be described later in detail.

<Touch Panel>

Figure 8:
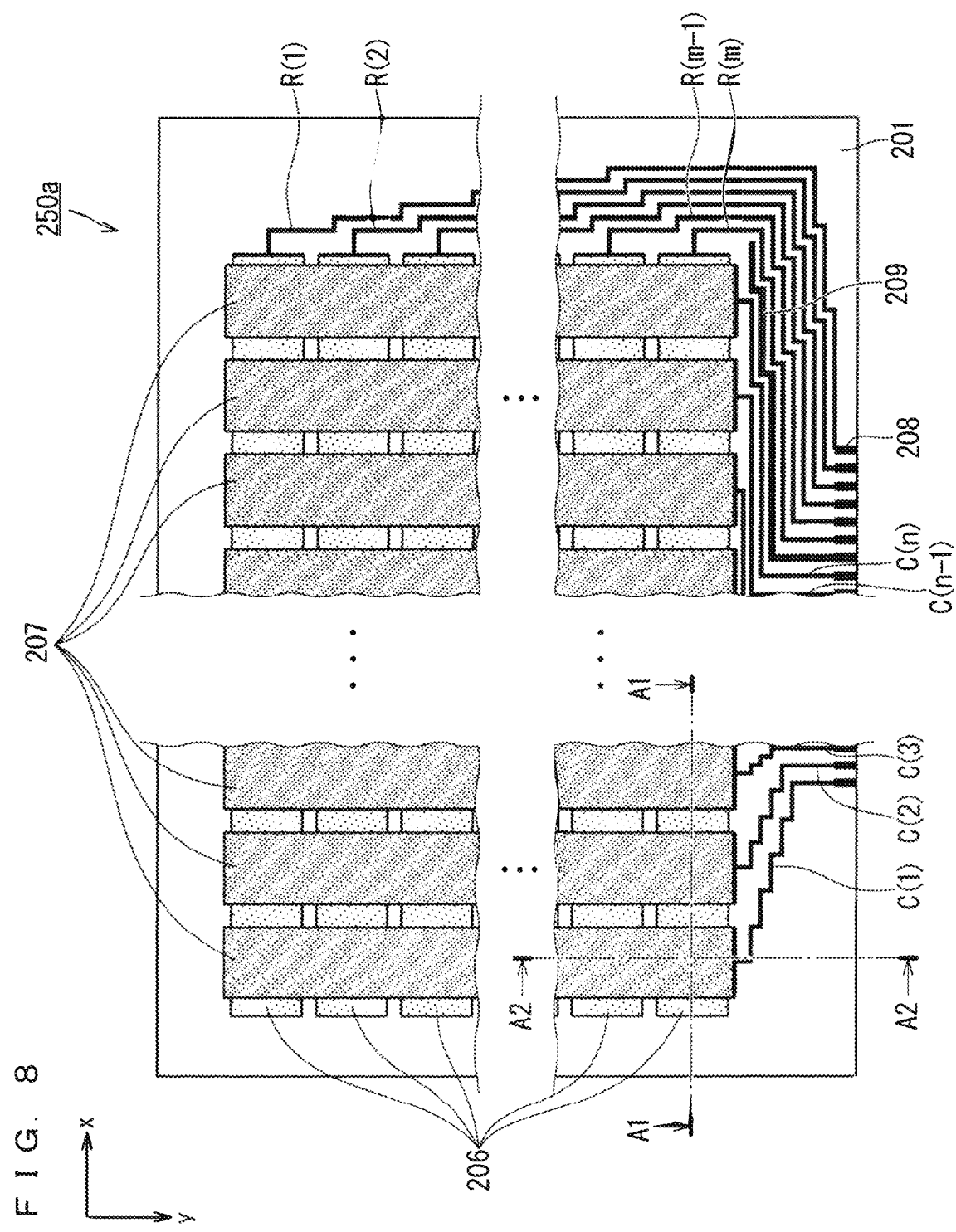
FIG. 8 is a plan view illustrating an example of a touch screen in FIG. 2.

FIG. 8 is a plan view illustrating a touch screen 250a of a capacitive sensing system as an example of the touch screen 250 (see FIG. 2). FIG. 9 is a partial cross-sectional view taken along line A1-A1 and line A2-A2 in FIG. 8.

The touch screen 250a includes a plurality of row direction wiring layers 206 and a plurality of column direction wiring layers 207. Each of the row direction wiring layers 206 includes a plurality of excitation electrodes 202 (see FIG. 2) electrically connected to each other, and each of the column direction wiring layers 207 includes a plurality of detection electrodes 203 (see FIG. 2) electrically connected to each other. In FIGS. 8 and 9, the row direction wiring layer 206 and the column direction wiring layer 207 are illustrated ignoring such a microstructure. The excitation electrode 202 (see FIG. 2) has a single layer film or a multilayer film of metal, or a multilayer structure including any of these and also using another conductive material. As the metal, for example, low resistance metal such as aluminum or silver is preferable. The same applies to the detection electrode 203 (see FIG. 2). By using metal as a wiring material, wiring resistance can be reduced. In contrast, a metal wiring, which is opaque, is easily visually recognized. In order to lower the visibility and increase the transmittance of the touch screen, a thin wire structure is preferably provided to the metal wiring. The thin wire structure is typically mesh-like.

Each of the row direction wiring layers 206 extends along the row direction (x direction in the diagram), and each of the column direction wiring layers 207 extends along the column direction (y direction in the diagram). A plurality of the row direction wiring layers 206 are arranged at intervals in the column direction, and a plurality of the column direction wiring layers 207 are arranged at intervals in the row direction. As illustrated in FIG. 8, in plan view, each of the row direction wiring layers 206 intersects a plurality of the column direction wiring layers 207, and each of the column direction wiring layers 207 intersects a plurality of the row direction wiring layers 206. The row direction wiring layer 206 and the column direction wiring layer 207 are insulated by the interlayer insulating layer 204.

The interlayer insulating layer 204 includes a single-layer film of an organic insulating film, a single-layer film of an inorganic insulating film, or a multilayer film. An inorganic insulating film is excellent for improving moisture resistance, and an organic insulating film is excellent for improving flatness. As the inorganic insulating film, for example, a transparent silicon-based inorganic insulating film such as a silicon oxide film, a silicon nitride film, or a silicon oxynitride film, or a transparent inorganic insulating film composed of a metal oxide such as alumina is used. As a material of the organic insulating film, a polymer material having a main chain composed of a silicon oxide, a silicon nitride film, or a silicon oxynitride film and having an organic substance bonded to a side chain or a functional group of the main chain, or thermosetting resin having a main chain composed of carbon can be used. Examples of the thermosetting resin include acrylic resin, polyimide resin, epoxy resin, novolak resin, and olefin resin.

Each of the row direction wiring layers 206 of the touch screen 250a is connected to a touch screen terminal portion 208 by lead-out wiring layers R(1) to R(m). Each of the column direction wiring layers 207 is connected to the touch screen terminal portion 208 by lead-out wiring layers C(1) to C(n). The touch screen terminal portion 208 is provided on an end portion of the substrate 201.

The lead-out wiring layers R(1) to R(m) are arranged outside a detectable area, and extend to corresponding electrodes in order from a layer closer to the center of the arrangement of the touch screen terminal portions 208 so as to obtain a substantially shortest distance. The lead-out wiring layers R(1) to R(m) are arranged as densely as possible while securing mutual insulation. The same applies to the lead-out wiring layers C(1) to C(n). With such arrangement, it is possible to suppress an area of a portion outside the detectable area of the substrate 201.

A shield wiring layer 209 may be provided between a group of the lead-out wiring layers R(1) to R(m) and a group of the lead-out wiring layers C(1) to C(n). In this manner, generation of noise in one of the groups due to the influence from the other is suppressed. Further, the influence of electromagnetic noise generated from the display panel 300 (see FIG. 2) on the lead-out wiring layer can be reduced. The shield wiring layer 209 may be formed of the same material as the row direction wiring layer 206 or the column direction wiring layer 207 at the same time.

The insulating layer 205 is provided on the substrate 201 so that the touch screen terminal portion 208 is exposed, and covers the row direction wiring layer 206, the column direction wiring layer 207, and the interlayer insulating layer 204. The insulating layer 205 can be formed of the same material as the interlayer insulating layer 204. In a case where the display panel 300 is a liquid crystal panel, an upper polarizing plate subjected to anti-glare treatment for the liquid crystal panel may be attached onto a portion through which light for display is transmitted of the insulating layer 205.

Figure 10:
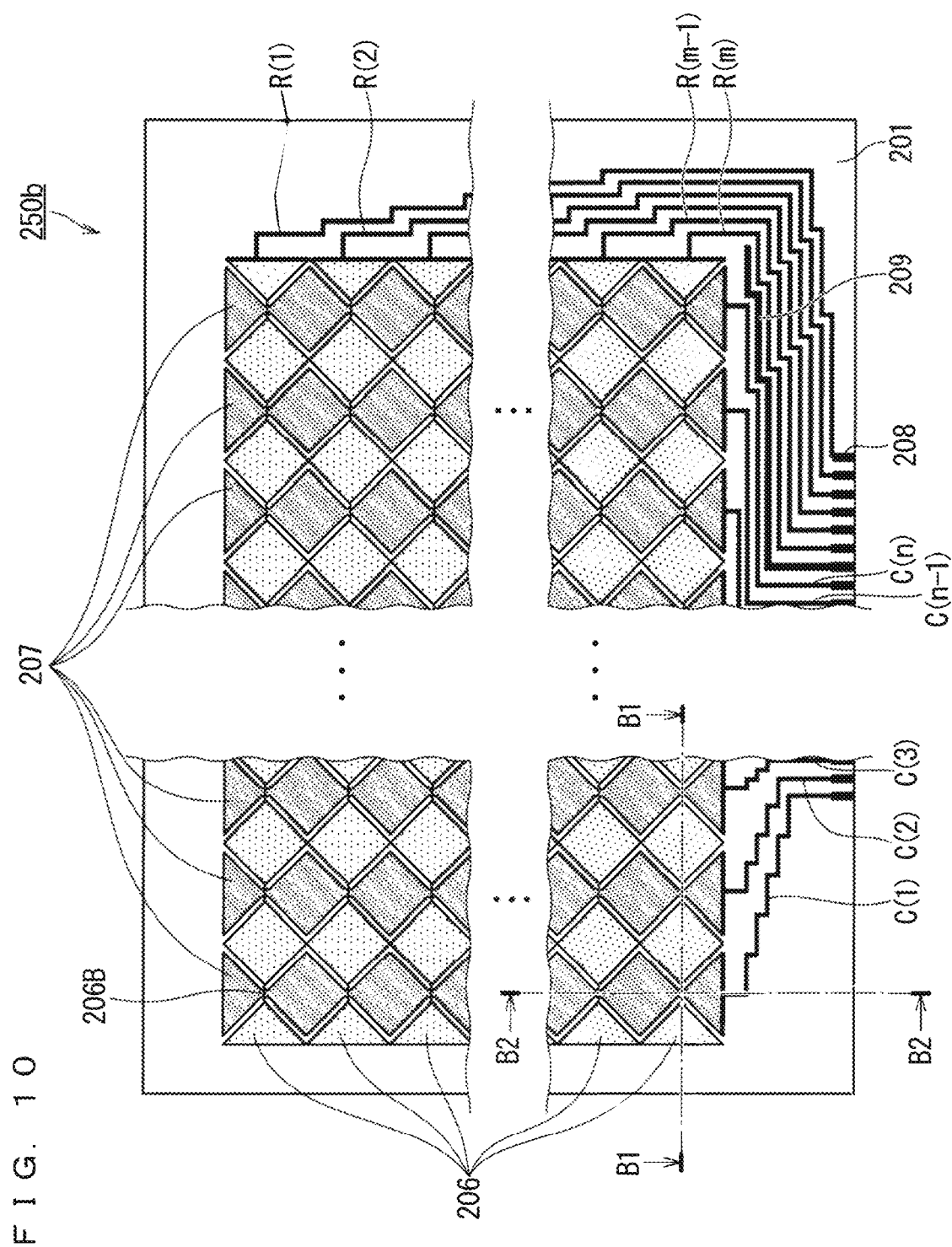
FIG. 10 is a plan view illustrating an example of the touch screen in FIG. 2.
Figure 11:
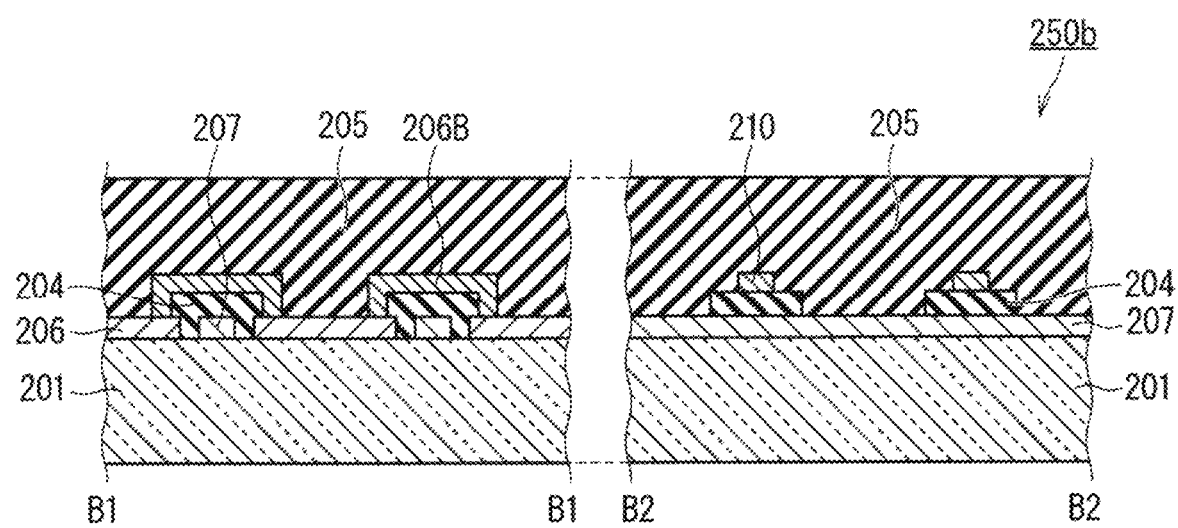
FIG. 11 is a partial cross-sectional view taken along line B1-B1 and line B2-B2 in FIG. 10.

FIG. 10 is a plan view illustrating a touch screen 250b of a capacitive sensing system as an example of the touch screen 250 (see FIG. 2). FIG. 11 is a partial cross-sectional view taken along line B1-B1 and line B2-B2 in FIG. 10. In the example of FIGS. 10 and 11, what is called a diamond structure is employed.

The row direction wiring layer 206 and the column direction wiring layer 207 are arranged on the same layer. Each of the column direction wiring layers 207 has a plurality of diamond-shaped electrodes connected to each other as the detection electrode 203. The row direction wiring layer 206 includes, as the excitation electrode 202, a plurality of diamond-shaped electrodes separated from each other, and a bridge 206B electrically connecting adjacent diamond-shaped electrodes. The interlayer insulating layer 204 is arranged so as to insulate the bridge 206B from the column direction wiring layer 207. Note that a bridge structure may be applied not to the row direction wiring layer but to the column direction wiring layer. Since electrical resistance of the wiring layer tends to become high as a bridge is formed, the bridge structure is preferably applied to a shorter one of the column direction wiring layer and the row direction wiring layer.

As a material of the row direction wiring layer 206 and the column direction wiring layer 207, for example, a transparent conductive film such as indium tin oxide (ITO) is used. Since ITO has translucency, the wiring layer is less likely to be visually recognized by the user. Since a transparent conductive film such as ITO has a relatively high electric resistance, the transparent conductive film is suitable for application to a small touch screen in which wiring resistance is not a problem. Further, since a transparent conductive film such as ITO is likely to have a wiring disconnected due to corrosion with another metal wiring, consideration for moisture resistance and waterproofness is required in order to prevent corrosion.

Note that, although the case where the structure of the touch screen and the structure of the display panel are independent is described above, they may be inseparably integrated. For example, in the case of what is called an on-cell touch panel, a touch screen is directly formed on a substrate (typically, a color filter substrate) of the display panel 300 without using the substrate 201. In a case of what is called an in-cell touch panel, a touch screen is formed between two transparent insulating substrates (not illustrated) included in the display panel 300.

Figure 12:
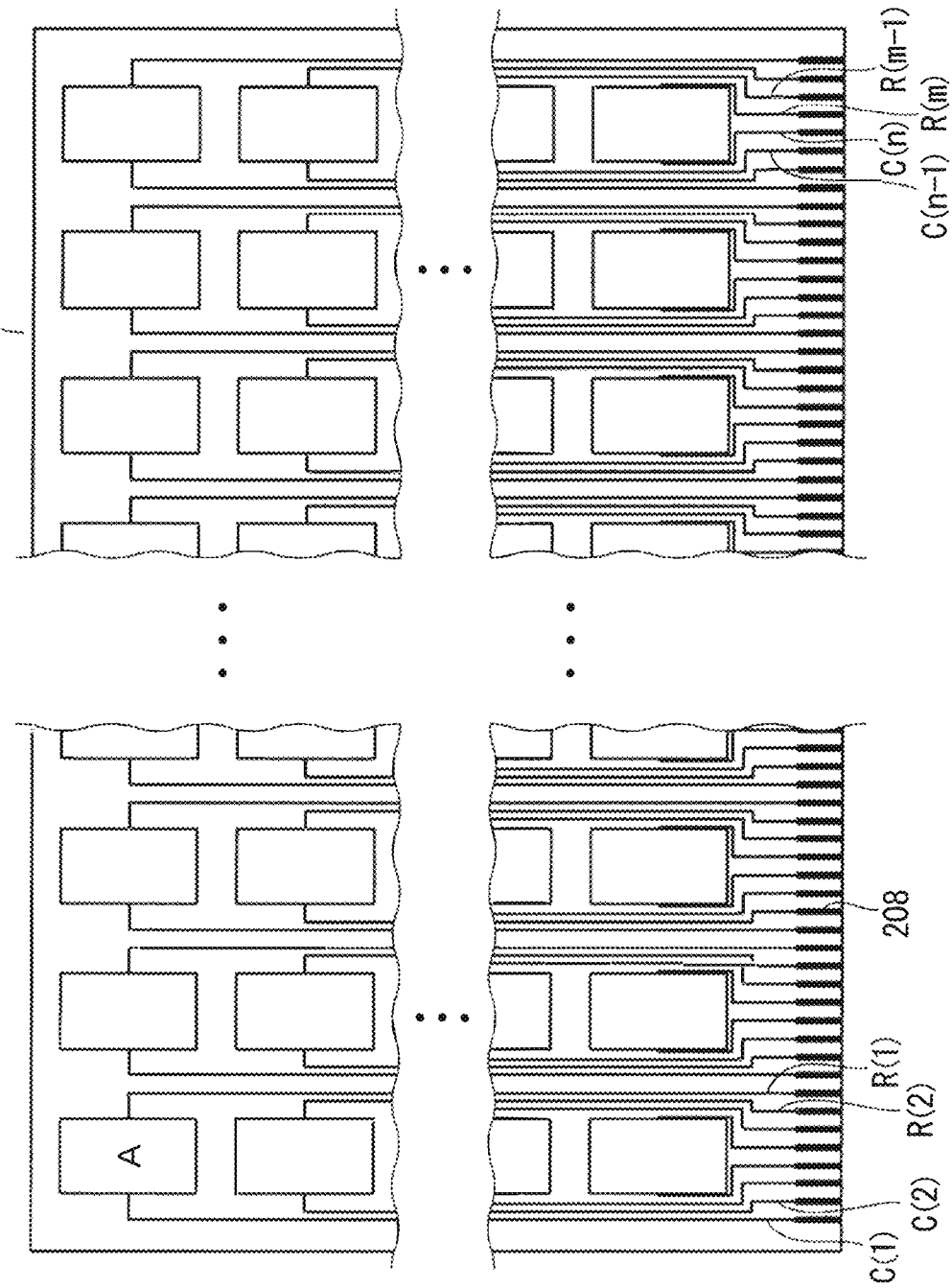
FIG. 12 is a plan view schematically illustrating a configuration of a touch panel having a segment structure according to the first embodiment.
Figure 13:
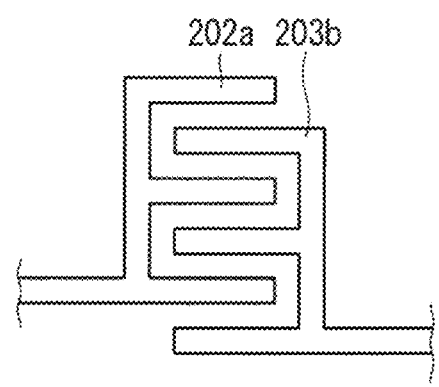
FIG. 13 is a plan view schematically illustrating an example of shapes of a detection electrode and an excitation electrode of the touch panel having a segment structure according to the first embodiment.
Figure 14:
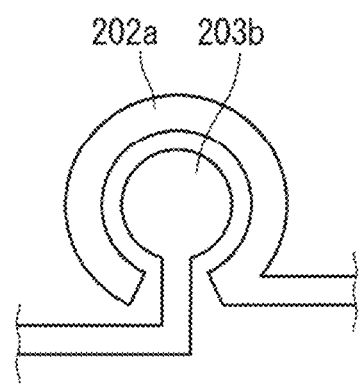
FIG. 14 is a plan view schematically illustrating an example of shapes of a detection electrode and an excitation electrode of the touch panel having a segment structure according to the first embodiment.

Further, in the above touch screen, the detection structure including the row direction wiring layer 206 and the column direction wiring layer 207 has been described. However, the present invention is not limited to this structure. For example, FIG. 12 is a plan view schematically illustrating a configuration of a touch screen 250c having a detection structure in which segments each including a detection electrode and an excitation electrode are arranged in a matrix. FIGS. 13 and 14 illustrate an example of pattern shapes of an excitation electrode 202a and a detection electrode 203b arranged in a segment of an area A in FIG. 12. The touch screen 250c having a segment structure in which segments each including a set of the excitation electrode 202a and the detection electrode 203b as illustrated in FIGS. 13 and 14 are arranged in a matrix and individually driven is used. Both a tactile presentation panel 100a and the touch panel 200 can also be used by switching switches in a drive circuit.

<Pressure Sensitive Sensor>

The pressure sensitive sensor 216 illustrated in FIG. 1 will be described. In general, the pressure sensitive sensor 216 includes a system of detecting a pressure applied to a diaphragm (barrier membrane) made from semiconductor silicon (Si) as deformation of a film, an electrostatic capacitance system of detecting deformation of a display panel, a touch panel, or the like generated according to a pressing force by a change in electrostatic capacitance, a resistance system of detecting a resistance change of a metal wire due to strain according to a pressing force, and the like.

In the case of the electrostatic capacitance system, for example, the pressure sensitive sensors 216 are installed at four symmetrical positions on a diagonal line on a surface opposite to a display surface of the display panel 300. In this case, when an operation surface of the tactile presentation touch display 1 is pressed by the tactile presentation knob 3, the tactile presentation touch display 1 is bent in a direction on the opposite surface side to the operation surface by the pressing force, or the tactile presentation touch display 1 slightly moves in a planar direction opposite to the operation surface. The pressure sensitive sensor 216 detects the pressing force by detecting a change in electrostatic capacitance generated as an interval between the capacitance detection electrodes arranged in the pressure sensitive sensor 216 becomes small. Each of the capacitance detection electrodes in the pressure sensitive sensor 216 is parallel to the operation surface of the tactile presentation touch display 1 and is installed at an optional interval.

Even in the case of a system other than the electrostatic capacitance system, a shape change due to a pressing force of any of members constituting the tactile presentation touch display 1 is detected so that the pressing force is detected.

Note that, in FIG. 1, the pressure sensitive sensor 216 is arranged on the lower side (the side opposite to the display surface) of the display panel 300. However, the present disclosure is not limited to this configuration. The pressure sensitive sensor 216 is preferably arranged at a position where reproducibility of a relationship between a shape change and a pressing force in the structure of the tactile presentation touch display 1 is excellent, a shape change caused by a pressing force is large, and the sensitivity of the pressure sensitive sensor 216 is most excellent. Note that, instead of the pressure sensitive sensor 216, for example, a sheet-like pressure sensor in which sensors are arranged in a matrix may be arranged on a back surface of the display panel 300. Further, the present disclosure is not limited to this, and a pressure sensor of an optimum system for detection can be arranged.

<Tactile Presentation Panel>

Figure 15:
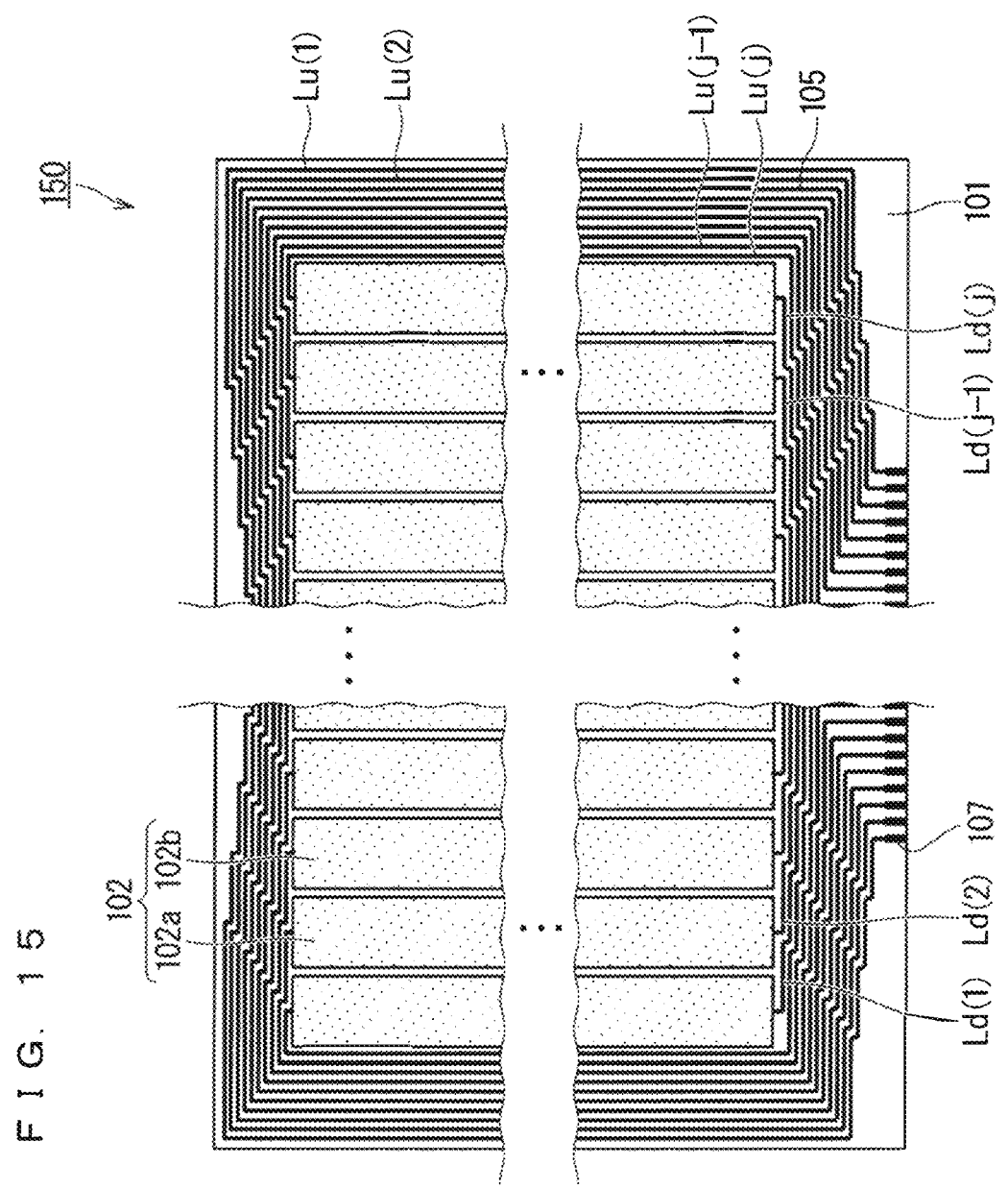
FIG. 15 is a plan view schematically illustrating a configuration of a tactile presentation screen of FIG. 2.
Figure 16:
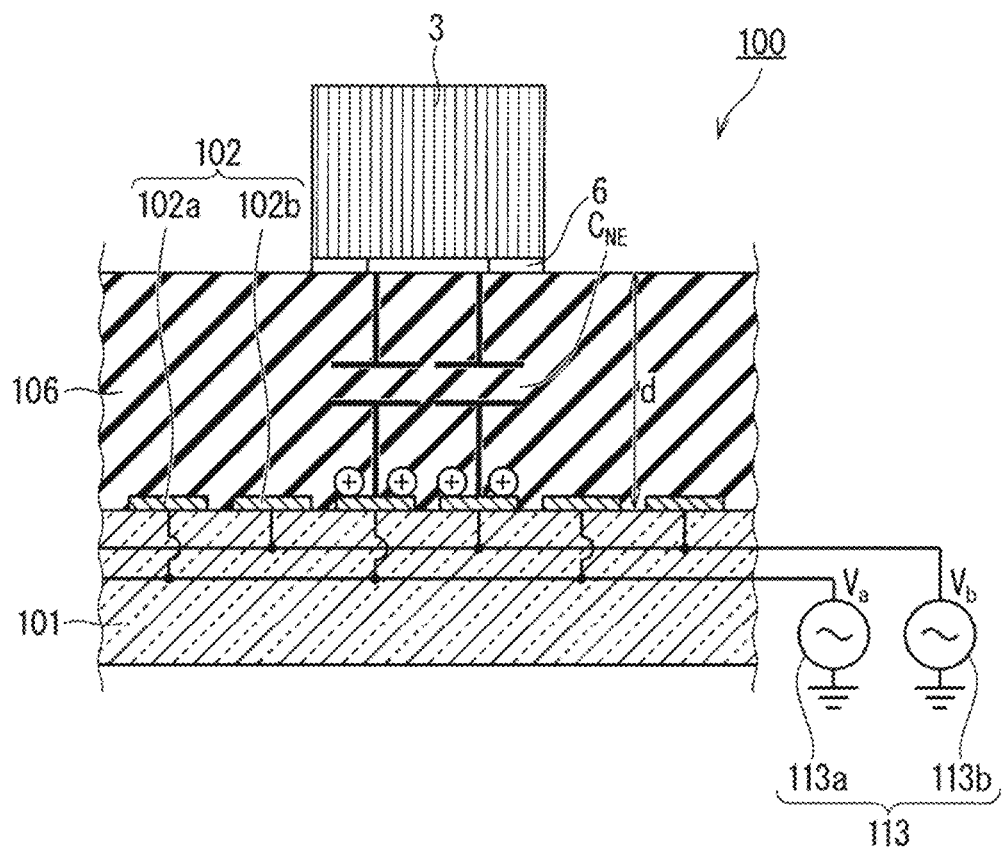
FIG. 16 is a schematic diagram for explaining electrostatic capacitance formed between the tactile electrode and an indicator included in the tactile presentation panel in FIG. 2.

FIG. 15 is a plan view schematically illustrating a configuration of the tactile presentation screen 150. FIG. 16 is a schematic diagram illustrating formation of the electrostatic capacitance $C_{NE}$ between the tactile electrode 102 and the tactile presentation knob 3.

As described above, the tactile presentation screen 150 includes the transparent insulating substrate 101, the tactile electrode 102, and the dielectric layer 106. Furthermore, a tactile presentation panel terminal portion 107 is provided in an end portion of the transparent insulating substrate 101, and a plurality of lead-out wiring layers 105 are arranged on the transparent insulating substrate. The dielectric layer 106 is provided such that the tactile presentation panel terminal portion 107 is exposed. The tactile electrode 102 is connected to the tactile presentation panel terminal portion 107 via the lead-out wiring layer 105. The voltage supply circuit 110 (see FIG. 2) is connected to the tactile presentation panel terminal portion 107 via the FPC 108 (see FIG. 1). Note that details of the lead-out wiring layer 105 will be described later.

Each of the tactile electrodes 102 extends along the extending direction (longitudinal direction in FIG. 15). A plurality of the tactile electrodes 102 are arranged at intervals along the arrangement direction (lateral direction in FIG. 15). In the example of FIG. 15, the transparent insulating substrate 101 has a rectangular shape having long sides and short sides. Therefore, the tactile presentation screen 150 also has long sides and short sides corresponding to the transparent insulating substrate 101. In the example of FIG. 12, the arrangement direction is along the long side. In a case where the horizontal direction of the tactile presentation screen 150 as viewed by the viewer is along the long side, the arrangement direction is along the horizontal direction.

Figure 17:
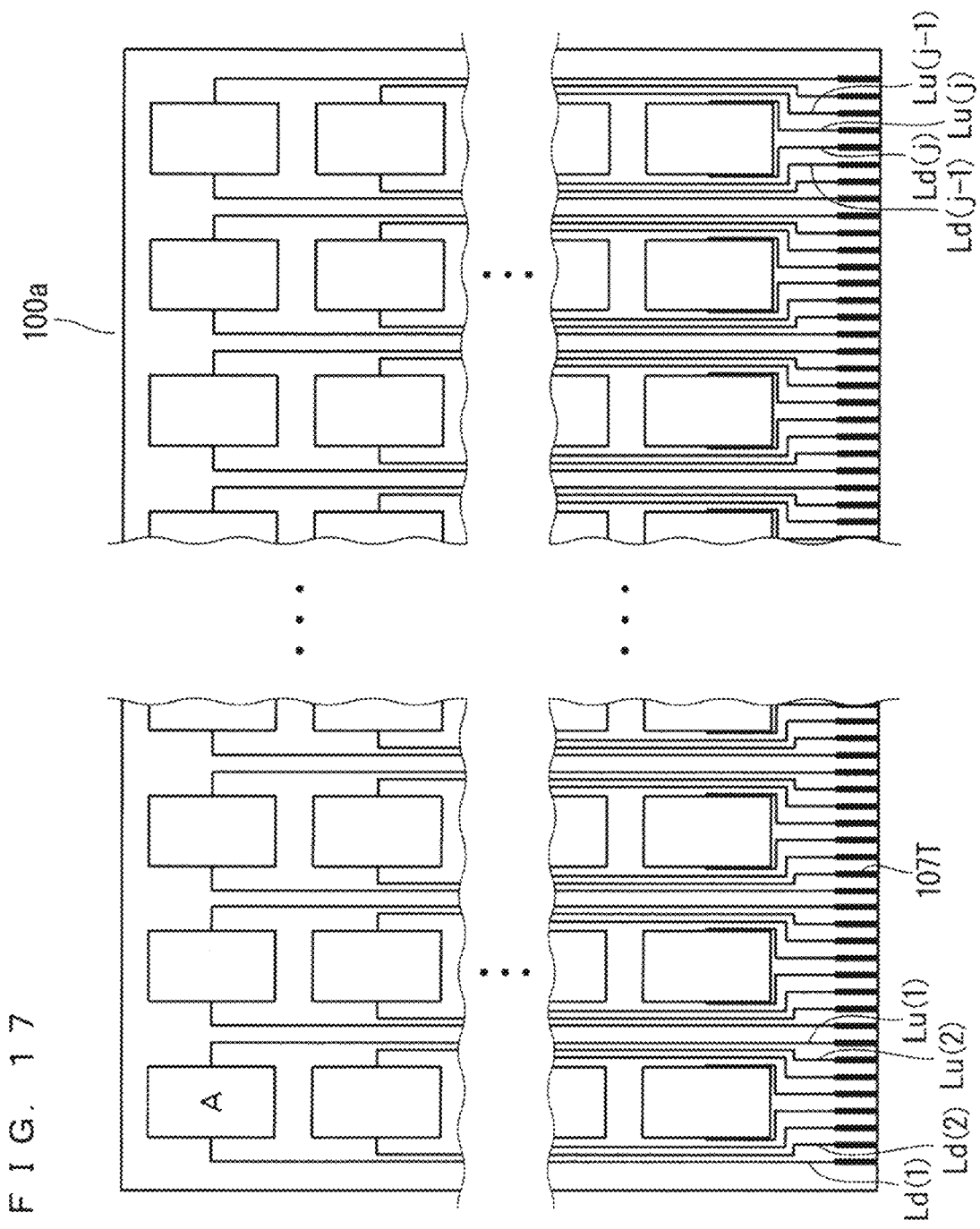
FIG. 17 is a plan view schematically illustrating a configuration of the tactile presentation panel having a segment structure according to the first embodiment.
Figure 18:
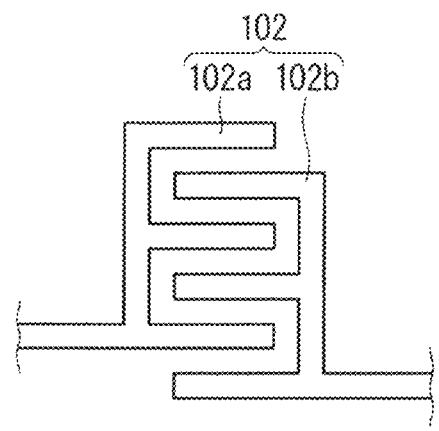
FIG. 18 is a plan view schematically illustrating an example of a shape of the tactile electrode of the tactile presentation panel having a segment structure according to the first embodiment.
Figure 19:
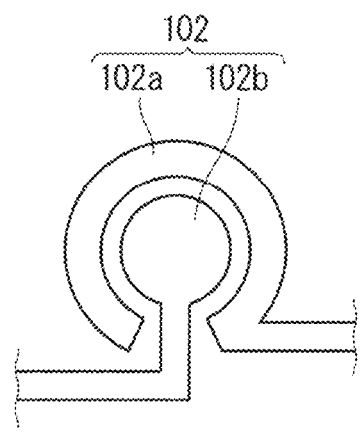
FIG. 19 is a plan view schematically illustrating an example of a shape of the tactile electrode of the tactile presentation panel having a segment structure according to the first embodiment.

Although the example in which the tactile electrodes 102 extend in the extending direction and are arranged along the arrangement direction on the tactile presentation screen 150 is described above, the structure of the tactile electrodes 102 is not limited to this. For example, the configuration may be such that a plurality of segments are arranged in a matrix like the tactile presentation panel 100a illustrated in FIG. 17. FIGS. 18 and 19 illustrate an example of a pattern shape of the tactile electrodes 102 arranged in a segment of an area A in FIG. 17. The shape of the tactile electrode 102 is not limited to the shape illustrated in FIGS. 18 and 19, and may be any structure in which mutual capacitance in the same area is larger than mutual capacitance between electrodes in different areas in a structure in which the first electrode 102a and the second electrode 102b are adjacent to each other. Specifically, the first electrode 102a and the second electrode 102b in the same area are preferably arranged such that a distance between the first electrode 102a and the second electrode 102b is smaller than a distance between the first electrode 102a and the second electrode 102b different areas. In this manner, the influence of capacitance formed between the detection electrode 203 of the touch panel 200 and the tactile electrode 102 on touch detection accuracy can be suppressed, so that wiring resistance of the tactile electrode 102 can be further reduced, and tactile strength (tactile sense) can be further improved.

The larger the electrostatic capacitance $C_{NE}$ formed between the tactile electrode 102 and the tactile presentation knob 3 is, the stronger a tactile sense can be presented. From this viewpoint, it is preferable that the area of the tactile electrode 102 is large. In a case where priority is given to the size of the area of the tactile electrode 102, it is difficult to make the tactile electrode 102 less likely to be visually recognized by providing a microstructure to the tactile electrode 102. In order to make the tactile electrode 102 less likely to be visually recognized while making the area of the tactile electrode 102 large, the tactile electrode 102 may be formed of a transparent conductive film. A typical material of the transparent conductive film is ITO. Since a transparent conductive film such as ITO has a relatively high electric resistance as compared with metal, the transparent conductive film is suitable for application to a small touch screen in which wiring resistance is not a problem. When application to a large touch screen where wiring resistance is a problem is necessary, the ITO film thickness is made large or the content of a dopant is increased to reduce the resistivity. In this case, since a light absorption rate of ITO may change and the touch screen may appear colored, it may be necessary to adjust the color tone of the display. Further, since a transparent conductive film such as ITO is likely to have a wiring disconnected due to corrosion with another metal wiring, consideration for moisture resistance and waterproofness is required in order to prevent corrosion in a case where wiring resistance of the electrode is lowered by a lamination structure of with other metal.

Instead of using the transparent conductive film as described above, the tactile electrode 102 may be a single layer film or a multilayer film of metal, or an electrode (hereinafter, also referred to as "metal film-containing electrode") having a multilayer structure including any of these and also using another conductive material. As the metal, for example, low resistance metal such as aluminum or silver is preferable. By using the metal film-containing electrode, wiring resistance can be reduced. In contrast, a metal film, which is opaque, is easily visually recognized. Therefore, in order to make the metal film less likely to be visually recognized, a thin wire structure is preferably provided to the metal film-containing electrode. The thin wire structure is typically mesh-like.

The dielectric layer 106 includes a single-layer film of an organic insulating film, a single-layer film of an inorganic insulating film, or a multilayer film. In a case of a multilayer film, different types of organic insulating films may be laminated, or different types of inorganic insulating films may be laminated, or an organic insulating film and an inorganic insulating film may be laminated. The inorganic insulating film has high moisture impermeability, high hardness, and high abrasion resistance. Since the tactile presentation knob 3 rotates on the dielectric layer 106, the dielectric layer 106 requires high abrasion resistance. The organic insulating film is preferable for obtaining high flatness, but has low hardness and low abrasion resistance. For this reason, in order to obtain both high flatness and high abrasion resistance, it is preferable to form the inorganic insulating film on the organic insulating film. As the inorganic insulating film, for example, a transparent silicon-based inorganic insulating film such as a silicon oxide film, a silicon nitride film, or a silicon oxynitride film, or a transparent inorganic insulating film composed of a metal oxide such as alumina is used. As a material of the organic insulating film, a polymer material having a main chain composed of a silicon oxide, a silicon nitride film, or a silicon oxynitride film and having an organic substance bonded to a side chain or a functional group of the main chain, or thermosetting resin having a main chain composed of carbon can be used. Examples of the thermosetting resin include acrylic resin, polyimide resin, epoxy resin, novolak resin, and olefin resin.

The electrostatic capacitance $C_{NE}$ is represented by Equation (1) below.

$$C_{NE} = Q/V = \varepsilon S/d \quad (1)$$

Here, Q is a charge amount stored in each of a conductive elastic portion 6 and the tactile electrode 102, V is a voltage between the tactile presentation knob 3 and the tactile electrode 102, $\varepsilon$ is a dielectric constant of the dielectric layer 106, S is a contact area between the conductive elastic portion 6 and the tactile electrode 102 via the dielectric layer 106, and d is a thickness of the dielectric layer 106. The electrostatic capacitance $C_{NE}$ is proportional to the dielectric constant $\varepsilon$ and is inversely proportional to the film thickness d.

From Equation (1) above, the dielectric constant c is preferably high in order to make the electrostatic capacitance $C_{NE}$ large. Specifically, the dielectric layer 106 preferably includes a film (hereinafter, also referred to as a "high dielectric constant insulating film") having a relative dielectric constant of 10 or more. In the high dielectric constant insulating film, a state in which positive and negative charges are displaced into a material by an electric field applied from the outside occurs (this is generally referred to as dielectric polarization). In the dielectric polarization, charges (generally referred to as polarization charges) generated by polarization are maintained while voltage is held, and when the voltage decreases, the polarization charges decrease and the dielectric polarization decreases, and when the applied voltage is set to zero volt, the dielectric polarization also disappears. The direction of the dielectric polarization can be changed by an electric field. The high dielectric constant insulating film may be used as a single layer, or may be used as a multilayer film by being laminated with another inorganic insulating film or organic insulating film of a low dielectric constant, or another high dielectric constant insulating film. In general, since a refractive index is higher as a dielectric constant is higher, a lamination structure of a high refractive index film and a low refractive index film is obtained as a high dielectric constant insulating film and a low dielectric constant insulating film are laminated. With this lamination structure, the dielectric layer 106 can also function as an antireflection film.

Further, from Equation (1) above, the thickness d is preferably small in order to make the electrostatic capacitance $C_{NE}$ large. By laminating a high dielectric constant insulating film and an organic insulating film, the film thickness of the organic insulating film can be reduced while sufficient insulation is secured. In this manner, the thickness d of the dielectric layer 106 can be reduced.

Assuming that the tactile electrode has a matrix structure (that is, a structure having an X electrode and a Y electrode crossing each other) (see, for example, Japanese Patent Application Laid-Open No. 2015-097076), a step, that is, unevenness is generated at an intersection between the X electrode and the Y electrode. This unevenness is flattened if the thickness of the insulating layer covering the unevenness is large. However, the thickness of the insulating layer is limited in order to avoid an excessive decrease in the electrostatic capacitance $C_{NE}$. For this reason, unevenness may occur on a front surface of the tactile presentation screen. When the texture feeling of the unevenness is mixed with the texture feeling caused by an electrostatic force from the tactile electrode, it is difficult to give an intended texture feeling to the user. In a case where an organic insulating film having an effect of flattening a surface shape is used as the dielectric layer 106, although occurrence of the unevenness is avoided, a large thickness is required to some extent for flattening, and a decrease in the electrostatic capacitance $C_{NE}$ cannot be avoided.

In contrast, according to the first embodiment, since the tactile electrode 102 has no intersection, the size of the unevenness can be suppressed to about the thickness of the tactile electrode 102. This makes it possible to thin the organic film having a flattening effect or to apply a high dielectric constant insulating film having a low flattening effect. In this manner, the electrostatic capacitance $C_{NE}$ can be made larger than that in the case of the matrix structure. Further, since a contact surface with the tactile presentation knob 3 of the tactile presentation screen 150 has less unevenness, a tactile sense caused by surface unevenness is not given to the tactile presentation knob 3 when signal voltage is not applied. For this reason, a tactile sense of the tactile presentation knob 3 when signal voltage is applied becomes clearer.

Further, even if the electrostatic capacitance $C_{NE}$ is the same, if the tactile presentation knob 3 is slippery on the dielectric layer 106, a change in an electrostatic force between the tactile presentation knob 3 and the tactile electrode 102 is easily perceived by the user as a change in a frictional force. In this manner, a larger tactile sense can be given to the user. In order to make the tactile presentation knob 3 slippery on the dielectric layer 106, it is necessary to suppress adhesion between the dielectric layer 106 and the tactile presentation knob 3. For this purpose, for example, a film having higher water repellency than the inside of the dielectric layer 106 may be provided on an outermost surface of the dielectric layer 106, on a contact surface with the dielectric layer 106 of the conductive elastic portion 6, or both.

<Electrode Pitch>

Figure 20:
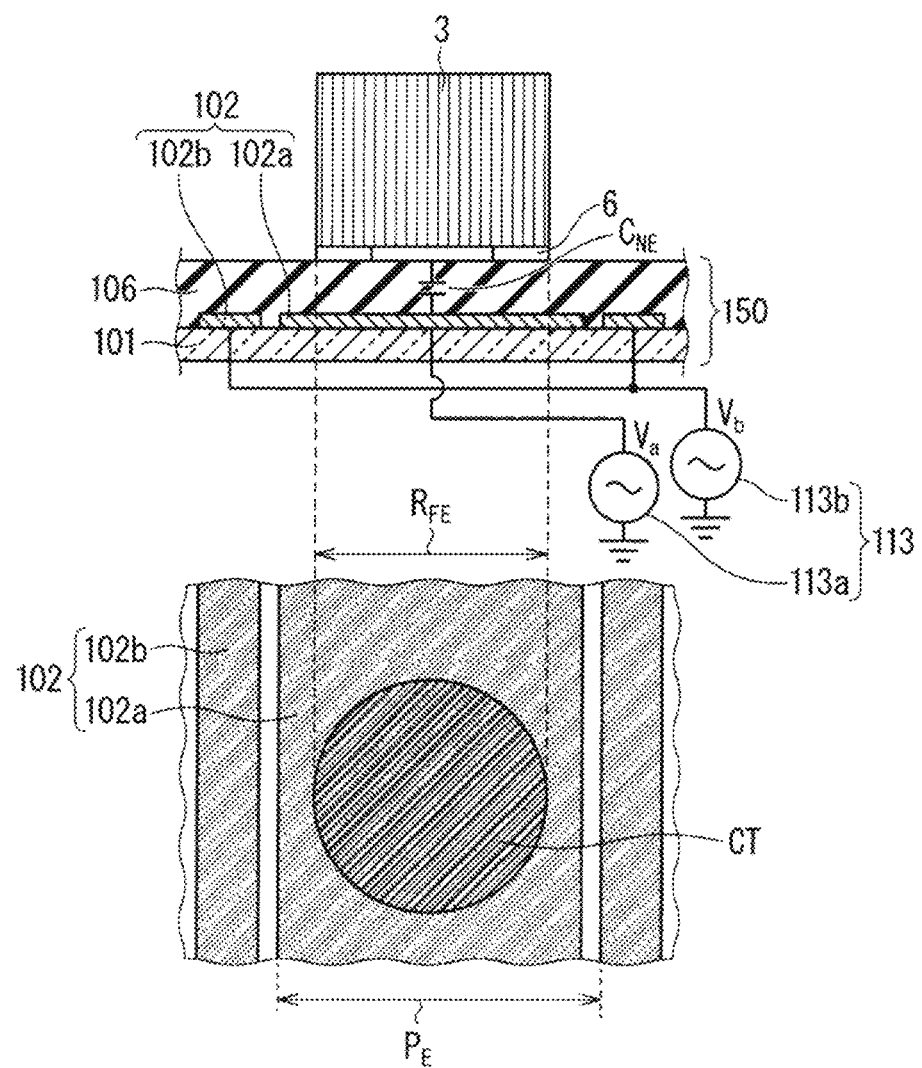
FIG. 20 is a schematic diagram for explaining electrostatic capacitance formed between the tactile electrode and the tactile presentation knob in a case where a pitch of the tactile electrode included in the tactile presentation panel in FIG. 2 is larger than a diameter of the tactile presentation knob.
Figure 21:
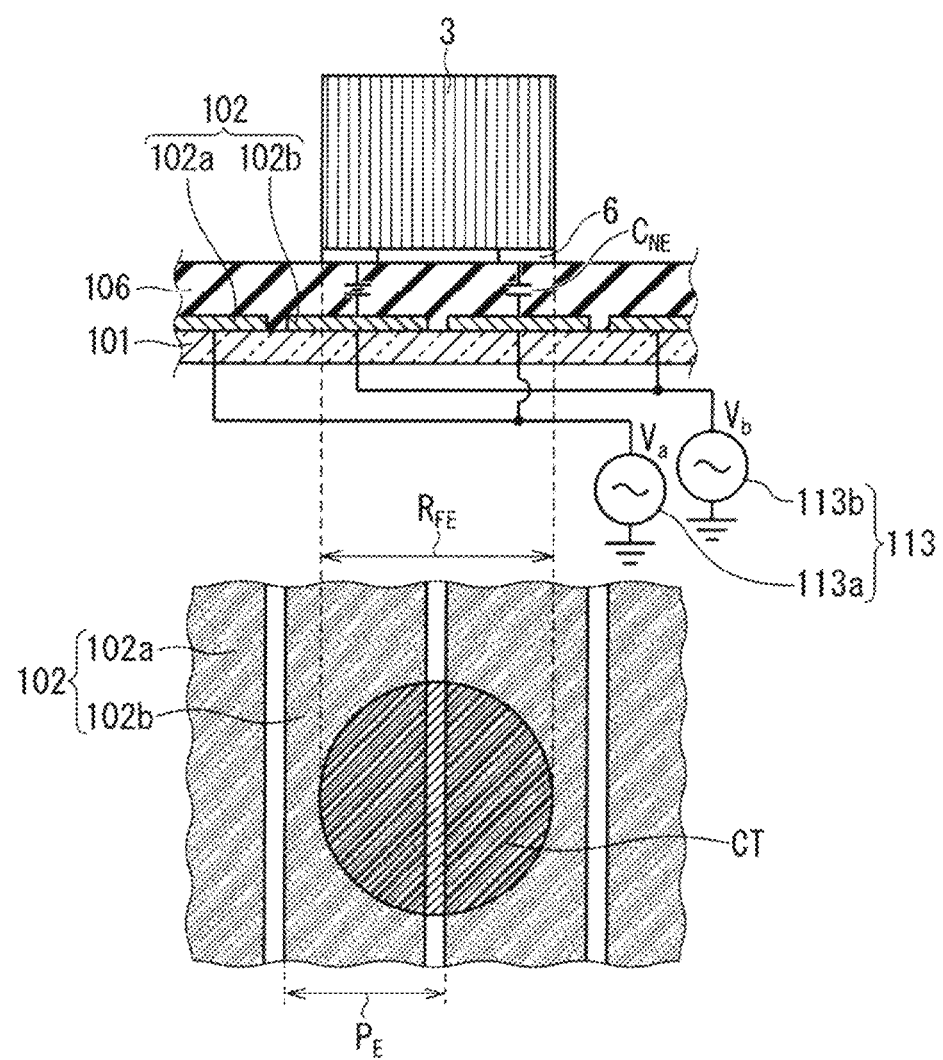
FIG. 21 is a schematic diagram for explaining electrostatic capacitance formed between the tactile electrode and the tactile presentation knob in a case where a pitch of the tactile electrode included in the tactile presentation panel in FIG. 2 is smaller than a diameter of the tactile presentation knob.

FIG. 20 is a schematic diagram for explaining the electrostatic capacitance $C_{NE}$ formed between the tactile electrode 102 and the tactile presentation knob 3 in a case where the pitch $P_E$ of the tactile electrode 102 is larger than a diameter $R_{FE}$ of the tactile presentation knob 3. FIG. 21 is a schematic diagram for explaining the electrostatic capacitance $C_{NE}$ formed between the tactile electrode 102 and the tactile presentation knob 3 in a case where the pitch $P_E$ of the tactile electrode 102 is smaller than the diameter $R_{FE}$.

In the first embodiment, as described above, an electrostatic force corresponding to the amplitude modulation signal $V_N$ (see FIG. 7) is generated by applying the voltage signal $V_a$ (see FIG. 5) and the voltage signal $V_b$ (see FIG. 6) having different frequencies to the first electrode 102a and the second electrode 102b adjacent to each other. In this manner, a frictional force between the dielectric layer 106 and the tactile presentation knob 3 changes in accordance with a beat frequency of the amplitude modulation signal $V_N$, and the user perceives this change as a tactile sense. In the state illustrated in FIG. 20, only the voltage signal $V_a$ acts on the tactile presentation knob 3, and the voltage signal $V_b$ does not act on the tactile presentation knob 3. Therefore, the amplitude modulation signal $V_N$ is not generated, and no tactile sense is generated. In contrast, in a case where the tactile presentation knob 3 is located above the boundary between the first electrode 102a and the second electrode 102b, a tactile sense is generated. Therefore, in the configuration of FIG. 20, depending on the position of the tactile presentation knob 3, there are a position where a tactile sense is generated and a position where a tactile sense is not generated. In contrast, in the state illustrated in FIG. 21, both the voltage signal $V_a$ and the voltage signal $V_b$ act on the tactile presentation knob 3 regardless of the position of the tactile presentation knob 3. In this manner, the amplitude modulation signal $V_N$ is generated. Therefore, in the configuration of FIG. 21, a tactile sense can be felt regardless of the position of the tactile presentation knob 3, and the position of the tactile presentation knob 3 can be optionally set. That is, in order that the tactile presentation knob 3 is likely to be positioned so as to be across the first electrode 102a and the second electrode 102b, in a case of being divided, for example, like the conductive elastic portion 6 illustrated in FIG. 22 to be described later, a width 6b of the conductive elastic portion 6 is preferably larger than the pitch $P_E$ of the tactile electrodes 102. Further, in a case where the conductive elastic portion 6 is not divided into several portions, an outer diameter 6a of the conductive elastic portion 6 is preferably larger than the pitch $P_E$ of the tactile electrodes 102.

<Structure of Tactile Presentation Knob>

Figure 22:
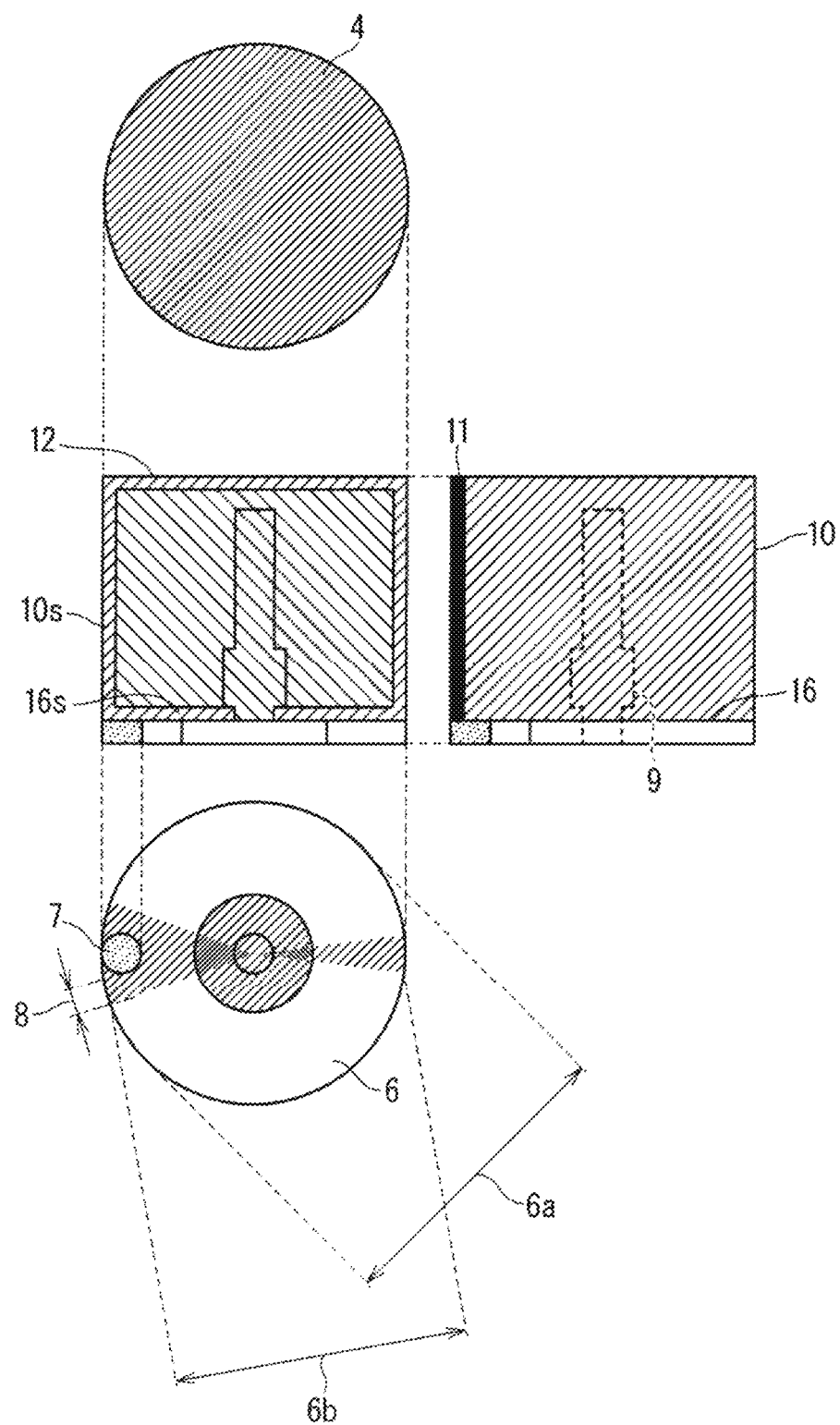
FIG. 22 is a schematic view illustrating a configuration of a rotation portion of the tactile presentation knob according to the first embodiment.
Figure 23:
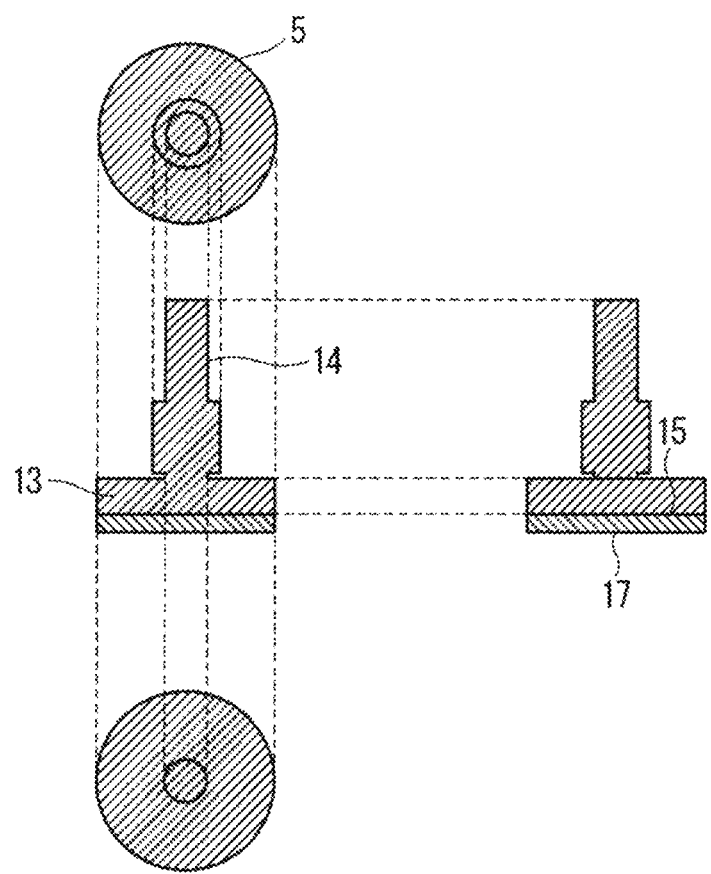
FIG. 23 is a schematic view illustrating a configuration of a fixing portion in a case where a position where the tactile presentation knob according to the first embodiment is placed is fixed at one place.
Figure 24:
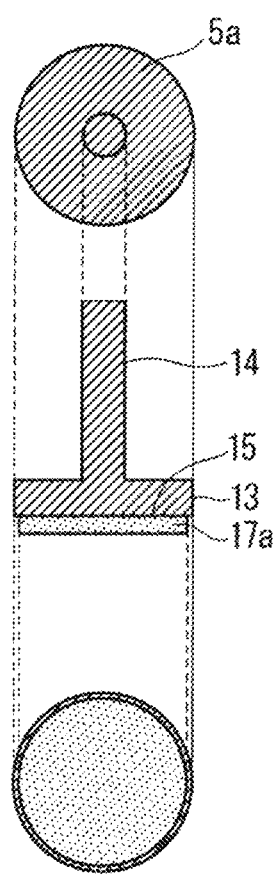
FIG. 24 is a schematic view illustrating a configuration of a rotation shaft structure in a case where a position where the tactile presentation knob according to the first embodiment is placed moves.

FIG. 22 is a schematic diagram illustrating a structure of a rotation portion 4 of the tactile presentation knob 3. FIG. 23 is a schematic diagram of a fixing portion 5 when the rotation portion 4 is placed on a contact surface of the tactile presentation panel 100 and rotated in a case where the position where the tactile presentation knob 3 is placed is fixed at one position. FIG. 24 is a schematic diagram of a rotation shaft portion 5a that suppresses horizontal movement when the rotation portion 4 of the tactile presentation knob 3 is placed on the contact surface of the tactile presentation panel 100 and rotated. The rotation portion 4 and the fixing portion 5 (rotation shaft portion 5a) are both made from metal such as aluminum, SUS, or copper, and resin such as polyvinyl chloride, polystyrene, ABS resin, AS resin, acrylic resin, polyethylene, polypropylene, polyvinyl alcohol, polyvinylidene chloride, polyethylene terephthalate, polycarbonate, modified polyphenylene ether, polyamide, polybutylene terephthalate, polyacetal, ultrahigh molecular weight polyethylene, polyarylate, polysulfone, polyethersulfone, polyamideimide, polyetherimide, thermoplastic polyimide, polyphenylene sulfide, liquid crystalline polymer, polyetheretherketone, or fluororesin. Since an operation feeling and a tactile sense change depending on the weight of the tactile presentation knob 3, the material is selected according to the user's preference, a use environment of the tactile presentation knob 3, the purpose of use, and the like. Since a rotation portion side surface 10 needs to be electrically connected to the conductive elastic portion 6 and an indicator 2 (see FIG. 31), a surface portion 10s in contact with the indicator 2 of the rotation portion side surface 10 and a boundary portion conductive portion 16s are made from metal or a conductive resin material (resistance is desirably $10^3 \Omega$ or less). A resistance value of the surface portion 10s and the boundary portion conductive portion 16s are desirably set to such a value by which, in an RC circuit formed between the wiring resistance of the tactile electrode 102, the resistance of the conductive elastic portion 6, and the dielectric layer 106, capacitance C formed between the tactile electrode 102 and the conductive elastic portion 6 become largest.

The tactile presentation knob 3 has the same columnar shape as the shape of a shaft portion 14 and the shape of a hole portion of a fixing hole 9, and is formed by integrally inserting the shaft portion 14 of the fixing portion 5 (rotation shaft portion 5a) into the fixing hole 9 of the rotation portion. A gap between the shaft portion 14 and the fixing hole 9 is desirably as narrow as possible within a range in which the rotation portion 4 smoothly turns. When the gap between the shaft portion 14 and the fixing hole 9 is narrow, a fluctuation of a rotation shaft when the tactile presentation knob 3 is rotated becomes small, and a tactile sense different from a tactile sense originally supposed to be given to the tactile presentation knob 3, such as a shake and vibration of the rotation portion 4 caused by the fluctuation of the rotation shaft, given to the indicator 2 is suppressed, and a tactile sense imparted to the user becomes clearer. In order for the rotation portion 4 to rotate smoothly, a surface of the shaft portion 14 and a surface of an inner surface portion of the fixing hole 9 desirably have as less unevenness as possible, and surface roughness Ra is desirably 0.5 µm or less. An inner diameter tolerance of the fixing hole 9 is desirably 0 to +0.5 mm, and an outer diameter tolerance of the shaft portion 14 is desirably −0.0005 mm.

The fixing portion 5 (rotation shaft portion 5*a*) serves as a rotation shaft when rotation portion 4 rotates, and serves to keep an operation surface of the tactile presentation panel 100 and a rotation shaft of the rotation portion 4 perpendicular to each other. For this reason, the center of the shaft portion 14 of the fixing portion 5 (rotation shaft portion 5*a*) is orthogonal to a bottom surface portion 15 and an adhesive portion 17 (shaft structure holding portion 17*a*), a bottom surface of the adhesive portion 17 (shaft structure holding portion 17*a*) is flat, and a contact surface of the conductive elastic portion 6 with the tactile presentation panel 100 and the adhesive portion 17 (shaft structure holding portion 17*a*) are located on the same plane. Note that, although FIG. 23 illustrates the case where the diameter of the adhesive portion 17 and the diameter of a fixing table 13 are the same, the diameter of the shaft structure holding portion 17*a* and the diameter of the fixing table 13 may be different as illustrated in FIG. 24.

The surface portion 10*s* and the boundary portion conductive portion 16*s* on the rotation portion side surface 10 of the rotation portion 4 with which the indicator 2 is in contact when the rotation portion 4 is rotated are composed of a conductive material, and are also electrically connected to the conductive elastic portion 6 and a position detection unit 7. Whether or not the user is in contact with a surface of the rotation portion 4 is detected, and accumulation of electric charges in the conductive elastic portion 6 is suppressed. The surface portion 10*s* and the boundary portion conductive portion 16*s* are composed of the same material as the conductive elastic portion 6. In particular, it is desirable to use metal having low resistance, and the surface portion 10*s* and the boundary portion conductive portion 16*s* may be formed by forming the rotation portion 4 with resin or the like and then performing coating with metal plating or the like. Details will be described later.

The conductive elastic portion 6 is a conductor that forms electrostatic capacitance with the tactile electrode 102. The conductive elastic portion 6 is divided into two or more portions, and prevents a decrease in tactile strength. Details of this effect will be described later. Since the conductive elastic portion 6 has elasticity, there is an effect of suppressing a decrease in tactile strength due to a decrease in adhesion. When the adhesion between the conductive elastic portion 6 and a surface of the tactile presentation panel decreases due to a decrease in flatness and increase unevenness and minute unevenness on a surface of the tactile presentation panel 100, or the like caused by processing accuracy of the rotation portion 4 or the fixing portion 5 (rotation shaft portion 5*a*) or assembly accuracy of the tactile presentation screen 150, the tactile electrode 102 and the conductive elastic portion 6 form electrostatic capacitance not only via the dielectric layer but also via air having a small dielectric constant, and the electrostatic capacitance formed between the tactile electrode 102 and the conductive elastic portion 6 decreases, resulting in a decrease in tactile strength. Since the conductive elastic portion 6 has elasticity, a gap between the dielectric layer and the conductive elastic portion 6 due to unevenness is filled, and it is possible to prevent a decrease in tactile strength due to a decrease in adhesion. A material used for the conductive elastic portion 6 is preferably an elastic resin material called conductive rubber obtained by mixing a conductive substance such as conductive carbon black or metal powder with CNR, CR rubber, NBR rubber, silicon, fluoro rubber, EPT rubber, SBR, butyl rubber, acrylic rubber, or CSM rubber as a base material. Volume resistivity only needs to be $10^6$ Ωcm or less, and as the volume resistivity is lower, electric charges are less likely to accumulate in the conductive elastic portion 6. Details of charge accumulation in the conductive elastic portion 6 will be described later. Further, since electrostatic capacitance is formed with the tactile electrode 102, a withstand voltage characteristic is desirably as high as possible because the life and reliability of the conductive elastic portion 6 are improved. The position detection unit 7 forms electrostatic capacitance with the detection electrode 203 of the touch screen 250, and is used to detect a position and a rotation amount of the tactile presentation knob 3.

A material that forms the position detection unit 7 is a conductor capable of forming electrostatic capacitance with the detection electrode 203, has elasticity similarly to the conductive elastic portion 6, and may be the same material as the conductive elastic portion 6. The better the adhesion with the tactile presentation panel 100, the less a difference between a design value and an actual capacitance value is likely to occur, and stable position detection accuracy can be obtained.

When the conductive elastic portion 6 and the position detection unit 7 have the same thickness so as to be in close contact with a surface of the tactile presentation panel 100 without forming a gap between them, high tactile strength and highly accurate position detection can be obtained. A flatness (a difference between a maximum value and a minimum value of measured values obtained by measuring a distance from a reference surface) of a surface where the conductive elastic portion 6 and the position detection unit 7 are in contact with the tactile presentation panel 100 is desirably 0.5 mm or less. Further, since a diameter of a contact area of a finger of a person with respect to a touch surface when a touch panel is operated is said to be about 3 mm for a child and about 7 to 10 mm at the maximum for an adult, an area of the position detection unit 7 may be considered to be 7 mm$^2$ or more and 400 mm$^2$ or less.

<Detection of Knob Position and Rotation Amount>

Figure 25:
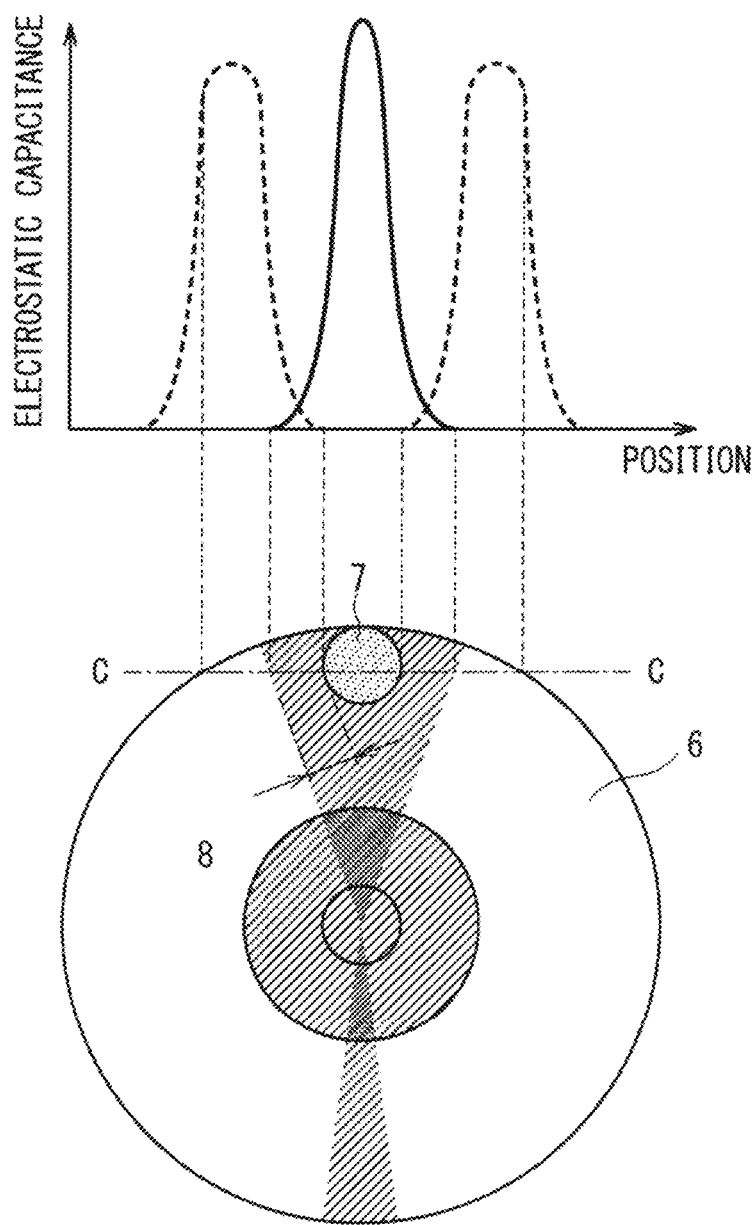
FIG. 25 is a schematic diagram for explaining a capacitance profile of line C-C when the touch screen according to the first embodiment detects the position of the tactile presentation knob.

FIG. 25 is a schematic diagram illustrating a capacitance profile of line C-C when the touch panel 200 performs detection at the time of position detection of the tactile presentation knob 3. Generation of a tactile sense on the tactile presentation knob 3 and the position detection of the tactile presentation knob 3 are performed by time division. During a period in which a signal voltage is applied to the tactile electrode 102, the detection electrode 203 and the excitation electrode 202 apply an optional voltage so as not to cause a voltage drop on the tactile electrode 102 by forming electrostatic capacitance with the tactile electrode 102, or 0 V. When the detection electrode 203 performs position detection, the tactile electrode 102 is placed in a floating state, and the conductive elastic portion 6 and the detection electrode 203 form electrostatic capacitance via the tactile electrode 102 to detect a change amount in electrostatic capacitance between the excitation electrode 202 and the detection electrode 203, so that the position of the tactile presentation knob 3 is detected.

The detection electrode 203 forms electrostatic capacitance with both the position detection unit 7 and the conductive elastic portion 6 to detect the electrostatic capacitance. At this time, since there is a gap 8, an electrostatic capacitance profile with the position detection unit 7 and an electrostatic capacitance profile with the conductive elastic portion 6 have peaks at different positions, and these positions are distinguished from each other.

For a rotation amount of the tactile presentation knob 3, in a case where the number of the position detection units 7 is one, the rotation amount is calculated as movement only in a rotation direction from a movement amount from an initial position of the position detection unit 7. The number of the position detection units 7 is not necessarily one. When a plurality of the position detection units 7 are provided as illustrated in FIG. 26, a rotation amount θ can be calculated from a direction vector P1-P2 between the position detection units 7 at an initial position (P1, P2) and a direction vector P1'-P2' at a position (P1', P2') after movement.

Figure 26:
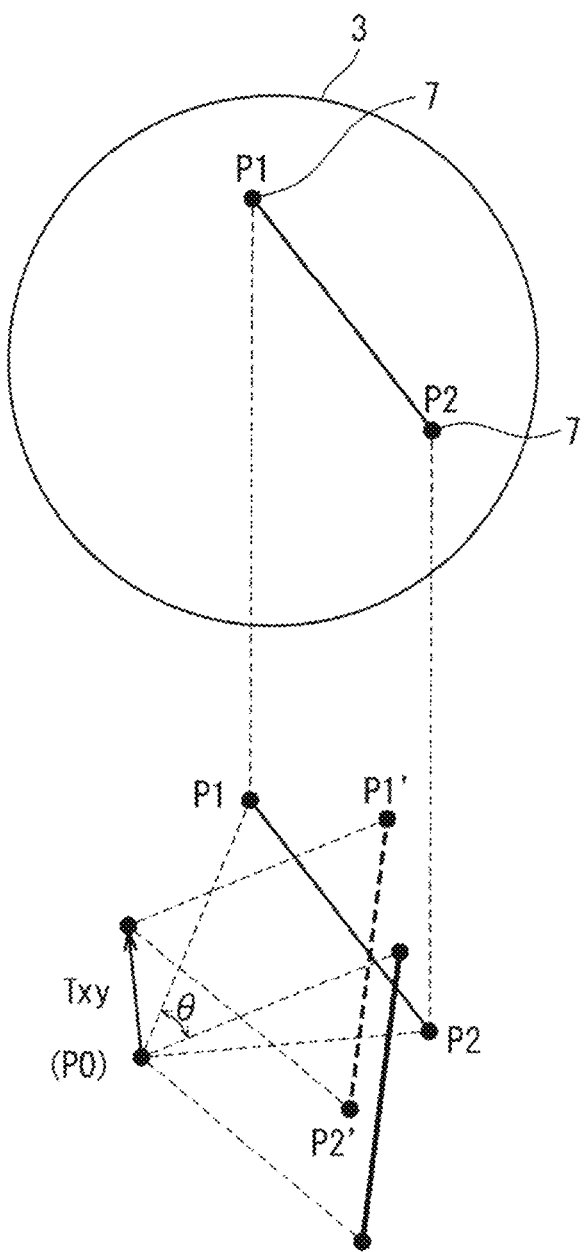
FIG. 26 is a diagram for explaining calculation of a rotation amount in a case where there are a plurality of position detection units according to the first embodiment.

In FIG. 26, when a rotation center is P0, a translational movement amount is Txy, a coordinate transformation matrix of the rotation angle θ is R, and an identity matrix is I, P1'-P2' is expressed by Equation (4) from Equations (2) and (3) below.

$$P1'=R \cdot P1-(R-I) \cdot P0+Txy \quad (2)$$

$$P2'=R \cdot P2-(R-I) \cdot P0+Txy \quad (3)$$

$$P1'-P2'=R \cdot (P1-P2) \quad (4)$$

Note that, in a case where the coordinate transformation matrix R is equal to the identity matrix I(R=I), translational operation is performed, and Txy is expressed by Equation (5) below.

$$Txy=P1'-P1 \quad (5)$$

When an operation range of the tactile presentation knob 3 is set to exceed 360 degrees, a rotation angle from the initial position can be calculated by performing addition/subtraction correction of 360 degrees×n (n is an integer) with reference to a rotation angle and a rotation angle change direction of the position detection unit 7. Although the measurement accuracy of a rotation angle is improved as the number of pairs of the position detection units 7 used for calculation is larger, the area of the conductive elastic portion 6 is reduced, and thus the number of the position detection units 7 is determined based on the balance between the tactile strength and the measurement accuracy of a rotation angle. An indication position line 11 (see FIG. 22) indicating an indication position of the tactile presentation knob 3 may be arranged on the rotation portion 4 to visualize a knob position. In a case where the indication position line 11 is arranged, the position detection unit 7 is arranged immediately below the indication position line 11, so that the calculation can be performed as a movement amount from the position (origin) at which the indication position line 11 should exist in an initial state, and thus the calculation processing can be simplified.

<Inter-Electrode Distance>

Figure 27:
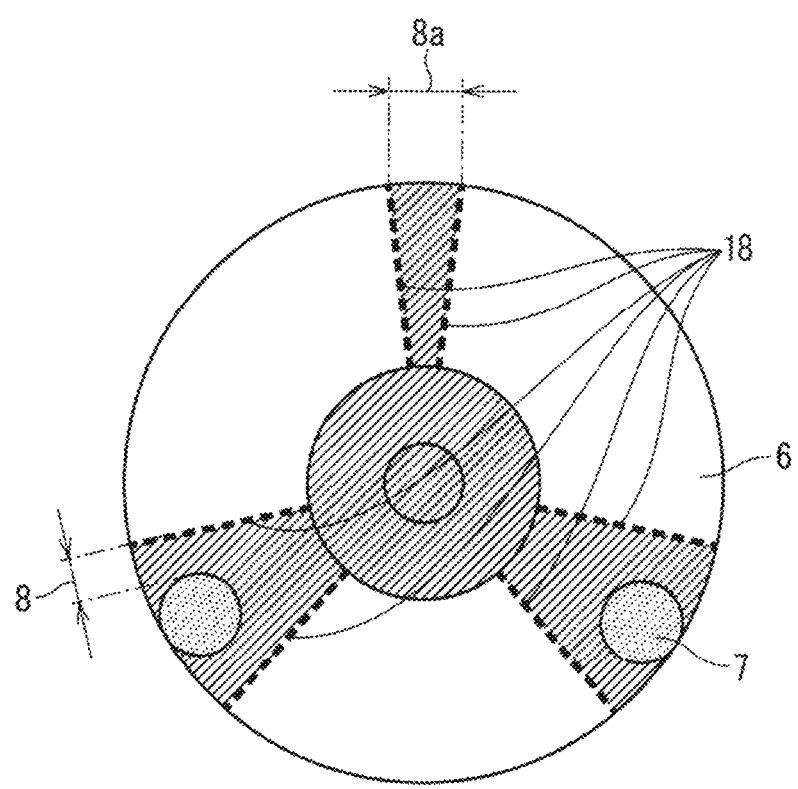
FIG. 27 is a schematic view illustrating a configuration of an edge portion of a conductive elastic portion according to the first embodiment.

FIG. 27 illustrates an example of a positional relationship between the conductive elastic portion 6 and the position detection unit 7 in the tactile presentation knob 3. A distance between the conductive elastic portion 6 and the position detection unit 7 in a case where the position detection unit 7 is arranged between the conductive elastic portions 6 adjacent to each other is indicated by the gap 8, and a distance between the conductive elastic portions 6 in a case where the position detection unit 7 is not arranged between the conductive elastic portions 6 adjacent to each other is indicated by a gap 8a. In a case where unevenness caused by thickness of the electrode is present on a surface of the tactile presentation panel 100, when the conductive elastic portion 6 slides while being in contact with the tactile electrode 102 via the dielectric layer 106, the tactile presentation knob 3 vibrates due to the unevenness on the surface. This vibration is sensed by the indicator 2 independently of a voltage signal applied to the tactile electrode 102. As a result, the indicator 2 may be less likely to feel a tactile sense obtained by the voltage signal. In other words, the tactile strength may be decreased.

Even if there is unevenness on the surface of the tactile presentation panel 100, whether or not the indicator 2 can easily feel the unevenness depends on an inter-electrode interval of the tactile electrodes 102 as described later. As larger unevenness is allowed, the need for increasing the thickness of the dielectric layer 106 to alleviate the unevenness is lowered. That is, it is allowed to reduce the thickness of the dielectric layer 106. This makes it possible to increase the capacitance formed between the conductive elastic portion 6 and the tactile electrode 102. Therefore, a stronger tactile sense can be generated. Further, if an inter-electrode distance of the tactile electrode 102 is wider than the gap 8 between the conductive elastic portion 6 and the position detection unit 7, an edge portion 18 (see FIG. 27) of the conductive elastic portion 6 is caught by the unevenness on the surface caused by the inter-electrode distance of the tactile electrode 102, and an unintended tactile sense occurs in the tactile presentation knob 3. Therefore, the inter-electrode distance of the tactile electrode 102 is desirably narrower than the gap 8. Further, the narrower the inter-electrode distance of the tactile electrode 102 is, the larger an occupied area of the tactile electrode 102 becomes, the larger the electrostatic capacitance formed with the conductive elastic portion 6 becomes, and the larger the obtained tactile strength becomes, which is desirable.

<Detailed Configuration of Tactile Presentation Touch Panel>

FIG. 28 is a block diagram schematically illustrating a configuration of the tactile presentation touch panel 400. Here, it is assumed that excitation electrodes Ty(1) to Ty(m) are provided as a plurality of the excitation electrodes 202, detection electrodes Tx(1) to Tx(n) are provided as a plurality of the detection electrodes 203, and tactile electrodes H(1) to H(j) are provided as a plurality of the tactile electrodes 102. The tactile electrodes H(1) to H(n) are arranged in order according to the number in parentheses, the odd-numbered tactile electrode 102 corresponds to the first electrode 102a, and the even-numbered tactile electrode 102 corresponds to the second electrode 102b. Further, in order to simplify the description, it is assumed that one of the excitation electrode 202 constitutes one of the row direction wiring layer 206 (see FIG. 8 or 10), and one of the detection electrode 203 constitutes one of the column direction wiring layer 207 (see FIG. 8 or 10).

As described above, the tactile presentation touch panel 400 includes the touch panel 200 and the tactile presentation panel 100. The touch panel 200 includes a touch screen 250 and a touch detection circuit 210. The tactile presentation panel 100 includes the tactile presentation screen 150 and the voltage supply circuit 110.

The touch detection circuit 210 includes an excitation pulse generation circuit 215, a charge detection circuit 212, a touch coordinate calculation circuit 214, and a touch detection control circuit 213. The touch detection control circuit 213 controls operation of the excitation pulse generation circuit 215, the charge detection circuit 212, and the touch coordinate calculation circuit 214. The excitation pulse generation circuit 215 sequentially applies an excitation pulse signal to the excitation electrodes Ty(1) to Ty(m). The charge detection circuit 212 measures a signal obtained from each of the detection electrodes Tx(1) to Tx(n). In this manner, the charge detection circuit 212 detects a charge amount of each of the detection electrodes Tx(1) to Tx(n). Information of a charge detection result indicates a value corresponding to mutual capacitance between the excitation electrode Ty(k) and each of the detection electrodes Tx(1) to Tx(n) when an excitation pulse signal is applied to the excitation electrode Ty(k), where k is an integer of 1 or more and m or less. Note that the charge detection circuit 212 can recognize to which of the excitation electrodes Ty(1) to Ty(m) an excitation pulse signal is applied by a control signal from the touch detection control circuit 213. The touch coordinate calculation circuit 214 obtains data (hereinafter, referred to as "touch coordinate data") of coordinates touched by the indicator 2 on the basis of the charge detection result.

The touch coordinate data is output to a knob movement amount calculation circuit 220, and is also output, as touch operation information, to a tactile sense formation condition conversion circuit 120, a tactile presentation control circuit 114 (tactile control circuit), and a movement direction prediction circuit 230. The knob movement amount calculation circuit 220 outputs information on a rotation angle, a rotation speed, and a horizontal movement distance as a movement amount of the knob to the tactile sense formation condition conversion circuit 120 (tactile strength calculation circuit), a display screen processing circuit 321, and the movement direction prediction circuit 230. The tactile sense formation condition conversion circuit 120 outputs, to the tactile presentation control circuit 114, an electric signal condition for realizing the tactile strength (operation feeling strength) calculated on the basis of the input information. The movement direction prediction circuit 230 predicts a movement direction of the tactile presentation knob 3 from a position change of the tactile presentation knob 3 based on the touch operation information and the movement amount of the knob. Specifically, in the prediction of the movement direction of the tactile presentation knob 3, in a case where the number of the position detection unit 7 is one, a direction in which a straight line connecting an initial position and a next detection position of the position detection unit 7 on the coordinates of the touch panel 200 is extended to a next detection position direction is set as the movement direction. The number of the position detection units 7 is not necessarily one. As illustrated in FIG. 26, in a case where there are a plurality of the position detection units 7, a direction obtained by extending a straight line connecting P1 and P1' or P2 and P2' between the initial position (P1, P2) and the position (P1', P2') after the movement in the direction of the position after the movement is preferably set as the movement direction.

As described above, the touch detection circuit 210 has a function of a contact position detection unit that detects a contact position between the tactile presentation knob 3 and an operation surface of the tactile presentation panel 100. Note that the tactile presentation panel 100 may have a function of the contact position detection unit.

The display screen processing circuit 321 edits image information of, for example, an icon list, indoor environment setting values such as temperature, humidity, and volume, a place, an area, a facility name, a TV broadcast station name, a radio broadcast station name and a broadcast frequency, a character list of music, video titles, news, website names, a telephone directory, and the like, map information (2D, 3D), and video information such as route information, drama, a movie, animation, news, and recording to obtain image data, and transfers the image data to a circuit (not illustrated) that supplies an image signal to the display panel 300 (see FIG. 1). Further, the display screen processing circuit 321 is also connected to a user interface control circuit 240, and performs processing such as dividing a display screen of the display panel 300 under the control of the user interface control circuit 240.

The user interface control circuit 240 sets a control target and a tactile sense according to the control target in each divided region of a divided display screen, and controls a display screen processing circuit 421 and the tactile sense formation condition conversion circuit 120.

The tactile sense formation condition conversion circuit 120 sets a tactile sense formation condition corresponding to a movement amount of the knob, for example, tactile strength. Based on the set tactile sense formation condition, the tactile presentation control circuit 114 of the voltage supply circuit 110 controls operation of the tactile presentation voltage generation circuit 113 based on the tactile strength set by the tactile sense formation condition conversion circuit 120, and supplies a voltage signal to the tactile presentation panel 100. Therefore, a display change of the display panel according to a movement amount of the tactile presentation knob 3 is synchronized with a tactile sense obtained from the knob.

Further, in a case where a magnetic force generation substrate 500 (see FIG. 46) to be described later is provided, a magnetic force generation circuit 260 connected to the movement direction prediction circuit 230 is provided, and current is supplied from the magnetic force generation circuit 260 to a solenoid coil or the like so that a magnetic force is generated. The magnetic force generation circuit 260 receives information on a movement direction of the tactile presentation knob 3 from the movement direction prediction circuit 230, and can perform control such as changing a position where a magnetic force is generated on the magnetic force generation substrate 500 in accordance with the movement direction of the tactile presentation knob 3, Further, the movement direction prediction circuit 230 can also give information on the movement direction of the tactile presentation knob 3 to the tactile presentation control circuit 114, and change the position and strength at which a tactile sense is given in accordance with the movement direction of the tactile presentation knob 3.

The voltage supply circuit 110 includes a switch circuit 112, the tactile presentation voltage generation circuit 113, and a tactile presentation control circuit 114. The tactile presentation voltage generation circuit 113 applies the voltage signal Va to the first electrode 102a and the voltage signal Vb to the second electrode 102b among the tactile electrodes H(1) to H(j) via the switch circuit 112. In other words, the voltage signal $V_a$ and the voltage signal $V_b$ are alternately applied to the tactile electrodes H(1) to H(j) arranged in one direction (lateral direction in the diagram). The switch circuit 112 is set to an on state or an off state on the basis of a command from the tactile presentation voltage generation circuit 113. The switch circuit 112 connects the tactile electrode 102 to the tactile presentation voltage generation circuit 113 in the on state, and brings the tactile electrode 102 into a floating state in the off state. In the first embodiment, the switch circuit 112 includes two switches 40, one of which performs switching of an electrical path to all the first electrodes 102a, and the other of which performs switching of an electrical path to all the second electrodes 102*b*. These two of the switches 40 may be controlled in conjunction with each other. Note that the switch 40 corresponds to a switching unit.

The tactile presentation control circuit 114 refers to the information on the tactile strength calculated by the tactile sense formation condition conversion circuit 120.

The tactile presentation control circuit 114 may control operation of the tactile presentation voltage generation circuit 113 based on this information. That is, the touch detection circuit 210 functions also as a contact detection unit that detects contact of the user with the tactile presentation knob 3.

<Operation of Tactile Presentation Touch Panel>

FIG. 29 is a schematic diagram illustrating an image of electrostatic capacitance between the excitation electrode 202 and the detection electrode 203 when the indicator 2 is not in contact with the tactile presentation knob 3. FIG. 30 is a timing chart schematically illustrating an operation timing of the tactile presentation touch panel 400 (see FIG. 28) when the indicator 2 is not in contact with the tactile presentation knob 3.

When the indicator 2 is not in contact with the tactile presentation knob 3, both the conductive elastic portion 6 and the tactile electrode 102 are in a floating state and at the same potential as the detection electrode 203, and the charge detection circuit 212 detects a charge amount mainly from electrostatic capacitance between the detection electrode 203 and the excitation electrode 202. The touch detection control circuit 213 outputs a control signal of the excitation electrode 202 also to the tactile presentation voltage generation circuit 113.

Based on this control signal, the tactile presentation voltage generation circuit 113 can recognize a touch detection period P1. In the touch detection period P1, the tactile presentation voltage generation circuit 113 disconnects the switch 40 of the switch circuit 112. In this manner, electrical connections between the tactile presentation voltage generation circuit 113 and all the tactile electrodes 102 are disconnected. As a result, the potential of all the tactile electrodes 102 becomes in a floating state.

Next, in a touch coordinate calculation period P2, the touch coordinate calculation circuit 214 determines whether or not there is touch by the indicator 2 on the basis of a charge detection result of mutual capacitance corresponding to each of the excitation electrodes Ty(1) to Ty(m) input from the charge detection circuit 212 and held, in other words, a charge detection result of capacitance of all intersections formed by the excitation electrodes Ty(1) to Ty(m) and the detection electrodes Tx(1) to Tx(n). Electric field coupling between the excitation electrode 202 and the detection electrode 203 is relaxed by proximity or contact of the indicator 2 such as a finger. As a result, charged charges in mutual capacitance are reduced. The touch coordinate calculation circuit 214 can determine the presence or absence of touch based on the degree of the reduction. In a case where touch is determined to be present, the touch coordinate calculation circuit 214 starts calculation of the touch coordinate data on the basis of the charge detection result. Specifically, the touch coordinate calculation circuit 214 can calculate the touch coordinate data by performing arithmetic processing such as gravity center calculation, for example, on a detection result of an intersection where the degree of reduction in charged charges is largest and an intersection around the intersection. In a case of determining that there is no touch, the touch coordinate calculation circuit 214 does not calculate the touch coordinate data, and waits until processing of a charge detection result performed next.

Here, description will now be made on operation in a case where a determination result indicating presence of contact of the indicator 2 with the tactile presentation knob 3 is not obtained.

FIG. 31 is a schematic diagram illustrating an image of electrostatic capacitance between the excitation electrode 202 and the position detection unit 7 when the indicator 2 is in contact with the tactile presentation knob 3. FIG. 32 is a timing chart schematically illustrating an operation timing of the tactile presentation touch panel 400 (see FIG. 28) when the indicator 2 is in contact with the tactile presentation knob 3.

In a case where the indicator 2 is in contact with the tactile presentation knob 3, the conductive elastic portion 6 is in a state of being grounded via the tactile presentation knob 3 and the indicator 2, the detection electrode 203 forms electrostatic capacitance with the conductive elastic portion 6 via the tactile electrode 102, and electrostatic capacitance between the detection electrode 203 and the excitation electrode 202 decreases. As a result, a charge amount detected by the charge detection circuit 212 decreases, and it is detected that the indicator 2 comes into contact with the tactile presentation knob 3.

In the touch detection period P1, a control signal indicating a first conversion timing is output from the touch detection control circuit 213 to the excitation pulse generation circuit 215. Upon receiving this control signal, the excitation pulse generation circuit 215 gives an excitation pulse signal (charge pulse signal) to the excitation electrode Ty(1). In this manner, inter-electrode capacitance (mutual capacitance) between the excitation electrode Ty(1) and each of the detection electrodes Tx(1) to Tx(n) intersecting with the excitation electrode Ty(1) in plan view is charged. The charge detection circuit 212 detects a charge amount by the charging using the detection electrodes Tx(1) to Tx(n). Then, the charge detection circuit 212 performs analog/digital conversion (A/D conversion) on the detection result, and outputs digital information obtained by the analog/digital conversion to the touch coordinate calculation circuit 214 as a charge detection result of mutual capacitance corresponding to the excitation electrode Ty(1). Similarly, control signals indicating second to m-th conversion timings are sequentially output from the touch detection control circuit 213 to the excitation pulse generation circuit 215. In a manner corresponding to each of the second to m-th conversion timings, charge detection results of mutual capacitances corresponding to the excitation electrodes Ty(2) to Ty(m) are output to the touch coordinate calculation circuit 214.

The touch detection control circuit 213 also outputs the control signal to the tactile presentation voltage generation circuit 113. Based on this control signal, the tactile presentation voltage generation circuit 113 can recognize a touch detection period P1. In the touch detection period P1, the tactile presentation voltage generation circuit 113 disconnects the switch 40 of the switch circuit 112. In this manner, electrical connections between the tactile presentation voltage generation circuit 113 and all the tactile electrodes 102 are disconnected. As a result, the potential of all the tactile electrodes 102 becomes in a floating state.

Next, in a touch coordinate calculation period P2, the touch coordinate calculation circuit 214 determines whether or not there is touch by the indicator 2 on the basis of a charge detection result of mutual capacitance corresponding to each of the excitation electrodes Ty(1) to Ty(m) input from the charge detection circuit 212 and held, in other words, a charge detection result of capacitance of all intersections formed by the excitation electrodes Ty(1) to Ty(m) and the detection electrodes Tx(1) to Tx(n). Electric field coupling between the excitation electrode 202 and the detection electrode 203 is relaxed by proximity or contact of the indicator 2 such as a finger. As a result, charged charges in mutual capacitance are reduced. The touch coordinate calculation circuit 214 can determine the presence or absence of touch based on the degree of the reduction. In a case where touch is determined to be present, the touch coordinate calculation circuit 214 starts calculation of the touch coordinate data on the basis of the charge detection result. Specifically, the touch coordinate calculation circuit 214 can calculate the touch coordinate data by performing arithmetic processing such as gravity center calculation, for example, on a detection result of an intersection where the degree of reduction in charged charges is largest and an intersection around the intersection.

Next, in a touch coordinate transmission period P3, according to a touch coordinate data transmission timing from the touch detection control circuit 213, in the touch coordinate calculation circuit 214, the touch coordinate data is output to the knob movement amount calculation circuit 220, and also output, as the touch operation information, to the tactile sense formation condition conversion circuit 120 and the tactile presentation control circuit 114.

Next, in a determination period P4, the tactile presentation control circuit 114 determines the position of the tactile presentation knob 3 from the touch coordinate data, and determines an area where a tactile sense is presented.

The tactile presentation control circuit 114 selects a tactile presentation signal waveform (voltage signal waveform) corresponding to coordinates of a display screen and the tactile presentation knob 3 based on input from the tactile sense formation condition conversion circuit 120. The "tactile presentation signal waveform" defines a waveform of the voltage signal $V_a$ and the voltage signal $V_b$. Note that a difference in waveform between the voltage signal $V_a$ and the voltage signal $V_b$ is typically a difference in frequency. The tactile presentation signal waveform is set inside or outside the tactile presentation control circuit 114. The number of types of the tactile presentation signal waveforms may be one or more than one. In a case where there is only one type of the tactile presentation signal waveform, processing of selecting the tactile presentation signal waveform is not necessary. In a case where there is more than one type of the tactile presentation signal waveform, a type of the tactile presentation signal waveform is selected on the basis of input from the tactile sense formation condition conversion circuit 120.

Next, in a tactile presentation signal application period P5, the tactile presentation control circuit 114 generates a tactile presentation signal with the tactile presentation signal waveform. Further, the switch 40 connected to the tactile electrode 102 in a region where the tactile presentation signal is input of the switch circuit 112 is connected to the tactile presentation voltage generation circuit 113, and the switch 40 connected to the tactile electrode 102 in a region where the tactile presentation signal is not input is connected to GND, or the tactile electrode 102 is left floating without turning on the switch. In this manner, a signal is applied to the tactile electrode 102, and a tactile sense is presented. In the example of FIG. 32, an AC signal having the H level (high level) and the L level (low level) is applied to the tactile electrode 102. The tactile electrode 102 is charged at a high voltage of the positive electrode, typically plus tens of volts, in a period of the H level, discharged in a period of a zero level, and charged at a high voltage of the negative electrode, typically minus tens of volts, at the L level. A generation cycle and a generation period of a pulse signal may be appropriately set on the basis of input from the tactile sense formation condition conversion circuit 120.

After the tactile presentation signal application period P5, the processing returns to the touch detection period P1. By the above, the above-described operation is repeated. In this manner, the tactile presentation touch panel 400 can perform the position detection of the tactile presentation knob 3 and the tactile presentation according to the position of the tactile presentation knob 3 and a display screen.

Figure 33:
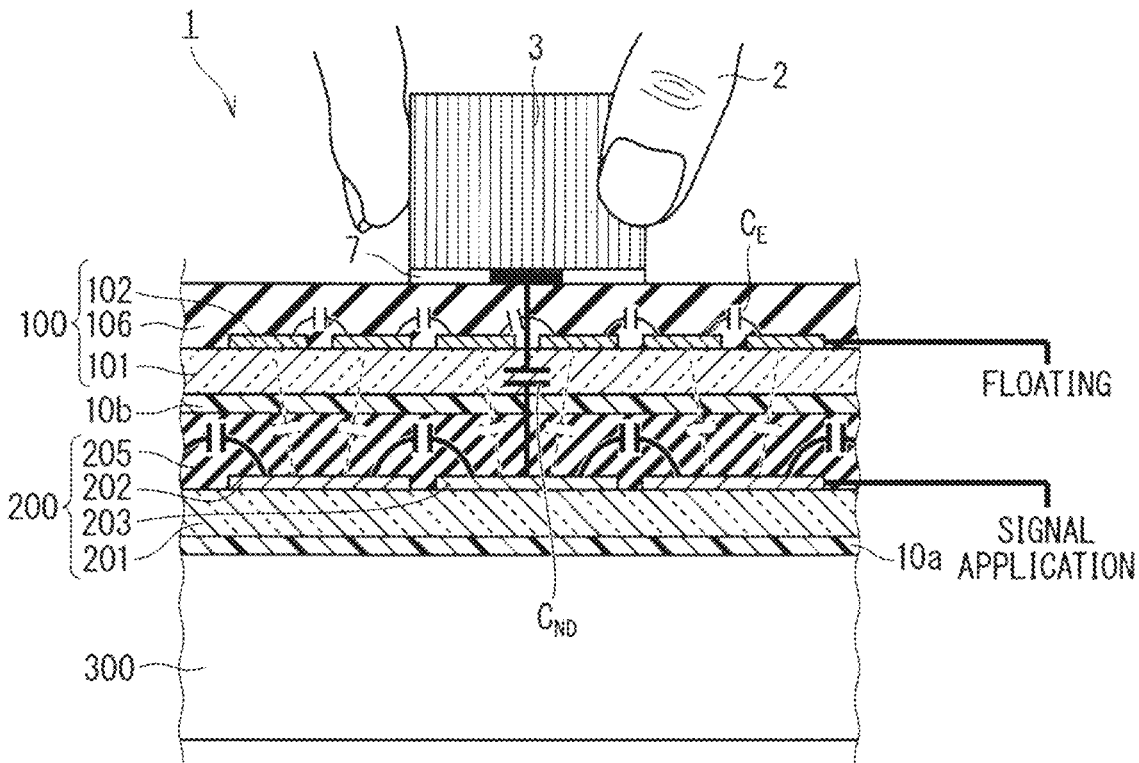
FIG. 33 is a schematic diagram for explaining electrostatic capacitance formed in the tactile presentation touch panel in FIG. 1 when the tactile presentation touch panel detects a touch position.

FIG. 33 is a schematic diagram illustrating formation of electrostatic capacitance in the tactile presentation touch panel 400 in the touch detection period P1 (see FIG. 32). In the touch detection period P1, electrostatic capacitance $C_{ND}$ is formed between the indicator 2 and the detection electrode 203. During this period, the potential of all the tactile electrodes 102 is in a floating state. This prevents the tactile electrode 102 from functioning as a shield. Therefore, the sensitivity of touch detection can be enhanced.

Figure 34:
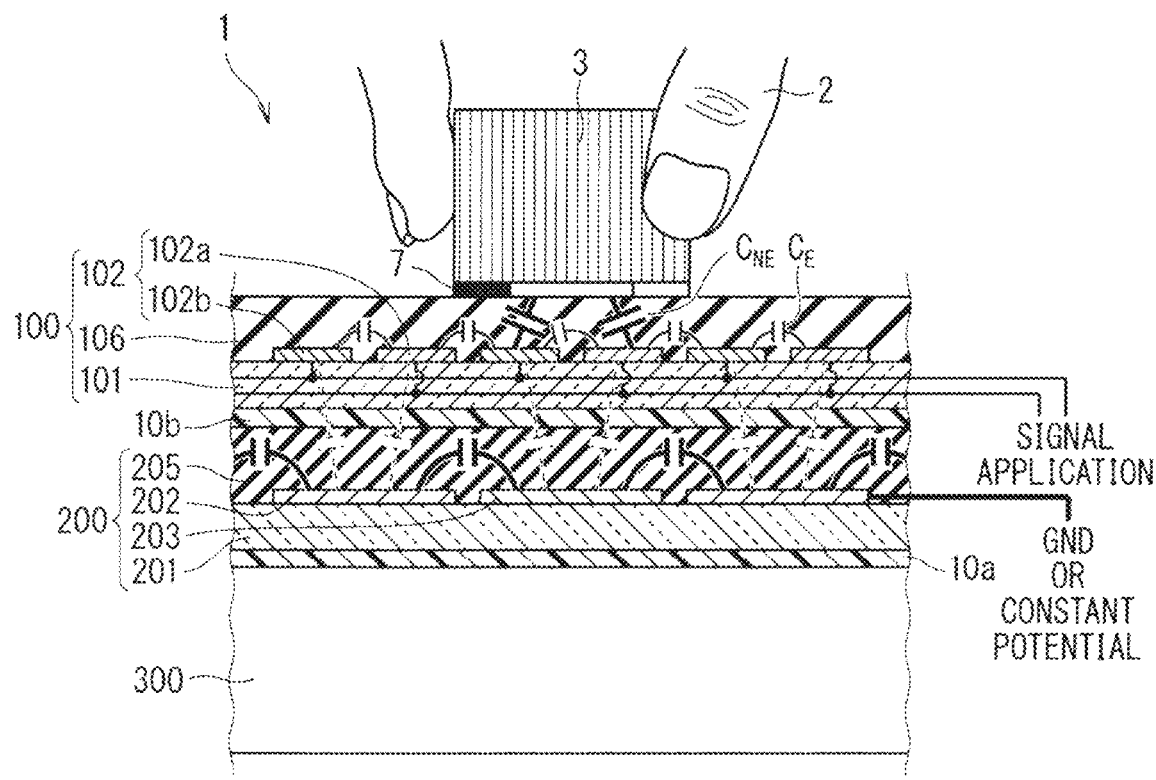
FIG. 34 is a schematic diagram for explaining electrostatic capacitance formed in the tactile presentation touch panel in FIG. 1 when the tactile presentation touch panel generates a tactile sense.

FIG. 34 is a schematic diagram illustrating formation of electrostatic capacitance in the tactile presentation touch display 1 in the tactile presentation signal application period P5 (see FIG. 32). In the tactile presentation signal application period P5, potential of the excitation electrode 202 and the detection electrode 203 of the touch panel 200 may be in a floating state. In this manner, it is possible to suppress the influence of the capacitance formation by the excitation electrode 202 and the detection electrode 203 on the electrostatic capacitance $C_{NE}$. Alternatively, the potential of the excitation electrode 202 and the detection electrode 203 of the touch panel 200 may be substantially constant potential, and for example, the excitation electrode 202 and the detection electrode 203 may be connected to ground potential with low impedance. In this manner, the excitation electrode 202 and the detection electrode 203 can function as a shield between the tactile electrode 102 and the display panel 300. Therefore, generation of noise in the display panel 300 due to a high voltage signal applied to the tactile electrode 102 is suppressed. Therefore, display defects due to noise can be prevented. Conversely, generation of noise in the tactile electrode 102 due to the display panel 300 is suppressed. When a tactile presentation signal is applied to the tactile electrode, the conductive elastic portion 6 forms electrostatic capacitance with the tactile electrode 102, and electric charges having potential opposite to voltage of the tactile electrode 102 are accumulated on a surface in contact with the dielectric layer 106 of the conductive elastic portion 6, and an electrostatic force is generated between the conductive elastic portion 6 and the dielectric layer 106. As a result, a frictional force between the conductive elastic portion 6 and the dielectric layer 106 changes, and torque of the knob changes when the tactile presentation knob 3 is rotated due to the change in the frictional force, which is felt as an operation feeling when the tactile presentation knob 3 is rotated.

Note that, in a case where a floating state is used, both the excitation electrode 202 and the detection electrode 203 may be in the floating state, or one of them may be in the floating state. Further, in a case where constant potential is used, both the excitation electrode 202 and the detection electrode 203 may be set to the constant potential, or one of them may be set to the constant potential. The configuration may be such that one of the excitation electrode 202 and the detection electrode 203 is set to be in a floating state, and the other is set at the constant potential. When distances between the excitation electrode 202 and the detection electrode 203 and the tactile electrode 102 are different, one of the excitation electrode 202 and the detection electrode 203 that is closer to the tactile electrode 102 may be in the floating state, and the other that is farther may be in the constant potential.

Note that, in the example illustrated in FIG. 28, the touch coordinate data is sent from the touch detection circuit 210 to the voltage supply circuit 110. However, as a variation, information on a charge detection result may be sent from the charge detection circuit 212 to the voltage supply circuit 110. In this case, the tactile presentation control circuit 114 performs determination of the presence or absence of touch and calculation of touch coordinates by using the information on a charge detection result.

In a case where the position where the tactile presentation knob 3 is placed on the tactile presentation panel 100 is changed during operation or for each operation, the bottom surface portion 15 may have a surface adhered and fixed onto the tactile presentation panel 100. Further, in a case where the position where the tactile presentation knob 3 is placed on the tactile presentation panel 100 is not changed during operation or for each operation (in a case where the position of the tactile presentation knob 3 is fixed and used), the bottom surface portion 15 may be bonded and fixed onto the tactile presentation panel 100 by the adhesive portion 17.

<Suppression of Charge Accumulation in Conductive Elastic Portion>

FIG. 35 is an image diagram schematically illustrating movement of electric charges accumulated in the conductive elastic portion 6 when the charges are grounded via the indicator 2 at the time of signal voltage application. The conductive elastic portion 6, which is formed by mixing conductive carbon black or metal particles with insulating resin, has relatively high resistance and easily accumulates electric charges. When electric charges are accumulated in the conductive elastic portion 6, an electrostatic force between the conductive elastic portion 6 and the tactile electrode 102 does not change due to signal voltage, and the tactile strength decreases. When the conductive elastic portion 6 and a surface of the rotation portion 4 are electrically connected to each other, the indicator 2 is connected to the ground via the indicator 2 when the indicator 2 comes into contact with the rotation portion 4. In this manner, electric charges accumulated in the conductive elastic portion 6 are released, and accumulation of electric charges can be suppressed.

In a case where resistance of the conductive elastic portion 6 is high, electric charges hardly move in the conductive elastic portion 6, and electric charges cannot be sufficiently released only by releasing the electric charges via the indicator 2 as described above. In that case, the tactile electrode 102 is driven so that at least one of the conductive elastic portions 6 divided into two or more when a signal voltage is applied forms electrostatic capacitance with the tactile electrode 102, and a charge discharge portion 115 (see FIG. 36 to be described later) of which at least one is connected to the ground is connected to the tactile electrode 102 via the dielectric layer 106. In this manner, accumulation of electric charges is prevented. The tactile electrode 102 connected to the charge discharge portion 115 does not need to be fixed, and application of signal voltage and connection to the charge discharge portion 115 may be switched and driven in the same tactile electrode 102, or the tactile electrode 102 to which signal voltage is applied and the tactile electrode 102 connected to the charge discharge portion 115 may be alternately arranged. However, no electrostatic force is generated in the tactile electrode 102 connected to the charge discharge portion 115. Therefore, in order to prevent a decrease in a tactile sense, the number of the tactile electrodes 102 to which signal voltage is applied is made larger than the number of the tactile electrodes 102 connected to the charge discharge portion 115, or time for connecting to the charge discharge portion 115 is made shorter than time for applying signal voltage. In this manner, an effective area of the conductive elastic portion 6 that generates an electrostatic force with the tactile electrode 102 is preferably made larger than an effective area of the conductive elastic portion 6 that forms capacitance with the charge discharge portion 115.

Figure 36:
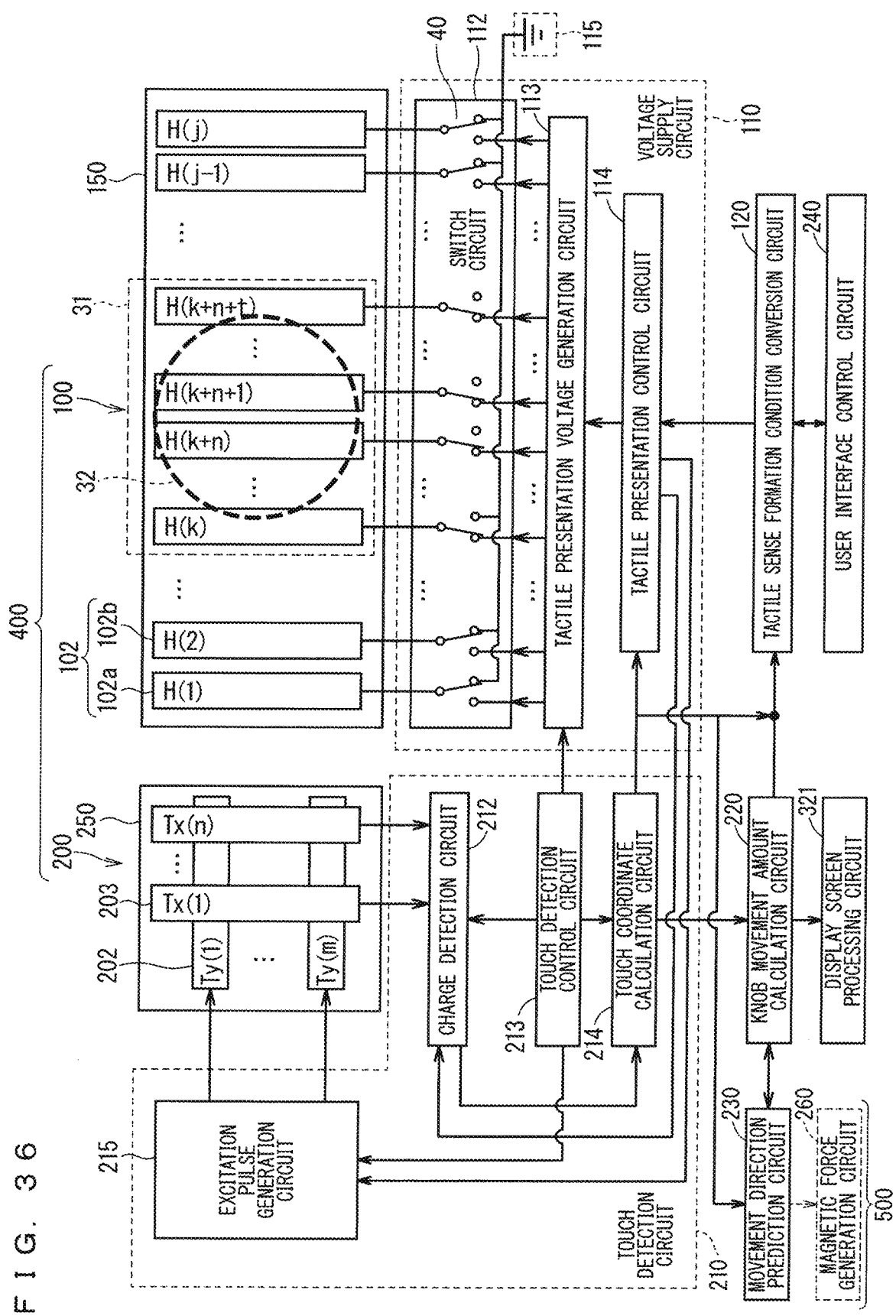
FIG. 36 is a block diagram schematically illustrating a configuration of the tactile presentation touch panel when a part of tactile electrodes with which the tactile presentation knob is in contact via a dielectric layer is connected to the ground at the time of signal voltage application according to the first embodiment.

FIG. 36 is a block diagram illustrating a configuration in a case where the tactile electrode 102 is driven such that at least one of the conductive elastic portions 6 divided into two or more forms electrostatic capacitance with the tactile electrode 102, and at least one is connected to the tactile electrode 102 connected to the ground via the dielectric layer 106. In the determination period P4 (see FIG. 32), the tactile presentation control circuit 114 determines the position where the tactile presentation knob 3 is placed from the touch coordinate data, determines an area where a tactile sense is presented, divides the area into two or more areas, and determines an area where a tactile presentation signal is input and an area connected to GND. Note that, in FIG. 36, the same configurations as those in FIG. 28 are denoted by the same reference numerals, and redundant description is omitted.

The tactile presentation control circuit 114 selects a tactile presentation signal waveform corresponding to coordinates of a display screen and the tactile presentation knob 3 based on input from the tactile sense formation condition conversion circuit 120. The "tactile presentation signal waveform" defines a waveform of the voltage signal $V_a$ and the voltage signal $V_b$. Note that a difference in waveform between the voltage signal $V_a$ and the voltage signal $V_b$ is typically a difference in frequency. The tactile presentation signal waveform is set inside or outside the tactile presentation control circuit 114. The number of types of the tactile presentation signal waveforms may be one or more than one. In a case where there is only one type of the tactile presentation signal waveform, processing of selecting the tactile presentation signal waveform is not necessary. In a case where there is more than one type of the tactile presentation signal waveform, a type of the tactile presentation signal waveform is selected on the basis of input from the tactile sense formation condition conversion circuit 120.

Next, in the tactile presentation signal application period P5 (see FIG. 32), the tactile presentation control circuit 114 generates a tactile presentation signal with the tactile presentation signal waveform. Further, the switch 40 connected to the tactile electrode 102 in a region where the tactile presentation signal is input of the switch circuit 112 is connected to the tactile presentation voltage generation circuit 113, and the switch 40 connected to the tactile electrode 102 in a region connected to GND is connected to GND. The switch 40, which is connected to the tactile electrode 102 in a region where no tactile presentation signal is input, is connected to GND, or the tactile electrode 102 is kept floating without the switch 40 is switched on. In this manner, a signal is applied to the tactile electrode 102, and a tactile sense is presented. In the example of FIG. 24, an AC signal having an H level (high level) and an L level (low level) is applied to the tactile electrode 102. The tactile electrode 102 is charged at a high voltage of the positive electrode, typically plus tens of volts, in a period of the H level, discharged in a period of a zero level, and charged at a high voltage of the negative electrode, typically minus tens of volts, at the L level. A generation cycle and a generation period of a pulse signal may be appropriately set on the basis of input from the tactile sense formation condition conversion circuit 120.

After the tactile presentation signal application period P5, the processing returns to the touch detection period P1. By the above, the above-described operation is repeated. In this manner, the tactile presentation touch panel 400 can perform the position detection of the tactile presentation knob 3 and the tactile presentation according to the position of the tactile presentation knob 3 and a display screen.

Note that, in the first embodiment, a GND terminal is used as the charge discharge portion 115. However, other configurations may be used as long as electric charges accumulated in the conductive elastic portion 6 can be discharged. For example, positive voltage or negative voltage for efficiently discharging charges may be applied instead of a GND terminal according to the conduction degree of electric charges accumulated in the conductive elastic portion 6.

By changing the time and period during which the signal waveform and the signal voltage in the tactile presentation signal application period P5 are applied to guide or fix the position of the tactile presentation knob 3, it is possible to allow knob operation at an optional position and to provide touch panel operation using only the tactile presentation knob 3. A specific example of the above will be described later.

<Difference between Electrode Structure of Tactile Presentation Screen and Electrode Structure of Touch Screen>

As a preferable condition of the tactile electrode 102, firstly, a configuration in which the indicator 2 can be in contact with the tactile electrode 102 without a member other than the dielectric layer 106 interposed between them is desired. Therefore, the tactile electrode 102 covered with the dielectric layer 106 is preferably arranged on an outermost surface of the tactile presentation touch panel 400.

Secondly, the shorter a distance between the indicator 2 and the tactile electrode 102, the larger a tactile sense can be generated. From this viewpoint, the thickness of the dielectric layer 106 is preferably small, and the dielectric constant of the dielectric layer 106 is preferably large.

Thirdly, it is desirable that the tactile electrodes 102 densely exist in order to make the electrostatic capacitance $C_{NE}$ (see FIG. 34) large at the time of generation of a tactile sense, while it is preferable that capacitance $C_E$ between the tactile electrodes 102, that is, inter-electrode capacitance be small at the time of detection of a touch position (see FIG. 32) so that the formation of the capacitance $C_{ND}$ is not hindered.

In a case where the tactile presentation touch panel 400 is larger in size than the tactile presentation knob 3, and an area where the tactile presentation knob 3 is not placed is used as a touch panel that does not present a tactile sense, when the indicator 2 is not in contact with the tactile presentation knob 3, an operation timing (see FIG. 29) of when the indicator 2 is not in contact with the tactile presentation knob 3 is repeated for an entire surface of the tactile presentation touch panel 400. When touch is detected in an area used as a touch panel that does not perform tactile presentation, a touch position is calculated and output. When the indicator 2 comes into contact with the tactile presentation knob 3, touch detection is stopped in an area where the tactile presentation knob 3 is not placed, and operation is performed at an operation timing when the indicator 2 comes into contact with the tactile presentation knob 3 as described above (see FIG. 31) only in an area where the tactile presentation knob 3 is placed.

In a case where an area where the tactile presentation knob 3 is not placed is used as a touch panel that presents a tactile sense, when the indicator 2 is not in contact with the tactile presentation knob 3, an operation timing (see FIG. 29) of when the indicator 2 is not in contact with the tactile presentation knob 3 is repeated for an entire surface of the tactile presentation touch panel 400. When touch detection is performed in an area used as a touch panel that performs tactile presentation, operation is performed at an operation timing of when the indicator 2 is in contact with the tactile presentation knob 3 as described above (see FIG. 31). When the indicator 2 comes into contact with the tactile presentation knob 3, touch detection is stopped in an area where the tactile presentation knob 3 is not placed, and operation is performed at an operation timing when the indicator 2 comes into contact with the tactile presentation knob 3 as described above (see FIG. 31) only in an area where the tactile presentation knob 3 is placed.

As a preferable condition of the excitation electrode 202 and the detection electrode 203, firstly, in order to ensure sensitivity and linearity of touch position detection, a matrix structure by which a touch position can be identified accurately is required. Secondly, since the indicator 2 and the detection electrode 203 detect the touch position by the electrostatic capacitance $C_{ND}$ formed through the tactile presentation screen 150, it is necessary to provide a predetermined distance (several hundred μm or more and several mm or less) between the excitation electrode 202 and the detection electrode 203 so that an electric field spreads in the lateral direction.

As described above, there is a difference between a preferable condition of the tactile electrode 102 and a preferable condition of the excitation electrode 202 and the detection electrode 203. In order to optimize both conditions, it is not desirable to apply similar structures to them.

<Details of Lead-Out Wiring Layer>

The lead-out wiring layers 105 (FIG. 15) of the tactile presentation screen 150 specifically include lead-out wiring layers Ld(1) to Ld(j) and lead-out wiring layers Lu(1) to Lu(j). Assuming that an integer of any of numbers 1 to j is k, each of the lead-out wiring layers Ld(k) and Lu(k) is connected to the k-th tactile electrode 102. Each of the lead-out wiring layers Ld(k) and Lu(k) is connected to a first end and a second end in an extending direction of one of the tactile electrode 102.

Wiring resistance of each of the tactile electrodes 102 provided on the tactile presentation screen 150 is desirably high resistance from the viewpoint of not hindering touch detection by the touch screen 250, and is desirably, for example, 104Ω or more. In a case where wiring resistance is high as described above, propagation delay of a voltage signal in a wiring layer is likely to occur. As described above, the lead-out wiring layer 105 is connected to each of the first end and the second end of the tactile electrode 102, so that propagation delay can be suppressed.

The lead-out wiring layers Ld(1) to Ld(j) are arranged outside the tactile presentable area, and extend to corresponding electrodes in order from one closer to the center of an array of the tactile presentation panel terminal portions 107 so that a substantially shortest distance from the tactile presentation panel terminal portions 107 can be obtained. The tactile presentation panel terminal portion 107 is arranged in the vicinity of the center of a long side of the transparent insulating substrate 101 along the long side. The lead-out wiring layers Ld(1) to Ld(j) are arranged as densely as possible while securing mutual insulation. The lead-out wiring layers Lu(1) to Lu(j) are similarly arranged outside a region occupied by the lead-out wiring layers Ld(l) to Ld(j). With such arrangement, it is possible to suppress an area of a portion outside the tactile presentable area of the transparent insulating substrate 101.

The lead-out wiring layers 105, specifically, the lead-out wiring layers Ld(1) to Ld(j) and the lead-out wiring layers Lu(1) to Lu(j) are preferably composed of either a metal single-layer film or a laminated film of a metal single-layer and a non-metal single-layer. In a case where the laminated film has a lower layer and an upper layer covering the lower layer, the upper layer may have a function as a protective layer of the lower layer. For example, the upper layer as a protective layer may protect the lower layer from an etchant in an etching process used to manufacture the tactile presentation screen 150. Alternatively, the upper layer may function as a cap layer that prevents corrosion of the lower layer during manufacture or use of the tactile presentation screen 150. When a material of the lower layer is a material having more excellent adhesion to the transparent insulating substrate 101 than a material of the upper layer, the occurrence of peeling of the lead-out wiring layer 105 can be suppressed.

<Region Division of Operation Surface>

Figure 37:
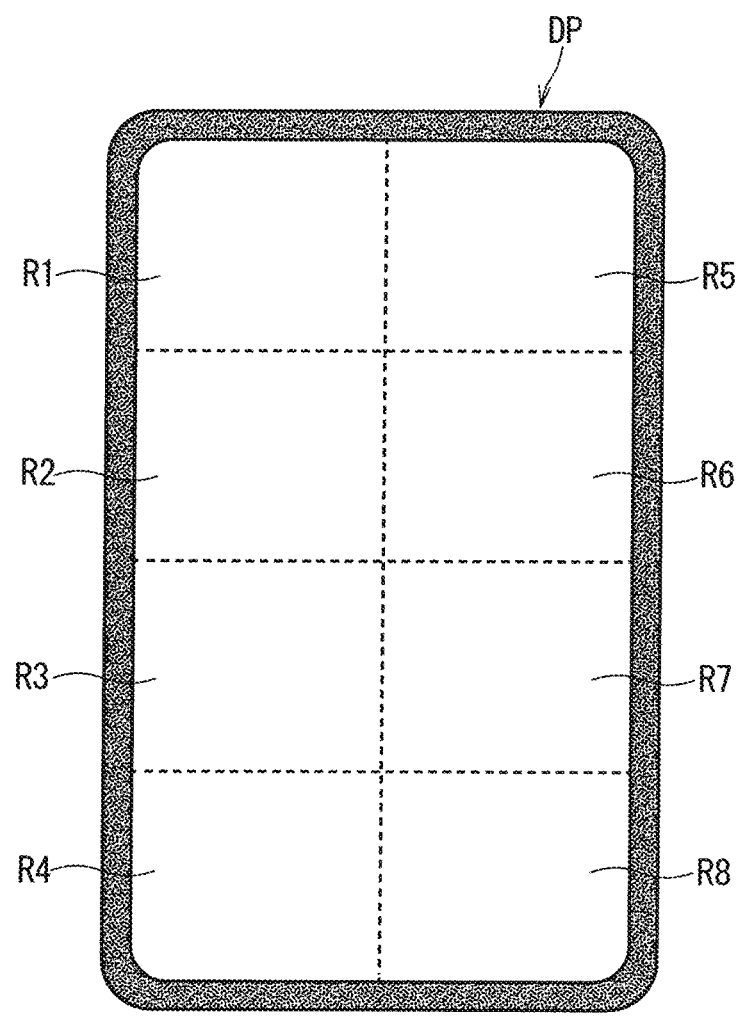
FIG. 37 is a diagram illustrating an example of region division of a display according to the first embodiment.

FIG. 37 is a diagram illustrating an example of region division in a display DP in which an operation surface of the tactile presentation panel 100 is divided into a plurality of regions, and a control target and a presented tactile sense are made different for each divided region. In the example illustrated in FIG. 37, the operation surface of the display DP is divided into eight portions of four rows and two columns, and divided regions R1 to R8 are obtained.

Each region is larger than the tactile presentation knob 3 (not shown) in plan view, and the tactile presentation knob 3 is placed in the divided region, and when the control target assigned to the divided region is selected and operation such as rotating the tactile presentation knob 3 in the divided region where the tactile presentation knob 3 is placed, the control target assigned to the divided region can be controlled. An image of the control target is displayed in each divided region, and the user selects the control target based on the image display and places the tactile presentation knob 3.

Figure 38:
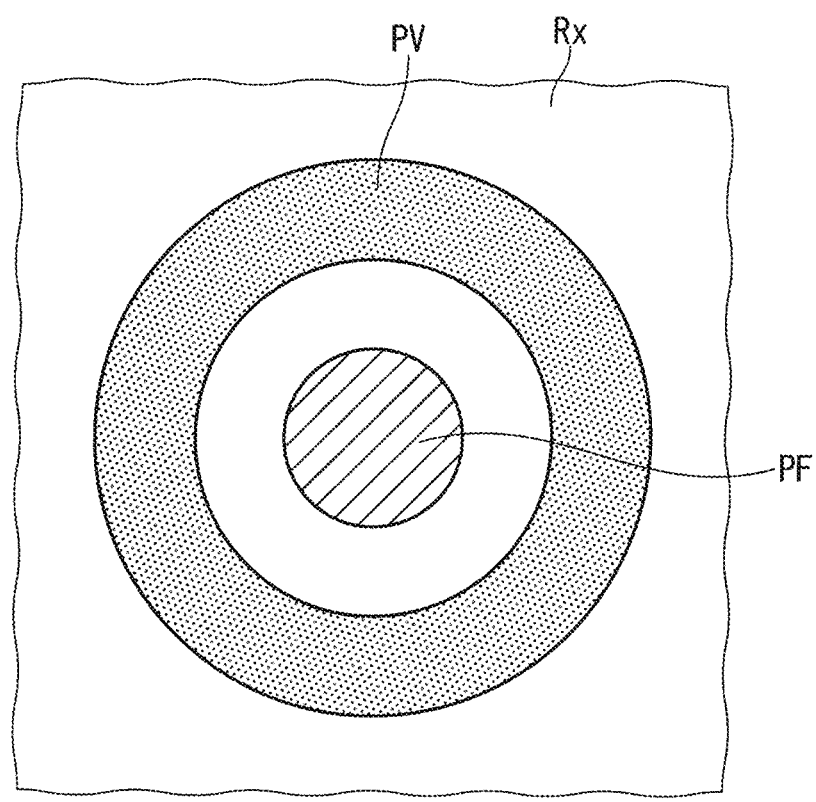
FIG. 38 is a diagram illustrating a positional relationship with a configuration of a back surface of the tactile presentation knob in a case where a tactile presentation knob 3 is placed on a divided region.

FIG. 38 is a diagram illustrating a positional relationship with a configuration of a back surface of the tactile presentation knob 3 in a case where the tactile presentation knob 3 is placed in one divided region Rx. As illustrated in FIG. 38, a region PV in contact with the conductive elastic portion 6 on a back surface of the tactile presentation knob 3 is a ring-shaped region in which a frictional force changes based on a voltage signal. Further, a region PF in contact with the adhesive portion 17 of the tactile presentation knob 3 is a region that generates a strong electrostatic force to attract the fixing portion 5 or a region that attracts and fixes the fixing portion 5 by a magnetic force.

The tactile presentation knob 3 fixed in the divided region can provide the user with information of which region is selected, what operation is performed, an operation amount, and the like by presenting a different tactile sense for each divided region according to operation.

By changing strength of a frictional force between the tactile presentation panel 100 and the tactile presentation knob 3, a cycle of applying a frictional force, and time of applying a frictional force, it is possible to change a tactile sense presented to the user, such as a vibration feeling, a climbing feeling, and a click feeling.

For example, in the divided regions R1 to R4 and the divided regions R5 to R8, frictional forces are generated at different cycles, strength of the frictional forces is set so that R1>R2>R3>R4 and R5>R6>R7>R8 are established, the divided regions R1 and R5 are set to be the strongest, and the divided regions R4 and R8 are set to be the weakest, so that the user can perceive which divided region the user is operating. The presented tactile sense is not limited to a frictional force, and a specific tactile sense may be assigned according to a control target.

Figure 39:
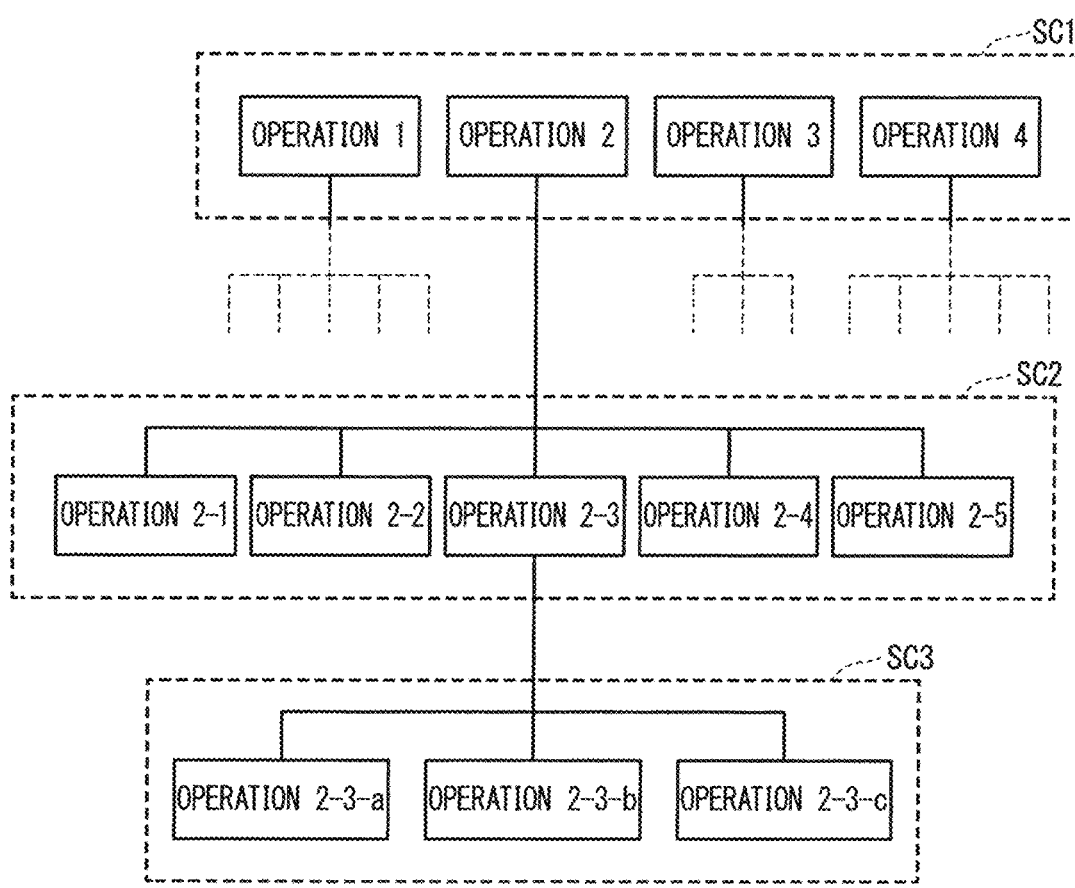
FIG. 39 is a diagram illustrating a relationship between a screen and operation in a case where a control target displayed on a divided operation surface has a hierarchical structure.

FIG. 39 is a diagram illustrating a relationship between a screen and operation in a case where a control target displayed on a divided operation surface has a hierarchical structure. In FIG. 39, it is assumed that a first screen SC1, a second screen SC2, and a third screen SC3 are displayed on the operation surface, and the first screen SC1 is a screen on which Operation 1, Operation 2, Operation 3, and Operation 4 can be selected. Here, when Operation 2 is selected from the first screen SC1, the display is switched to the second screen SC2 on a lower hierarchy.

The second screen SC2 is a screen on which Operation 2-1, Operation 2-2, Operation 2-3, Operation 2-4, and Operation 2-5 obtained by classifying a control target of Operation 2 in more detail can be selected.

Here, when Operation 2-3 is selected from the second screen SC2, the display is switched to the third screen SC3 on a lower hierarchy. The third screen SC3 is a screen on which Operation 2-3-*a*, Operation 2-3-*b*, and Operation 2-3-*c* obtained by classifying a control target of Operation 2-3 in more detail can be selected.

Further, each of the first to third screens SC1 to SC3 includes a region for performing operation of returning to a screen one hierarchy higher, and the first to third screens SC1 to SC3 can be optionally displayed. Note that, in the present embodiment, the example in which operation is divided into three hierarchies is described. However, the number of hierarchies is not limited and is preferably the number of display regions according to operation content.

Hereinafter, an example of a screen of each hierarchy in a case where operation is divided into three hierarchies will be described with reference to FIGS. 40 to 42. FIGS. 40 to 42 are examples of a center display of a console of an automobile, and FIGS. 40 to 42 illustrate the first to third screens SC1 to SC3, respectively.

As illustrated in FIG. 40 an operation region OR1 for navigation (NAVIGATION), an operation region OR2 for audio volume (VOLUME), an operation region OR3 for an air conditioner (AIR CONDITIONER), and an operation region OR4 for music (MUSIC) are displayed on the first screen SC1.

Here, when the operation region OR3 of the air conditioner is selected, the second screen SC2 is displayed as illustrated in FIG. 41. On the second screen SC2, an operation region OR31 for an air volume (AIR FLOW), an operation region OR32 for a circulation mode (INNER LOOP), and an operation region OR33 for temperature setting (HOT/COOL) are displayed. Further, an operation region RT for returning to the first screen SC1, which is a screen of an upper hierarchy, is also displayed.

Here, when the operation region OR33 for temperature setting is selected, the third screen SC3 is displayed as illustrated in FIG. 42. On the third screen SC3, an operation region OR331 for displaying a temperature and an OR region OR332 for setting a temperature are displayed. Further, the operation region 1 T for returning to the second screen SC2, which is a screen of an upper hierarchy, is also displayed.

In determination of an operation region, as the tactile presentation knob 3 is pushed toward the operation surface side, the pressure sensitive sensor 216 (see FIG. 1) arranged below the display panel 300 detects a pressing force, and the pressing force equal to or more than a predetermined pressing force is received as determination operation. In this manner, it is possible to perform operation in which operation of pressing down the tactile presentation knob 3 and operation of rotating the tactile presentation knob 3 are combined.

Other than the above, operation of quickly slightly rotating the tactile presentation knob 3 or operation of slightly moving the tactile presentation knob 3 up, down, left, and right on the operation surface may be received as the determination operation.

Next, the tactile presentation knob 3 is placed on the operation region OR332 for setting a temperature, and rotation operation is performed until a value of a set temperature is displayed. At this time, as described above, as control to change a frictional force between the tactile presentation knob 3 and the operation surface is performed, the user is given an operation feeling of when tactile presentation knob 3 is rotated. When the tactile presentation knob 3 is rotated clockwise, temperature display rises, and when the tactile presentation knob 3 is rotated counterclockwise, temperature display falls. When the tactile presentation knob 3 is pushed onto the display from above after a temperature value desired to be set is displayed, the pressure sensitive sensor 216 (see FIG. 1) arranged below the display panel 300 detects a pressing force, and a temperature is set to the displayed temperature and the temperature setting operation is completed. After the above, the screen may automatically return to the first screen SC1 on the uppermost hierarchy, or the operation region RT for returning to a screen of an upper hierarchy may be selected manually to return to the screen of the upper hierarchy.

Other than the above, for example, in a case of music playback operation, when the tactile presentation knob 3 is moved into the region of OR4 in FIG. 40 and the tactile presentation knob 3 is pushed onto the display from above, the pressure sensitive sensor 216 (see FIG. 1) arranged below the display panel 300 detects a pressing force, and the music playback operation is determined. After the above, the screen moves to a next operation screen, and operation of "music selection", "playback mode selection", and the like are displayed in divided regions. When the tactile presentation knob 3 is moved onto the "playback mode selection" and pushed onto the display from above, "playback once in registration order", "repeat playback", "random playback", and the like are displayed in divided regions, and selection operation is performed with the tactile presentation knob 3 in the same manner as described above.

The number of divisions of the operation surface may be any number as long as each divided region has a size capable of including the tactile presentation knob 3. The anangement of the divided regions is not limited to left-right symmetry or point symmetry, and the shape of the divided region is not limited to a square, and can be set to any shape such as a polygon, a circle or a semicircle, a fan, or an ellipse.

For example, the divided region can be arranged in a manner that is ergonomically efficient and unlikely to induce erroneous operation, in such a manner that, according to a control target to be displayed, a control target having a high operation frequency is arranged at a position where the user can easily operate, or is arranged so as to be larger than other divided regions.

<Effect>

According to the first embodiment described above, by using the tactile presentation knob 3 that can be installed at an optional position on the tactile presentation touch panel 400 and operated, the user can select and operate an optional control target in the same manner as touch operation with a finger by touch panel operation only by sliding, rotation, and pressing operation of the knob. Further, by changing the tactile sense according to a control target or an operation amount, it is possible to obtain an effect that it is possible to perform an intuitive operation by a tactile sense of the user and it is possible to give an operation feeling of the dial knob that is user-friendly. Further, various operations divided into several hierarchies can be performed only with the tactile presentation knob 3, and operation switches can be unified. In this manner, it is possible to obtain effects of simplifying an operation system, reducing a region in which an operation switch is arranged, and realizing a user interface excellent in spatial design and comfort.

Second Embodiment

<Presentation of Operation Region of Tactile Presentation Knob>

Figure 43:
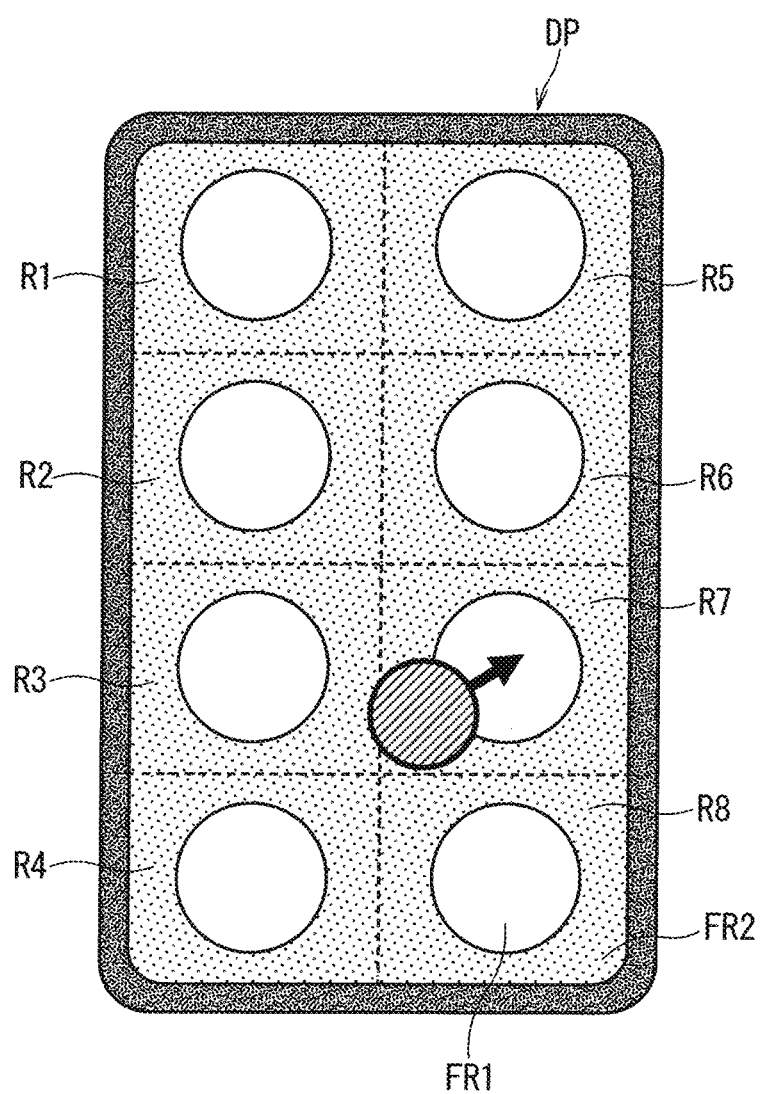
FIG. 43 is a diagram that describes operation of moving the tactile presentation knob to select an operation region in the display in the first embodiment.

A second embodiment will be described below with reference to FIGS. 43 to 54. FIG. 43 is a diagram that describes operation of selecting an operation region by moving the tactile presentation knob 3 on the display DP in which the operation surface is divided into eight portions of four rows and two columns, and illustrates arrangement of frictional forces on the operation surface.

As illustrated in FIG. 43, in each of the divided regions R1 to R8, a region FR1 (first region) having a small frictional force in a central portion and a region FR2 (second region) having a large frictional force around the region FR1 are provided. The region FR1 is an ideal position (home position) where the tactile presentation knob 3 is arranged when any divided region is selected as an operation region, and is in a state where a frictional force is small. In this manner, when the tactile presentation knob 3 approaches a center position of an operation region via the region FR2 where a frictional force is large as indicated by an arrow and reaches the region FR1 having a small frictional force, the tactile presentation knob 3 easily slides toward the region FR1 having a small frictional force, and as a result, the tactile presentation knob 3 is guided to the center position of the operation region. For this reason, when the tactile presentation knob 3 is slid and moved on the operation surface in order to select an operation region, a state in which the frictional force is large is changed to a state in which the frictional force is small, and the user can recognize that the tactile presentation knob 3 has entered the operation region.

FIG. 44 is a diagram that describes operation of selecting an operation region by moving the tactile presentation knob 3 on the display DP in which the operation surface is divided into eight portions of four rows and two columns, and illustrates arrangement of attractive forces on the operation surface. As illustrated in FIG. 44, in each of the divided regions R1 to R8, a region MR1 (fourth region) where an attractive force is applied in a central portion and a region MR2 (third region) where no attractive force is applied around the region MR1 are provided. The region MR1 is an ideal position where the tactile presentation knob 3 is arranged when any divided region is selected as an operation region, and is in a state where an attractive force is applied. As the attractive force, a magnetic force can be used, and a weak magnetic force is generated at the center position of the operation region. In this manner, when the tactile presentation knob 3 approaches the center position of the operation region through the region MR2 where no attractive force is applied as indicated by an arrow and reaches the region MR1 where the attractive force is applied, the tactile presentation knob 3 is attracted, and as a result, the tactile presentation knob 3 is guided to the center position of the operation region. For this reason, when the tactile presentation knob 3 is slid and moved on the operation surface to select the Operation region, when the tactile presentation knob 3 is about to pass through the region MR1, an attractive force due to a magnetic force or an electrostatic force is applied, and the user can recognize that the tactile presentation knob 3 has entered the region. In a case of attraction and fixation by an electrostatic force, it is not necessary to continuously apply a voltage signal during the attraction after a strong electrostatic force is generated and the knob is attracted, and it is only required to intermittently apply a voltage signal so that the attractive force does not decrease in consideration of diffusion of charges.

Figure 45:
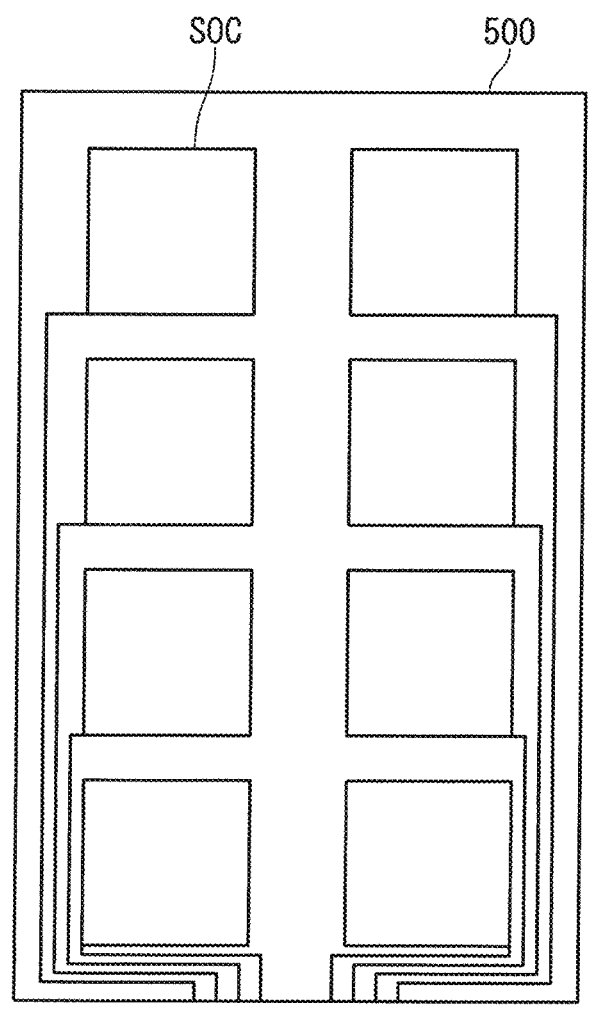
FIG. 45 is a diagram illustrating a configuration for generating a magnetic force in the display in the second embodiment.

FIG. 45 is a diagram illustrating a configuration in which a magnetic force is generated in a central portion in each of the divided regions R1 to R8. FIG. 45 illustrates the magnetic force generation substrate 500 in which eight solenoid coils SOC are arranged in a matrix of four rows and two columns so as to correspond to the divided regions R1 to R8 illustrated in FIG. 44.

Figure 46:
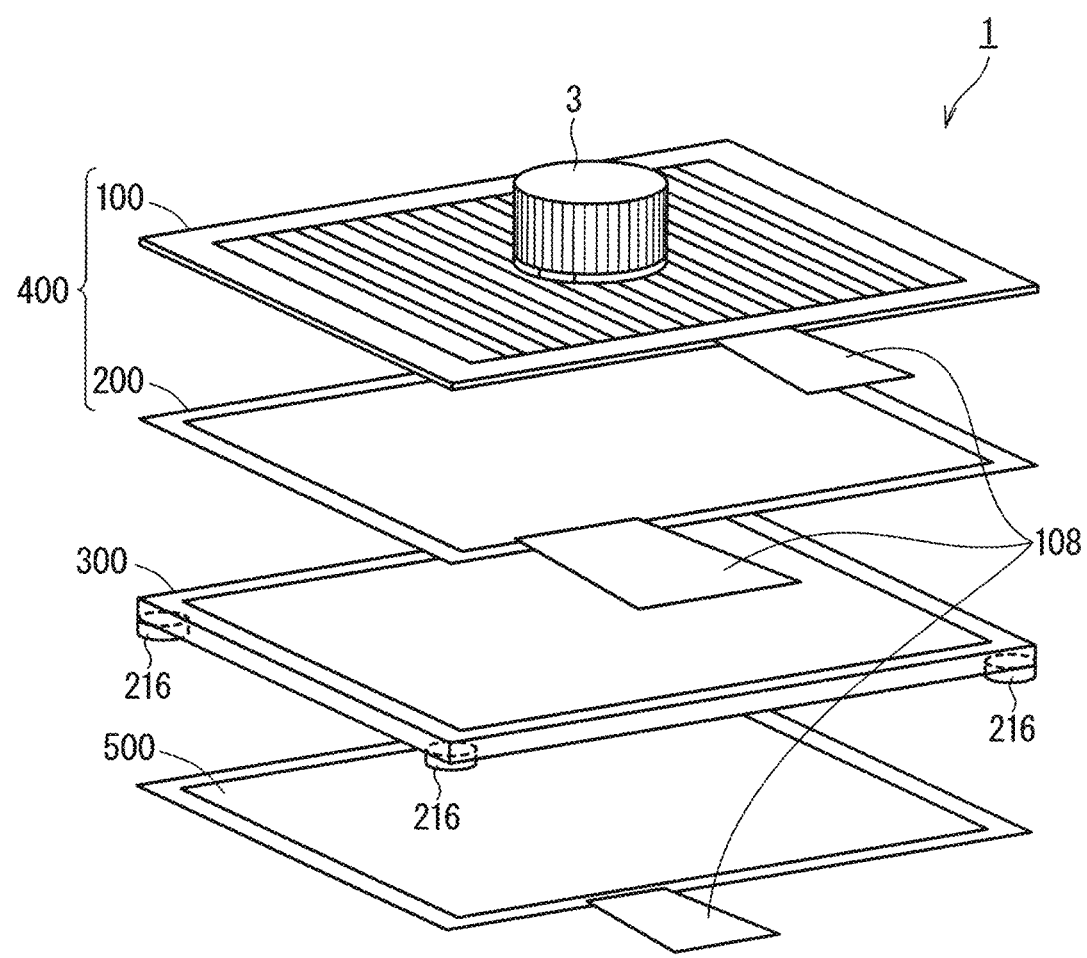
FIG. 46 is a diagram illustrating arrangement of a magnetic force generation substrate in the display in the second embodiment.

As illustrated in FIG. 46, the magnetic force generation substrate 500 is arranged on the side opposite to the operation surface of the display panel 300. As illustrated in FIG. 44, the arrangement of the solenoid coils SOC may coincide with the arrangement of the divided regions of the operation surface, and by arranging the solenoid coils SOC larger in number than the number of the divided regions, a magnetic force may be generated by a plurality of the solenoid coils SOC with respect to one divided region, so that arrangement in which magnetic forces are different in the divided region can be supported. Note that, in a case where a magnetic force is generated by using the magnetic force generation substrate 500, the solenoid coil SOC is controlled using the magnetic force generation circuit 260 illustrated in FIGS. 28 and 36.

When the current supply from the magnetic force generation circuit 260 to the solenoid coil SOC is stopped, no magnetic force is generated, and a region where an attraction force is generated by a magnetic force can be controlled. Further, in the solenoid coil SOC, the strength of a magnetic force and a generation region can be optionally set, and an attraction force can be arranged as illustrated in FIG. 44. Further, in a region where the magnetic force generated by the solenoid coil SOC is not generated, an electrostatic force may be generated by the tactile electrode 102 to form a frictional force.

Figure 47:
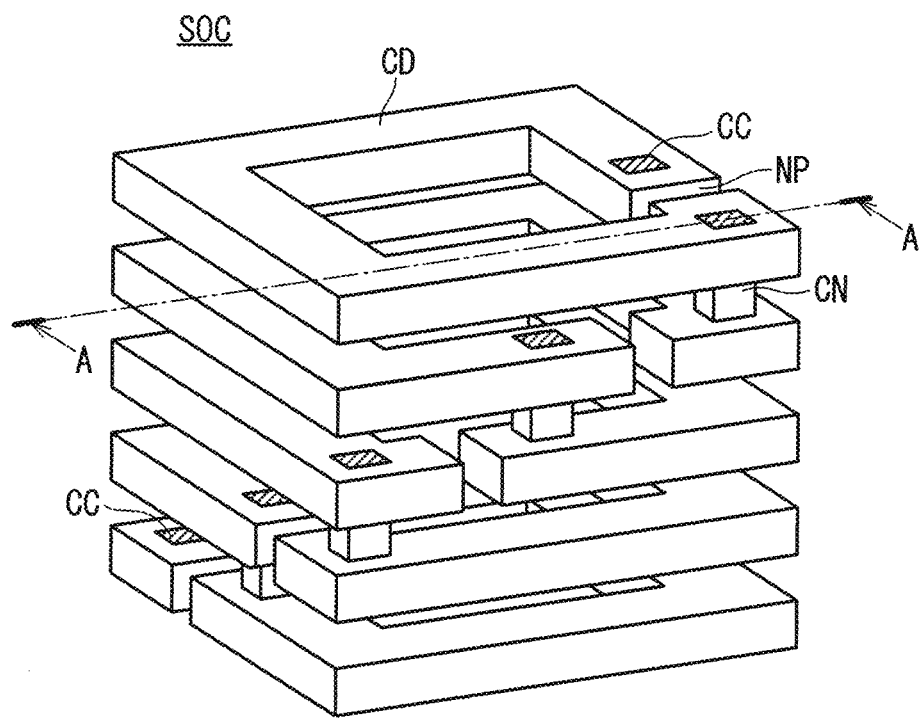
FIG. 47 is a perspective view illustrating an example of a configuration of a solenoid coil in the second embodiment.

FIG. 47 is a perspective view illustrating an example of a configuration of the solenoid coil SOC. As illustrated in FIG. 47, in the solenoid coil SOC, a layered structure is formed by a plurality of conductor layers CD made from a conductive material, a notch portion NP is provided on each of the conductor layers CD, and an interlayer connection portion CN is provided so as to sandwich the notch portion NP, so that an eddy like current path is formed. The current is input and output by a wiring (not illustrated) connected to connection portions CC provided on uppermost and lowermost ones of the conductor layers CD.

Figure 48:
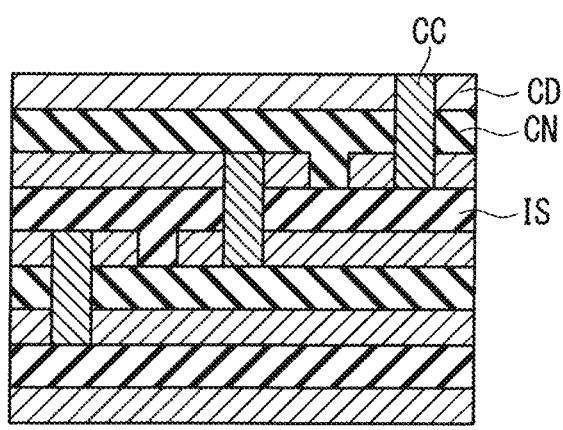
FIG. 48 is a cross-sectional view illustrating an example of the configuration of the solenoid coil in the second embodiment.

FIG. 48 is a cross-sectional view taken along line A-A in an arrow direction in FIG. 47. As illustrated in FIG. 48, an insulating layer IS is provided between the conductor layers CD, and the interlayer connection portion CN made from a conductive material is provided so as to penetrate an insulating layer IS to electrically connect the conductor layer CD of an upper layer and the conductor layer CD of a lower layer. Note that, in FIG. 47, the conductor layer CD has a quadrangular shape in plan view. However, the shape is not limited to this.

Figure 49:
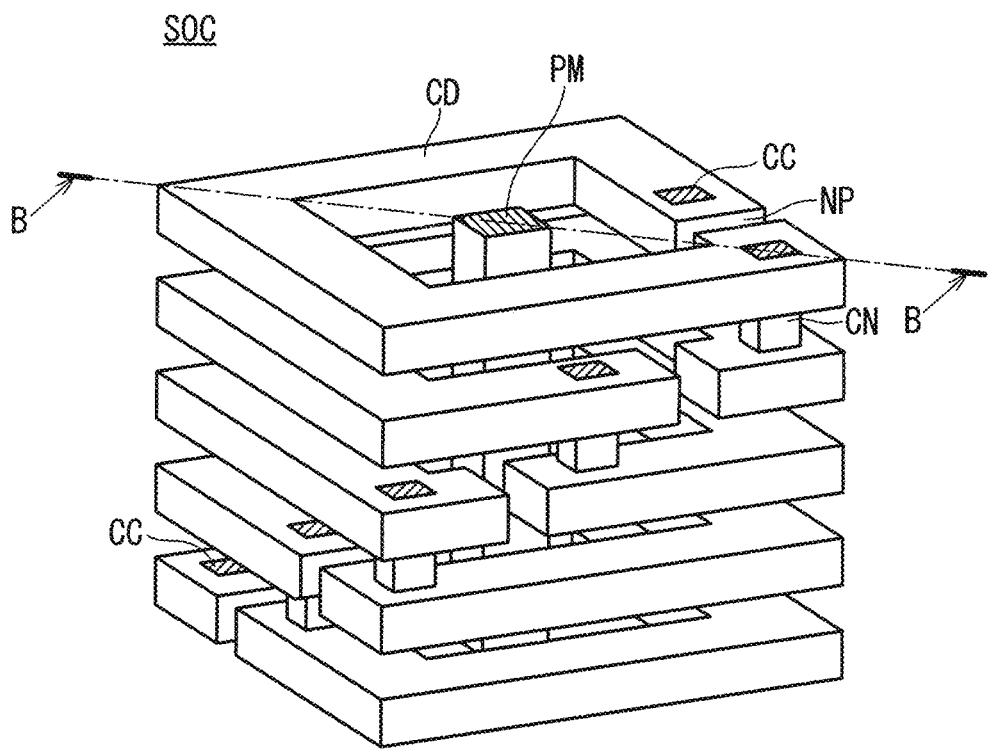
FIG. 49 is a perspective view illustrating an example of the configuration of the solenoid coil in the second embodiment.
Figure 50:
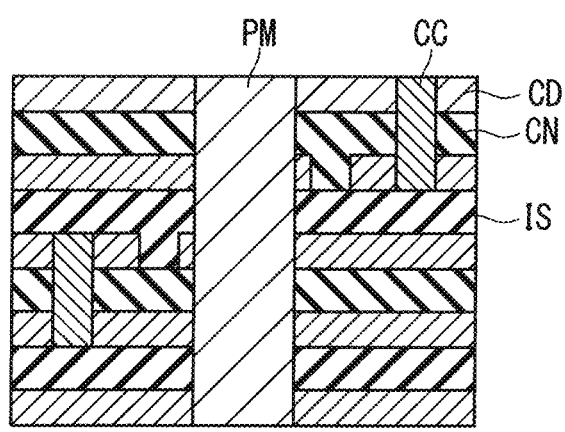
FIG. 50 is a cross-sectional view illustrating an example of the configuration of the solenoid coil in the second embodiment.

FIG. 49 is a perspective view illustrating another example of the configuration of the solenoid coil SOC. As illustrated in FIG. 49, in the solenoid coil SOC, a magnet PM made from a paramagnetic material or a ferromagnetic material is arranged so as to penetrate the center of a layered structure in a height direction. FIG. 50 is a cross-sectional view taken along line B-B in an arrow direction in FIG. 49. As illustrated in FIG. 50, the magnet PM can be formed by providing a through hole penetrating the insulating layer IS at the center of the layered structure in the height direction and embedding the through hole with a paramagnetic material or a ferromagnetic material. By providing the magnet PM, a stronger magnetic force can be generated.

Figure 51:
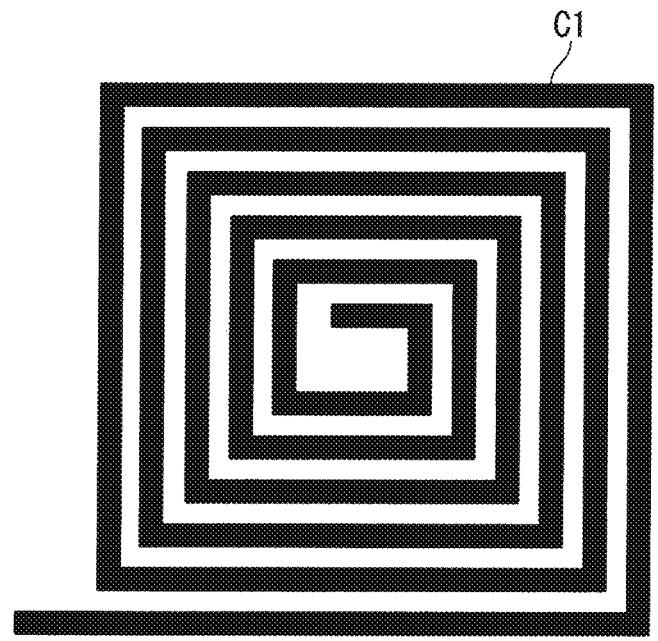
FIG. 51 is a cross-sectional view illustrating an example of a configuration of a coil in the second embodiment.
Figure 52:
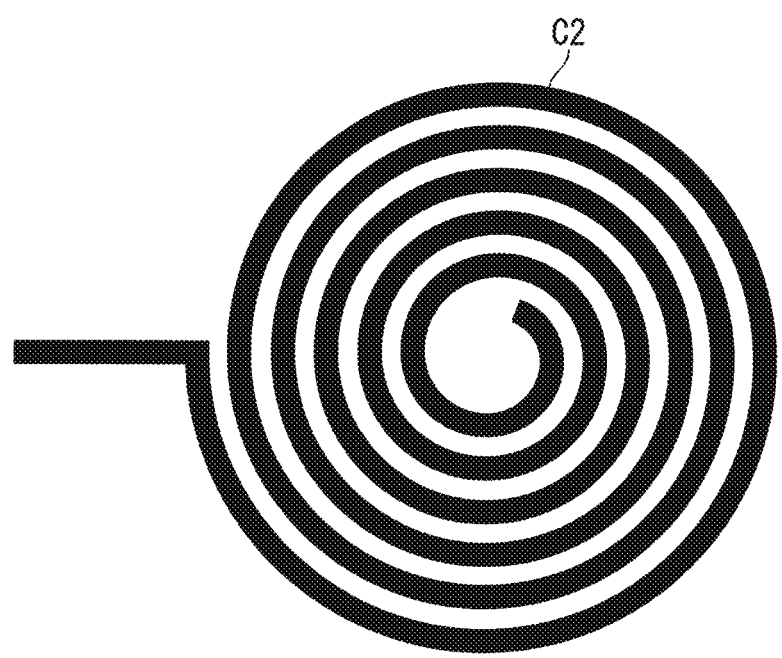
FIG. 52 is a cross-sectional view illustrating an example of the configuration of the coil in the second embodiment.

In the above description, the configuration in which a magnetic force is generated using the solenoid coil is described. However, generation of a magnetic force is not limited to that using the solenoid coil, and a coil other than a solenoid coil may be used. For example, a spiral coil C1 having a quadrangular shape in planar view as illustrated in FIG. 51 or a spiral coil C2 having a circular shape in planar view as illustrated in FIG. 52 may be used.

Figure 53:
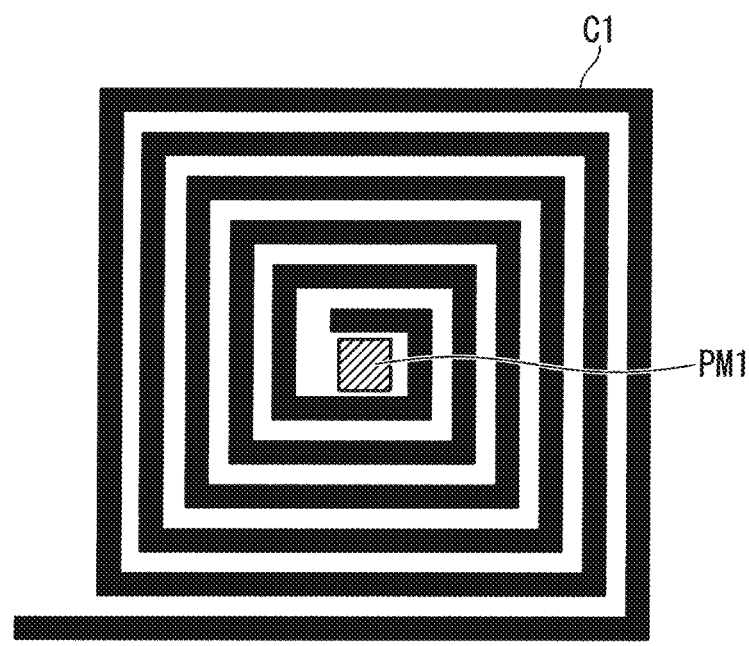
FIG. 53 is a cross-sectional view illustrating an example of the configuration of the coil in the second embodiment.
Figure 54:
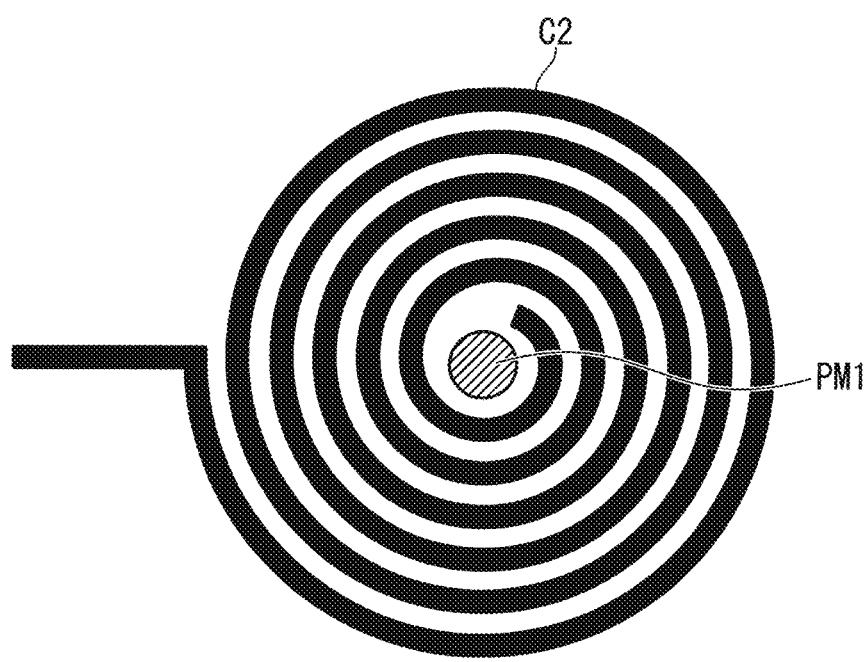
FIG. 54 is a cross-sectional view illustrating an example of the configuration of the coil in the second embodiment.

Further, similarly to the solenoid coil SOC, a magnet may be combined with these coils. FIG. 53 illustrates a configuration in which a magnet PM1 made from a paramagnetic material is arranged at the center of the spiral coil C1. Further, FIG. 54 illustrates a configuration in which the magnet PM1 made from a paramagnetic material is arranged at the center of the spiral coil C2. By providing the magnet PM1, a stronger magnetic force can be generated.

<Effect>

According to the second embodiment described above, by using the tactile presentation knob 3 that can be installed at an optional position on the tactile presentation touch panel 400 and operated, the user can select and operate an optional control target in the same manner as touch operation with a finger. Further, when the knob is slid and moved to an optional operation region, the knob is guided to the home position of the operation region by an electrostatic force or an attractive force by a magnetic force, so that an effect that the knob can be moved without visual check of the operation region can be obtained. Further, after the user installs the knob at an optional position on the tactile presentation touch panel 400 and moves the operation position by the slide operation, as in the first embodiment, the user can select and operate an optional control target by touch panel operation only by slide, rotation, and pressing operation of the knob similarly to the touch operation with a finger. Further, by changing a tactile sense according to a control target or an operation amount, it is possible to obtain an effect that it is possible to perform an intuitive operation by a tactile sense of the user and it is possible to give an operation feeling of the dial knob that is user-friendly. Further, various operations divided into several hierarchies can be performed only with the tactile presentation knob 3, and operation switches can be unified. In this manner, it is possible to obtain effects of simplifying an operation system, reducing a region in which an operation switch is arranged, and realizing a user interface excellent in spatial design and comfort.

Third Embodiment

<Guidance of Tactile Presentation Knob at Region Boundary>

A third embodiment will be described below with reference to FIGS. 55 to 63. FIGS. 55 to 57 are diagrams for explaining a configuration of guiding the tactile presentation knob 3 by reducing a frictional force at a region boundary of a divided region on the display DP in which the operation surface is divided into eight portions of four rows and two columns, and illustrate arrangement of a frictional force on the operation surface.

In a case where the tactile presentation knob 3 is slid to move on the operation surface, when the touch detection circuit 210 (see FIG. 28) of the touch panel 200 detects that the tactile presentation knob 3 starts to move, the movement direction prediction circuit 230 (see FIG. 28) predicts a movement direction of the tactile presentation knob 3 from a position change of the tactile presentation knob 3. For example, in a case where the angle of the tactile presentation knob 3 is changed from the current position, as described with reference to FIG. 26, the position detection unit 7 detects a rotation amount (rotation angle), and a translational movement amount (movement distance) in a case of translational motion (sliding), so that a direction in which the tactile presentation knob 3 moves is predicted, and the tactile presentation knob 3 is prevented from going in a direction in which the tactile presentation knob 3 does not move. Alternatively, in a case where operation of the operator immediately before the tactile presentation knob 3 moves is different from a predicted direction in which the tactile presentation knob 3 moves, or in a case where it is desired to guide the tactile presentation knob 3 to a predetermined divided region, the tactile presentation knob 3 can be prevented from going in a direction in which the tactile presentation knob 3 is not to be moved.

As illustrated in FIG. 55, in a case where the movement direction prediction circuit 230 predicts that movement of the tactile presentation knob 3 is a movement on a region boundary of a divided region, in order not to hinder the movement of the tactile presentation knob 3, for example, as illustrated in FIG. 43, the region FR2 (fifth region) having a large frictional force provided at a region boundary of a divided region is reduced, the region FR2 having a large frictional force is provided only in the vicinity of an end edge portion of the display DP, and the region FR2 having a small frictional force is provided on a region boundary of a divided region located in a movement direction of the tactile presentation knob 3 as indicated by an arrow. A frictional force of each divided region can be the same as that in the first embodiment.

Then, as illustrated in FIG. 56, the divided regions R4 and R8, through which the tactile presentation knob 3 passes and which are determined not to be selected, are closed by providing a region FR3 having a large frictional force on a region boundary, so that the tactile presentation knob 3 is prevented from unintentionally moving in a direction opposite to a movement direction indicated by an arrow due to shaking of the user's body or the like. In a case where the position of the tactile presentation knob 3 is maintained in a state of being in contact with the boundary region FR3 for optional time, a course of the tactile presentation knob 3 is regarded to be changed to be in a direction opposite to a direction determined as a movement direction, and generation of a frictional force in the boundary region FR3 is stopped or the frictional force is reduced, so that the tactile presentation knob 3 is set to be in a state of being able to be moved backward by setting as illustrated in FIG. 55. Lengths of the optional time may be set to different lengths between during driving of a car and during stoppage of the car, for example. The optional time may be set longer during driving in which erroneous operation is likely to occur due to vibration of a vehicle body or shaking of the body of the operator, and may be set shorter during stoppage in which erroneous operation is less likely to occur than during driving.

Further, as illustrated in FIG. 57, in a case where the movement direction prediction circuit 230 predicts that the tactile presentation knob 3 is moving to the specific divided region R6 indicated by an arrow, a region boundary of the divided region other than the divided region as a movement destination is provided with the region FR2 having a large frictional force, and the tactile presentation knob 3 is surrounded by a region having a large frictional force, so that movement of the tactile presentation knob 3 to a region having a low frictional force is promoted, and the operation region is presented to the user and erroneous operation is prevented.

Figure 59:
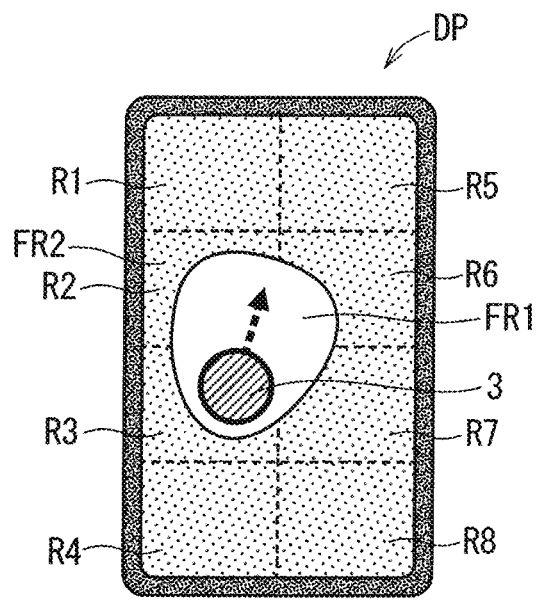
FIG. 59 is a diagram for explaining a configuration of guiding the tactile presentation knob in the display in the third embodiment.
Figure 60:
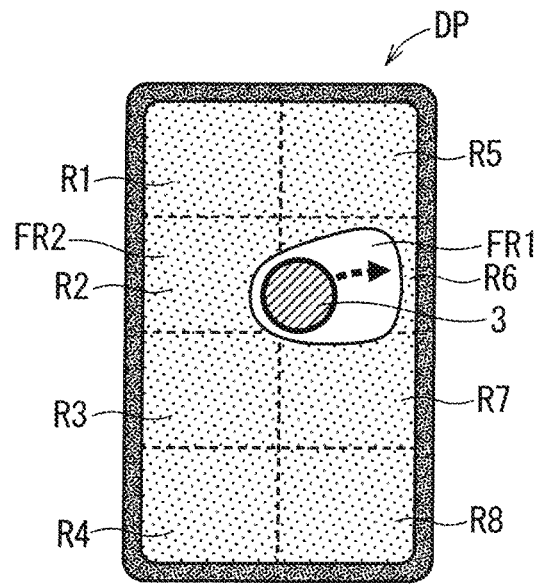
FIG. 60 is a diagram for explaining a configuration of guiding the tactile presentation knob in the display in the third embodiment.

FIGS. 58 to 60 are diagrams for explaining a configuration of guiding the tactile presentation knob 3 by reducing a frictional force in a movement direction of the tactile presentation knob 3 on the display DP in which the operation surface is divided into eight portions of four rows and two columns, and illustrate arrangement of a frictional force on the operation surface.

As illustrated in FIG. 58, a portion where the tactile presentation knob 3 is present is set to the region FR1 (sixth region) having a small frictional force, and the region FR1 having a small frictional force is made small in a direction of in opposite to the movement direction with respect to the movement direction (arrow direction) of the tactile presentation knob 3 predicted by the movement direction prediction circuit 230, so that unintended backward movement of the tactile presentation knob 3 is suppressed. In contrast, in the movement direction of the tactile presentation knob 3, the region FR1 having a small frictional force is made large so that the tactile presentation knob 3 can easily move forward and in left and right directions. Further, in a case where operation of the operator immediately before the tactile presentation knob 3 moves is different from a predicted movement direction of the tactile presentation knob 3, or in a case where the tactile presentation knob 3 is desired to be guided to a predetermined divided region, it is also possible to provide a large region for the region FR1 having a small frictional force in a direction in which the tactile presentation knob 3 is desired to move, and guide the tactile presentation knob 3 in the direction in which the tactile presentation knob 3 is desired to move.

Further, as illustrated in FIG. 59 in a case where the movement direction of the tactile presentation knob 3 is changed, a set range of the region FM having a small frictional force is changed in accordance with the movement direction.

Further, as illustrated in FIG. 60, in a case where the movement direction prediction circuit 230 predicts that tactile presentation knob 3 is moving to the specific divided region R6 indicated by an arrow, a set range of the region FR1 having a small frictional force is reduced, and the tactile presentation knob 3 is guided to the center of the operation region.

As described above, by limiting a movable range of the tactile presentation knob 3 in accordance with a movement direction of the tactile presentation knob 3, the operation region is presented to the user, and an erroneous operation is prevented.

Figure 61:
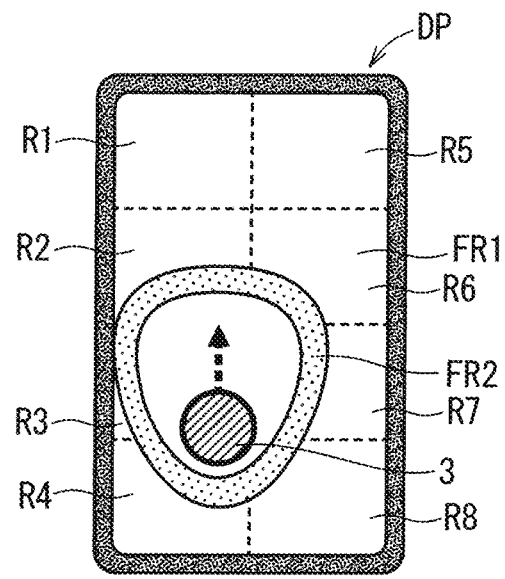
FIG. 61 is a diagram for explaining a configuration of guiding the tactile presentation knob in the display in the third embodiment.
Figure 62:
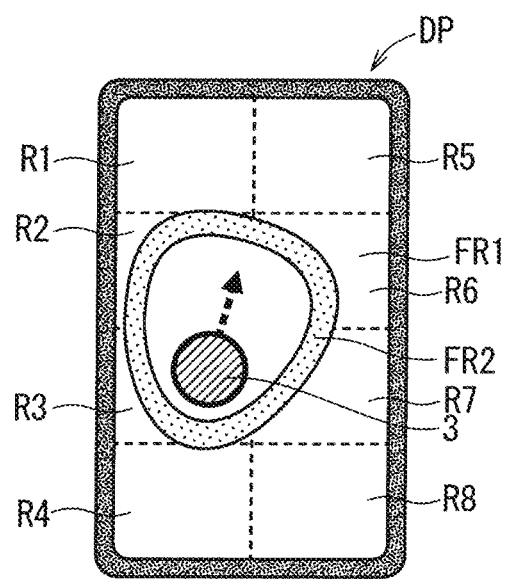
FIG. 62 is a diagram for explaining a configuration of guiding the tactile presentation knob in the display in the third embodiment.
Figure 63:
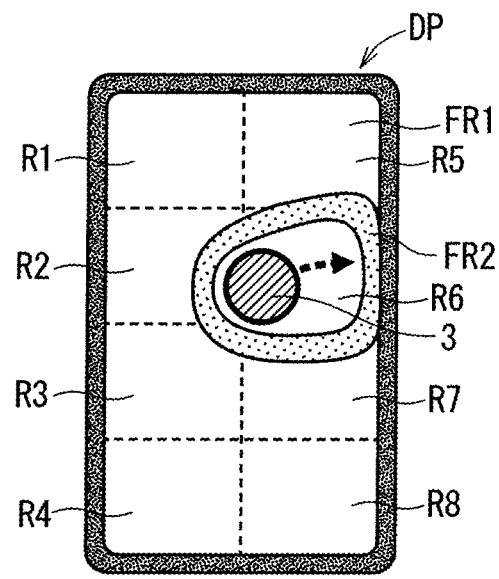
FIG. 63 is a diagram for explaining a configuration of guiding the tactile presentation knob in the display in the third embodiment.

FIGS. 61 to 63 are diagrams for explaining a configuration of reducing power consumption in the configuration of guiding the tactile presentation knob 3 by reducing a frictional force in a movement direction of the tactile presentation knob 3 on the display DP in which the operation surface is divided into eight portions of four rows and two columns, and illustrate arrangement of a frictional force on the operation surface.

As illustrated in FIG. 61, a portion where the tactile presentation knob 3 is present is set to the region FR1 having a small frictional force, and the region FR2 having a small frictional force is provided in a limited manner so as to surround the region FR1 having a small frictional force. The same applies to FIGS. 62 and 63. By limiting a movable range of the tactile presentation knob 3 in accordance with a movement direction of the tactile presentation knob 3, the operation region is presented to the user and erroneous operation is prevented. Further, by providing the region FR2 having a large frictional force only around the movable range of the tactile presentation knob 3, a region to which signal voltage for generating a large frictional force is applied is limited, and power consumption can be reduced.

<Effect>

According to the third embodiment, by using the tactile presentation knob 3 that can be installed at an optional position on the tactile presentation touch panel 400 and operated, the user can select and operate an optional control target in the same manner as touch operation with a finger. Further, when the knob is slid and moved to an optional operation region, the movable range of the tactile presentation knob 3 is limited by a frictional force, so that movement of the tactile presentation knob 3 in an unintended direction is suppressed, and the tactile presentation knob 3 is guided to the home position of the operation region, so that an effect that the tactile presentation knob 3 can be moved without visual check of the operation region can be obtained. Further, after the user installs the knob at an optional position on the tactile presentation touch panel 400 and moves the operation position by the slide operation, as in the first embodiment, the user can select and operate an optional control target by touch panel operation only by slide, rotation, and pressing operation of the knob similarly to the touch operation with a finger. Further, by changing a tactile sense according to a control target or an operation amount, it is possible to obtain an effect that it is possible to perform an intuitive operation by a tactile sense of the user and it is possible to give an operation feeling of the dial knob that is user-friendly. Further, various operations divided into several hierarchies can be performed only with the tactile presentation knob 3, and operation switches can be unified. In this manner, it is possible to obtain effects of simplifying an operation system, reducing a region in which an operation switch is arranged, and realizing a user interface excellent in spatial design and comfort. Further, the third embodiment can be combined with the second embodiment. In such a case, it is possible to obtain an effect that it is possible to perform an intuitive operation by a tactile sense of the user and it is possible to give an operation feeling of the dial knob that is more user-friendly.

Fourth Embodiment

<Guidance of Tactile Presentation Knob by Magnetic Force>

A fourth embodiment will be described below with reference to FIGS. 64 to 66.

Figure 64:
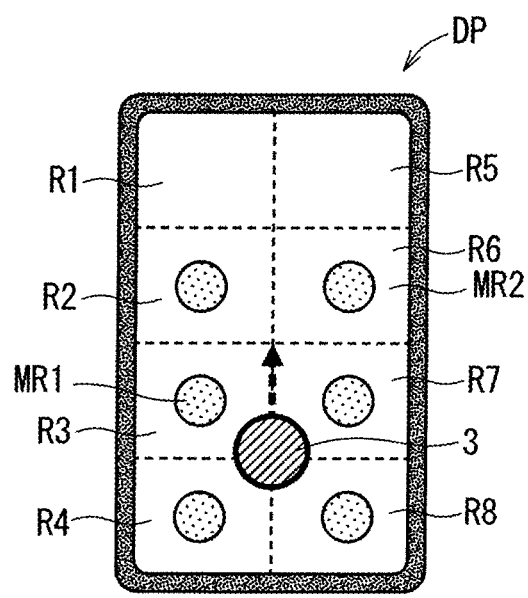
FIG. 64 is a diagram that describes operation of moving the tactile presentation knob to select an operation region in the display in a fourth embodiment.

FIG. 64 is a diagram that describes operation of selecting an operation region by moving the tactile presentation knob 3 on the display DP in which the operation surface is divided into eight portions of four rows and two columns, and illustrates arrangement of magnetic forces on the operation surface.

As illustrated in FIG. 64, in the divided regions excluding the divided regions R1 and R5, the region MR1 (second region) having a large magnetic force at the central portion and the region MR2 (first region) having a small magnetic force around the region MR1 are provided. Note that only the region MR2 having a small magnetic force is provided in the divided regions R1 and R5.

In a case where the tactile presentation knob 3 is slid to move on the operation surface, when the touch detection circuit 210 (see FIG. 28) of the touch panel 200 detects that the tactile presentation knob 3 starts to move, the movement direction prediction circuit 230 (see FIG. 28) predicts a movement direction of the tactile presentation knob 3 from a position change of the tactile presentation knob 3.

As illustrated in FIG. 64, in a case where the movement direction prediction circuit 230 predicts that the movement of the tactile presentation knob 3 is a movement on a region boundary of a divided region, first, the region MR1 having a large magnetic force is provided in the divided regions R2 to R4 and the divided regions R6 to R8 on a predicted path. The region MR1 having a large magnetic force has a larger area than a case where the fixing table 13 (see FIG. 24) of the tactile presentation knob 3 is fixed by a magnetic force, and has a weaker magnetic force than a case where the fixing table 13 is fixed by a magnetic force. In this manner, the tactile presentation knob 3 is gently guided in directions of the divided regions R2 to R4 and the divided regions R5 to R8.

Figure 65:
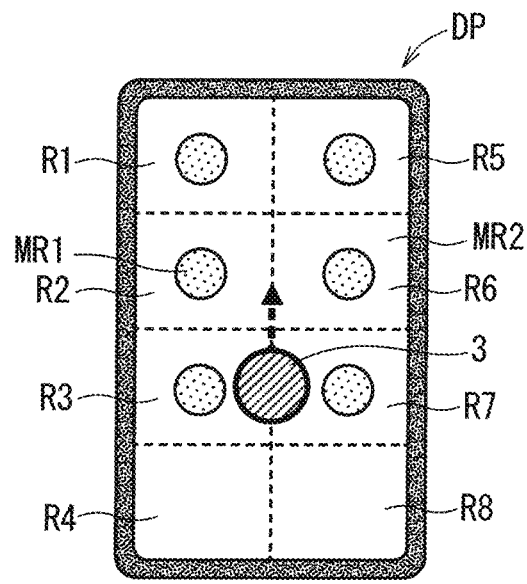
FIG. 65 is a diagram that describes operation of moving the tactile presentation knob to select an operation region in the display in the fourth embodiment.

FIG. 65 illustrates a state in which the region MR1 having a large magnetic force is provided also in the divided regions R1 and R5 in a case where the movement direction prediction circuit 230 predicts that the tactile presentation knob 3 further moves in the direction of an arrow, and the tactile presentation knob 3 is gently guided in the predicted direction.

Figure 66:
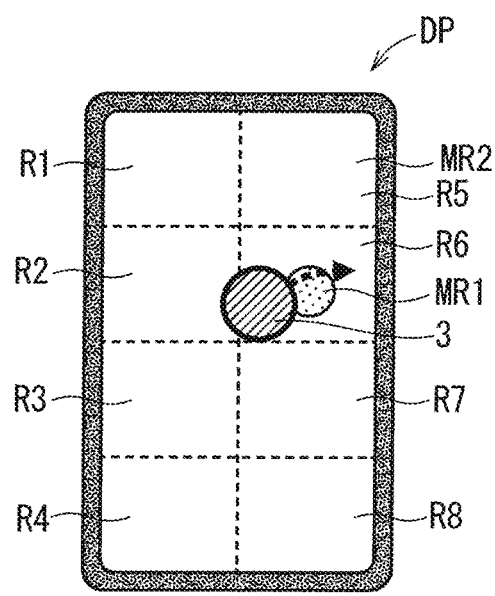
FIG. 66 is a diagram that describes operation of moving the tactile presentation knob to select an operation region in the display in the fourth embodiment.

In contrast, as illustrated in FIG. 66, in a case where the movement direction prediction circuit 230 predicts that the tactile presentation knob 3 is moving to the specific divided region R6 indicated by an arrow, the region MR1 having a large magnetic force is not provided in the divided region that is not in a traveling direction.

In this way, by guiding the tactile presentation knob 3 to the home position of the operation region by using a magnetic force, an effect that the tactile presentation knob 3 can be moved without visual check of the operation region can be obtained. In a case where a magnetic force is used, not only an attractive force but also a repulsive force may be used. In such a case, a repulsive force is preferably generated in the region of FR2 in FIGS. 58 to 63.

<Effect>

According to the fourth embodiment, by using the tactile presentation knob 3 that can be installed at an optional position on the tactile presentation touch panel 400 and operated, the user can select and operate an optional control target in the same manner as touch operation with a finger. Further, when the knob is slid and moved to an optional operation region, the knob is guided by a magnetic force, so that movement of the tactile presentation knob 3 in an unintended direction is suppressed, and the tactile presentation knob 3 is guided to the home position of the operation region, so that an effect that the tactile presentation knob 3 can be moved without visual check of the operation region can be obtained. Further, after the user installs the knob at an optional position on the tactile presentation touch panel 400 and moves the operation position by the slide operation, as in the first embodiment, the user can select and operate an optional control target by touch panel operation only by slide, rotation, and pressing operation of the knob similarly to the touch operation with a finger. Further, by changing a tactile sense according to a control target or an operation amount, it is possible to obtain an effect that it is possible to perform an intuitive operation by a tactile sense of the user and it is possible to give an operation feeling of the dial knob that is user-friendly. Further, various operations divided into several hierarchies can be performed only with the tactile presentation knob 3, and operation switches can be unified. In this manner, it is possible to obtain effects of simplifying an operation system, reducing a region in which an operation switch is arranged, and realizing a user interface excellent in spatial design and comfort. Further, the fourth embodiment can be combined with the second and third embodiments. In such a case, it is possible to obtain an effect that it is possible to perform an intuitive operation by a tactile sense of the user and it is possible to give an operation feeling of the dial knob that is more user-friendly.

Fifth Embodiment

<Fixing of Tactile Presentation Knob>

Figure 67:
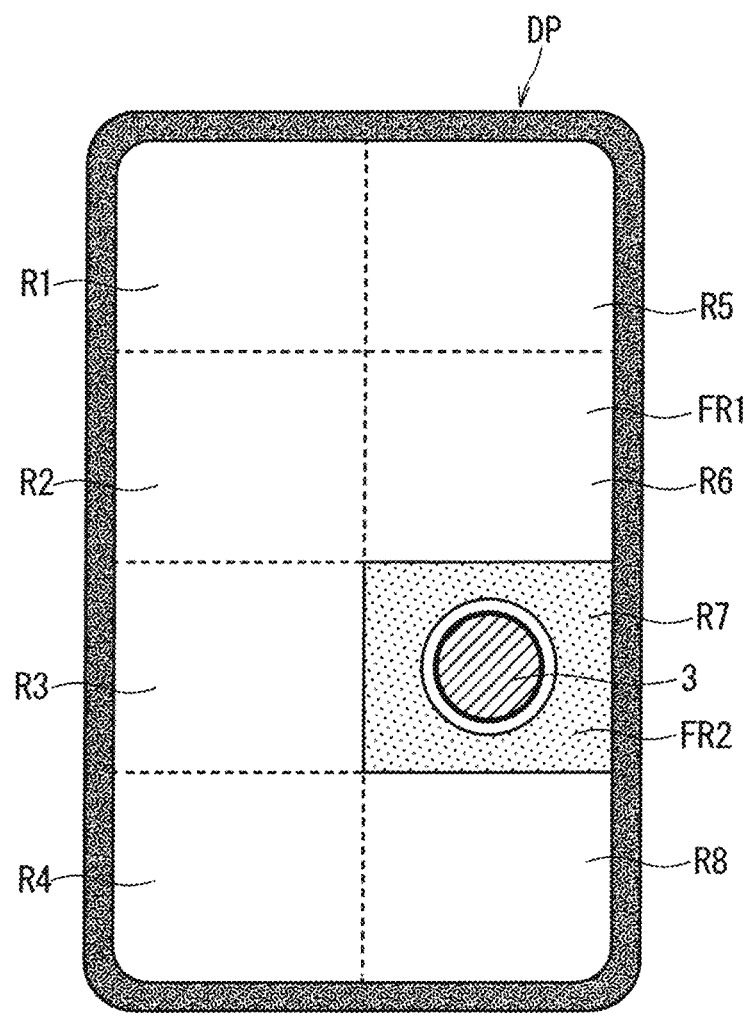
FIG. 67 is a diagram illustrating a configuration in which displacement of a position of the tactile presentation knob is suppressed by using a frictional force in the display according to a fifth embodiment.

A fifth embodiment will be described below with reference to FIGS. 67 to 69. FIG. 67 is a diagram illustrating a configuration in which, when the tactile presentation knob 3 is operated at the home position in the operation region on the display DP in which the operation surface is divided into eight portions of four rows and two columns, displacement of a position of the tactile presentation knob 3 due to vibration or the like of the body of the user is suppressed by using a frictional force, and illustrates arrangement of frictional forces on the operation surface.

As illustrated in FIG. 67, when the tactile presentation knob 3 is placed at the home position in the divided region R7, a strong electrostatic force is generated immediately below the fixing table 13 (see FIG. 24) of the tactile presentation knob 3 to generate attraction, and a region immediately below the conductive elastic portion 6 (see FIG. 22) on the back surface of the tactile presentation knob 3 and an outer peripheral portion OP of the tactile presentation knob 3 are set to the region FR1 (sixth region) having a small frictional force. The operation region other than the above is set to the region FR2 (fifth region) having a large frictional force, and even if the tactile presentation knob 3 is about to move, the tactile presentation knob 3 is stopped by the frictional force. Note that a divided region other than the divided region R7 on which the tactile presentation knob 3 is placed is set to the region FR1 having a small frictional force.

Figure 68:
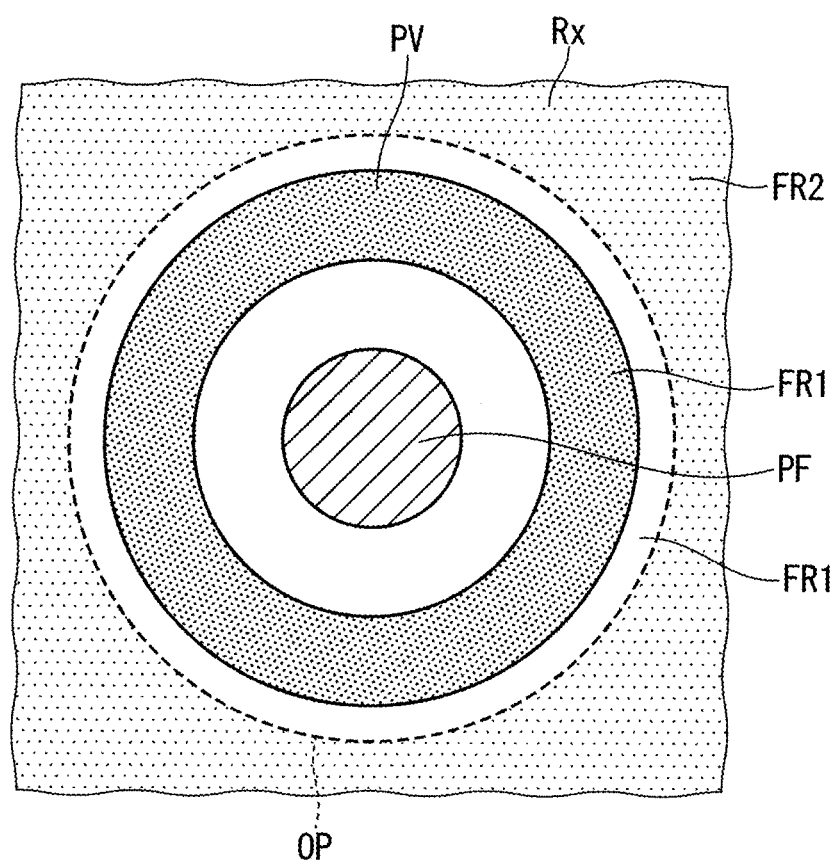
FIG. 68 is a diagram illustrating a configuration in which displacement of a position of the tactile presentation knob is suppressed by using a frictional force in the display according to the fifth embodiment.

FIG. 68 illustrates arrangement of the region FR2 having a large frictional force in a specific divided region Rx. As illustrated in FIG. 68, the region FR2 having a large frictional force is provided as close as possible to the outer peripheral portion OP of the tactile presentation knob 3 and at a position that does not affect the presentation of a tactile sense. In FIG. 68, the region PF to which a strong electrostatic force is applied immediately below the fixing table 13 is provided in a central portion of the divided region Rx, the region FR1 having a small frictional force is provided at a predetermined distance from the region PF, and the outer peripheral portion OP of the tactile presentation knob 3 is set to the region FR1 having a small frictional force. In the region PF, the frictional force is set to be smaller than that in the region FR2 having a large frictional force, and the frictional force is set to be larger than that in the region FR1 having a small frictional force.

FIG. 69 is a diagram for describing a configuration for reducing power consumption in a configuration in which, when the tactile presentation knob 3 is operated at the home position in the operation region, the position of the tactile presentation knob 3 is prevented from being displaced due to vibration of the user's body or the like by using a frictional force, and illustrates arrangement of frictional forces on the operation surface.

As illustrated in FIG. 69, on the outer side of the tactile presentation knob 3, the region FR2 having a large frictional force is provided so as to surround the tactile presentation knob 3 in a limited manner, so that a region to which signal voltage for generating a large frictional force is applied is limited, and power consumption can be reduced.

<Effect>

According to the fifth embodiment, when the user operates the presentation knob 3, it is possible to suppress displacement of the position of the tactile presentation knob 3 due to vibration of the user's body or the like, and to suppress movement of the tactile presentation knob 3 before the presentation knob 3 is fixed. Further, after the user installs the knob at an optional position on the tactile presentation touch panel 400 and moves the operation position by the slide operation, as in the first embodiment, the user can select and operate an optional control target by touch panel operation only by slide, rotation, and pressing operation of the knob similarly to the touch operation with a finger. Further, by changing a tactile sense according to a control target or an operation amount, it is possible to obtain an effect that it is possible to perform an intuitive operation by a tactile sense of the user and it is possible to give an operation feeling of the dial knob that is user-friendly. Further, various operations divided into several hierarchies can be performed only with the tactile presentation knob 3, and operation switches can be unified. In this manner, it is possible to obtain effects of simplifying an operation system, reducing a region in which an operation switch is arranged, and realizing a user interface excellent in spatial design and comfort. Further, the fifth embodiment can be combined with the second to fourth embodiments. In such a case, it is possible to obtain an effect that it is possible to perform an intuitive operation by a tactile sense of the user and it is possible to give an operation feeling of the dial knob that is user-friendly.

Sixth Embodiment

<Invalidation of Operation Outside Operation Range and Presentation of Tactile Sense>

FIG. 70 is a cross-sectional view illustrating an example of a configuration of the tactile presentation touch display 1, As illustrated in FIG. 70, in a sixth embodiment, an ultrasonic wave element 60 that vibrates the operation surface is installed in an outer peripheral portion of a surface opposite to a surface (operation surface) in contact with the tactile presentation knob 3 of the transparent insulating substrate 101. The other configurations are substantially the same as those of the first embodiment, and thus the description of the configurations is omitted here.

A frictional force between the tactile presentation knob 3 and the transparent insulating substrate 101 may be controlled by an ultrasonic wave. In this case, a wavelength range of the ultrasonic wave is lower than a high frequency range in which an air layer is generated between the tactile presentation knob 3 and the transparent insulating substrate 101 and no frictional force is generated.

The ultrasonic wave elements 60 are desirably installed at symmetrical positions in an outer peripheral portion of the transparent insulating substrate 101. By controlling a vibration timing of the ultrasonic wave element 60, a position where vibration of a surface of the transparent insulating substrate 101 resonates can be set at the same position as an indication position 50 of the tactile presentation knob 3.

In this case, it is possible to generate vibration having an equivalent amplitude with a smaller voltage than that in a case where the ultrasonic wave elements 60 operate in synchronization, which can contribute to reduction in overall power consumption of the tactile presentation touch display 1.

Note that the present embodiment 6 can be applied to the first to fifth embodiments. That is, the frictional force may be controlled by using ultrasonic vibration of the sixth embodiment instead of the frictional force generated by an electrostatic force in the first to fifth embodiments. In this case, a vibration output timing, a frequency, and strength of a plurality of the ultrasonic wave elements 60 arranged in an outer peripheral portion of the transparent insulating substrate 101 are controlled, and a resonance region of vibration to be generated by an ultrasonic wave is generated in a region where the frictional force is desired to be increased with respect to the position and the movement direction of the arranged tactile presentation knob 3, so that a frictional force is generated at an optional position.

<Effect>

According to the sixth embodiment, a surface of the transparent insulating substrate 101 is vibrated using the ultrasonic wave element 60 to generate a frictional force between the tactile presentation knob 3 and the transparent insulating substrate 101. Therefore, in a case where the tactile presentation touch display 1 is used outdoors such as on the sea, the tactile presentation knob 3 can be used. Like the first embodiment, after the user installs the knob at an optional position on the tactile presentation touch panel 400 and moves the operation position by the slide operation, as in the first embodiment, the user can select and operate an optional control target by touch panel operation only by slide, rotation, and pressing operation of the knob similarly to the touch operation with a finger. Further, by changing a tactile sense according to a control target or an operation amount, it is possible to obtain an effect that it is possible to perform an intuitive operation by a tactile sense of the user and it is possible to give an operation feeling of the dial knob that is user-friendly.

Note that, in the present disclosure, within the scope of the disclosure, preferred embodiments can be freely combined with each other, and each preferred embodiment can be appropriately modified or omitted.

Although the present disclosure has been described in detail, the above explanation is exemplary in all the aspects, and the present disclosure is not limited to the explanation. It is understood that countless variations that are not exemplified are conceivable without departing from the scope of the present disclosure.

The invention claimed is:

1. A tactile presentation panel that has a tactile presentation knob placed on an operation surface and presents a tactile sense to a user via the tactile presentation knob, the tactile presentation panel comprising:

a control circuit that divides the operation surface into a plurality of regions, assigns a control target to each of divided regions, and sets a tactile sense to be presented for each of the divided regions;

a tactile control circuit that generates a tactile sense set by the control circuit for each of the divided regions by changing a frictional force between the operation surface and the tactile presentation knob; and a touch detection circuit that detects a position on the tactile presentation panel of the tactile presentation knob, wherein the tactile presentation knob is placed in the divided region so that the control target is selected, and the tactile presentation knob includes a conductive elastic portion being in contact with the operation surface and a rotation portion made up of a rigid body provided on the conductive elastic portion, and a tactile sense generated b a change of a frictional force generated between the operation surface and the conductive elastic portion is transmitted from the rotation portion to a user.

2. The tactile presentation panel according to claim 1, wherein the tactile control circuit changes the frictional force by changing time and a cycle in which a signal waveform and signal voltage of a tactile presentation signal are applied.

3. The tactile presentation panel according to claim 1, further comprising:

a tactile electrode including a plurality of first electrodes and a plurality of second electrodes provided on the operation surface side of the tactile presentation panel;

a dielectric layer that covers the tactile electrode and has one surface serving as the operation surface; and a voltage generation circuit that generates a first voltage signal having a first frequency to be applied to at least one of the first electrodes located in at least a partial region on the operation surface, and generates a second voltage signal having a second frequency different from the first frequency to be applied to at least one of the second electrodes located in at least a partial region on the operation surface of the tactile presentation panel, wherein the frictional force generated between the operation surface and the tactile presentation knob is generated by supply of the first and second voltage signals.

4. The tactile presentation panel according to claim 1, further comprising:

at least one ultrasonic wave element that vibrates the operation surface of the tactile presentation panel by ultrasonic vibration, wherein the frictional force between the tactile presentation knob and the tactile presentation panel is generated by causing to resonate generated vibration on the operation surface by controlling a vibration timing of the ultrasonic wave element to resonate.

5. The tactile presentation panel according to claim 1, further comprising:

a pressure sensitive sensor that detects a pressing force applied to the operation surface, wherein operation of pushing the tactile presentation knob to the operation surface is detected.

6. The tactile presentation panel according to claim 5, wherein when the pressure sensitive sensor detects the pressing force by operation of pushing the tactile presentation knob to the operation surface, the control circuit switches the operation surface to region division corresponding to a lower hierarchy of the control target having a hierarchical structure by determining that the control target assigned to the divided region in which the pressing force is detected is selected.

7. The tactile presentation panel according to claim 1, wherein a different tactile sense is presented to the tactile presentation knob for each of the divided regions of the operation surface.

8. The tactile presentation panel according to claim 1, wherein the divided region includes a first region and a second region, and the first region is set such that the frictional force between the tactile presentation knob and the tactile presentation panel is smaller than that in the second region.

9. The tactile presentation panel according to claim 8, wherein the tactile control circuit changes a position for setting the second region in accordance with movement of the tactile presentation knob so as to guide the tactile presentation knob.

10. The tactile presentation panel according to claim 8, wherein the divided region includes a third region and a fourth region, the fourth region is a region where an electrostatic force or a magnetic force acts between the tactile presentation knob and the tactile presentation panel, and the tactile presentation knob is fixed by an electrostatic force or a magnetic force as the tactile presentation knob is placed on the fourth region.

11. The tactile presentation panel according to claim 10, wherein the fourth region is a central portion of the divided region, and the third region is a region which is other than the central portion of the divided region, and is a region in which a magnetic force weaker than that in the fourth region acts between the tactile presentation knob and the tactile presentation panel.

12. The tactile presentation panel according to claim 10, wherein at least the fourth region causes a magnetic force to be generated by a coil.

13. The tactile presentation panel according to claim 10, wherein at least the fourth region causes a magnetic force to be generated by a coil and a magnet of a paramagnetic material or a ferromagnetic material.

14. The tactile presentation panel according to claim 8, wherein the divided region includes a fifth region and a sixth region, the sixth region is a region with which the tactile presentation knob is in contact in a central portion of the divided region, and the fifth region is a region which surrounds at least the tactile presentation knob, and in which a frictional force is set to be larger than that in the sixth region between the tactile presentation knob and the tactile presentation panel.

15. The tactile presentation panel according to claim 8, wherein the control target is selected by movement, rotation, and pushing operation of a position of the tactile presentation knob on the operation surface.

16. A tactile presentation touch panel comprising:

the tactile presentation panel according to claim 1; and a touch panel arranged on a side opposite to the operation surface of the tactile presentation panel, wherein the touch detection circuit is included in the touch panel instead of the tactile presentation panel.

17. The tactile presentation touch panel according to claim 16, wherein a detection electrode and an excitation electrode of the touch panel are arranged as a pair in a matrix.

18. A tactile presentation touch display comprising:

the tactile presentation touch panel according to claim 16; and a display panel attached to the tactile presentation touch panel.

19. A tactile presentation panel that has a tactile presentation knob placed on an operation surface and presents a tactile sense to a user via the tactile presentation knob, the tactile presentation panel comprising:

a control circuit that sets a tactile sense to be presented;

a tactile control circuit that generates a tactile sense set by the control circuit by changing a frictional force between the operation surface and the tactile presentation knob; and a touch detection circuit that detects a position on the tactile presentation panel of the tactile presentation knob, wherein the tactile control circuit sets at least the frictional force on the operation surface to guide the tactile presentation knob to a specific region on the operation surface, and the tactile presentation knob includes a conductive elastic portion being in contact with the operation surface and a rotation portion made up of a rigid body provided on the conductive elastic portion, and a tactile sense generated by a change of a frictional force, generated between the operation surface and the conductive elastic portion is transmitted from the rotation portion to a user.

20. A tactile presentation touch panel comprising:

the tactile presentation panel according to claim 19; and a touch panel arranged on a side opposite to the operation surface of the tactile presentation panel, wherein the touch detection circuit is included in the touch panel instead of the tactile presentation panel.

21. The tactile presentation touch panel according to claim 20, wherein a detection electrode and an excitation electrode of the touch panel are arranged as a pair in a matrix.

22. A tactile presentation touch display comprising:

the tactile presentation touch panel according to claim 20; and a display panel attached to the tactile presentation touch panel.

* * * * *